US012793865B2

(12) United States Patent
Fisher et al.

(10) Patent No.: US 12,793,865 B2
(45) Date of Patent: Nov. 10, 2026

(54) MANDREL-WOUND, ECCENTRIC MONOLITHIC FUEL ASSEMBLY CORE, FUEL ASSEMBLY AND REACTOR INCORPORATING SAME, AND METHODS OF MANUFACTURE

(71) Applicant: BWXT Advanced Technologies LLC, Lynchburg, VA (US)

(72) Inventors: Benjamin D. Fisher, Lynchburg, VA (US); David J. Garner, Lynchburg, VA (US); John R. Salasin, Lynchburg, VA (US); Sabrina Emerson Amy McCoy, Lynchburg, VA (US); Richard W. Goettler, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 263 days.

(21) Appl. No.: 18/633,607

(22) Filed: Apr. 12, 2024

(65) Prior Publication Data

US 2025/0218611 A1 Jul. 3, 2025

Related U.S. Application Data

(60) Provisional application No. 63/459,450, filed on Apr. 14, 2023.

(51) Int. Cl.

| | |
|---|---|
| ***G21D 5/02*** | (2006.01) |
| ***G21C 3/326*** | (2006.01) |
| *G21C 5/02* | (2006.01) |

(52) U.S. Cl.

CPC ............... *G21D 5/02* (2013.01); *G21C 3/326* (2013.01); *G21C 5/02* (2013.01)

(58) Field of Classification Search

CPC .................................. B64G 1/408; G21D 5/02

See application file for complete search history.

(56) References Cited

U.S. PATENT DOCUMENTS 2,982,713 A * 5/1961 North, Jr. ................. G21C 5/10 376/205

3,230,146 A * 1/1966 Astley ...................... G21C 7/30 976/DIG. 135

(Continued)

FOREIGN PATENT DOCUMENTS

GB 1106256 A 3/1968

OTHER PUBLICATIONS

International Preliminary Report on Patentability dated Oct. 8, 2025, issued in corresponding International Patent Application No. PCT/US2024/024182.

(Continued)

*Primary Examiner* — Lily C Garner

(74) *Attorney, Agent, or Firm* — Morgan, Lewis & Bockius LLP

(57) ABSTRACT

Insulated fuel assembly core with plurality of fuel monoliths, exhaust support plate, exhaust shield assembly, and insulation layer in which the plurality of fuel monoliths are located axially along a longitudinal axis and each of the plurality of fuel monoliths has a shape of an eccentric cylinder and a composition including a fissionable fuel component. Channels in the exhaust support plate are oriented so that propellant gas flow through the exhaust support plate does not impinge the exhaust shield assembly. The insulated fuel assembly core is manufactured by forming a tensioned fuel monolith stack mandrel assembly using mandrels spacers and internal tensioning components and forming an insulation layer on an outer surface of the tensioned fuel monolith stack mandrel assembly by mandrel winding. The insulated fuel assembly core can be incorporated into a fuel assembly of nuclear propulsion fission reactor structure of, for example, a nuclear thermal propulsion engine.

17 Claims, 41 Drawing Sheets

(56) References Cited

U.S. PATENT DOCUMENTS

| | | | | | |
|---|---|---|---|---|---|
| 3,230,613 | A * | 1/1966 | Rechin | F02K 9/972 72/370.11 |
| 3,383,858 | A * | 5/1968 | Willinski | G21D 5/02 376/904 |
| 3,817,029 | A * | 6/1974 | Frisch | G21C 3/22 376/388 |
| 6,353,652 | B1 * | 3/2002 | Helmersson | G21C 3/328 376/443 |
| 10,692,612 | B2 * | 6/2020 | Kimura | G21C 15/06 |
| 11,710,578 | B2 * | 7/2023 | Barringer | G21C 3/33 376/424 |
| 11,728,044 | B2 * | 8/2023 | Barringer | G21D 5/02 376/318 |
| 11,779,985 | B1 * | 10/2023 | Fluhler | F02K 9/52 29/890.01 |
| 11,935,661 | B2 * | 3/2024 | Jogerst | B22F 3/1291 |
| 11,990,248 | B2 * | 5/2024 | Gramlich | G21C 7/08 |
| 12,040,099 | B2 * | 7/2024 | Shargots | G21C 3/32 |
| 12,217,878 | B2 * | 2/2025 | Botha | G21C 1/022 |
| 2006/0222140 | A1 * | 10/2006 | Aleshin | G21C 3/322 376/434 |
| 2011/0192137 | A1 * | 8/2011 | Maeding | B23P 15/008 29/890.01 |
| 2017/0062080 | A1 * | 3/2017 | Cheatham, III | G21C 3/04 |
| 2018/0033501 | A1 * | 2/2018 | Kimura | G21C 3/22 |
| 2021/0304909 | A1 * | 9/2021 | Gramlich | G21D 5/02 |
| 2021/0375495 | A1 * | 12/2021 | Shargots | B64G 1/402 |
| 2022/0115149 | A1 * | 4/2022 | Barringer | G21D 5/02 |
| 2022/0115152 | A1 * | 4/2022 | Barringer | G21C 3/64 |
| 2023/0282373 | A1 | 9/2023 | Fisher et al. | |
| 2023/0282374 | A1 | 9/2023 | Fisher et al. | |
| 2023/0282380 | A1 * | 9/2023 | Fisher | B64G 1/408 72/255 |
| 2024/0371534 | A1 * | 11/2024 | Shargots | B64G 1/408 |
| 2025/0029740 | A1 * | 1/2025 | Fisher | G21C 3/336 |

OTHER PUBLICATIONS

Burns et al., "Nuclear Thermal Propulsion Reactor Materials", in Nuclear Materials, edited by P. Tsvetkov, London: IntechOpen, 2020. [Online]. Available: https://www.intechopen.com/chapters/71396. doi: 10.5772/intechopen.91016.

International Search Report and Written Opinion dated Sep. 6, 2024, issued in corresponding International Patent Application No. PCT/US24/24182.

Kardoulaki et al., "Synthesis, thermal conductivity, and hydrogen compatibility of a high melt point solid solution uranium carbide, (U0.2Zr0.8)C", Nuclear Materials and Energy 33 (2022) 101290.

I. Deryavko and A. Lanin, "Influences of Residual Stressses on the Thermal Strength of NRE Fuel Elements" Norwegian Journal of Development of the International Science, vol. 24, pp. 38-41, 2018.

I. Deryavko, "Radiation Hardening of Carbide Fuel Elements," Norwegian Journal of Development of the International Science, vol. 24, pp. 42-46, 2018.

A. G. Lanin and I. I. Fedik, "Selecting and using materials for a nuclear rocket engine reactor," Physics-Uspekhi, vol. 54, No. 3, pp. 305-318, 2011, doi: 10.3367/UFNe.0181.201103f.0319.

V. V. Baklanov et al., "Identification of Zirconium-Uranium Fuel Elements of IVG-1M Research Reactor," NNC RK Bulletin, vol. 2, No. 46, pp. 91-97, 2011 (with English Abstract).

I. I. Deryavko, V. V. Chernyadev, N. V. Gorin, Y. S. Cherepnin, and S. T. Tukhvatulin, "Characteristics of Identifying the Fuel Rods of Nuclear Rocket Engine (NRER)," NNC RK Bulletin vol. 4, No. 44, pp. 95-105, 2010 (with English Abstract).

V. Zakirov and V. Pavshook, "Russian Nuclear Rocket Engine Design for Mars Exploration," Tsinghua Science and Technology, vol. 12, No. 3, pp. 256-260, 2007.

A. Y. Gagarinkskii, "Russian Nuclear Criticality Experiments: Status and Prospects," Nuclear Energy for New Europe 2003, Portoroz, Slovenia, Sep. 8-11, 2003.

I. Deryavko, I. G. Perepelkin, O. S. Pivovarov, and A. N. Storozhenko, "Express Technqiues for Post-Irradiation Investigations of Shell-Free Carbide Rods," NNC RK Bulletin, vol. Nuclear Physics and Radiation Material Structure Study, No. 4, pp. 88-94, 2001 (with English Abstract).

A. G. Lanin, "Nuclear Rocket Engine Reactor", Springer Series in Materials Science, vol. 170, ISBN 978-3-642-32430-7, 2013.

A. Kraus, P. Garner, and N. Hanan, "ANL/RTR/TM-15/2: Thermal-Hydraulic Simulations of Single Pin and Assembly Sector for IVG-1M Reactor," Argonne National Laboratory, 2015.

Bykov et al., "Programs of Experiments with Critical Assemblies at the Russian Research Centre "Kurchatov Institute"," Nuclear Science and Engineering, vol. 145, No. 2, pp. 181-187, 2017, doi: 10.13182/nse03-a2374.

Lanin, "Effect of residual stresses on the strength of ceramic materials (Review)," Russian Metallurgy (Metally), vol. 2012, No. 4, pp. 307-322, 2012, doi: 10.1134/s0036029512040076.

Lanin et al., Thermal Stress Resistance of Materials. Berlin: Springer, 2008.

Dyakov et al., "Influence of Disturbances in the Geometry of the Elements of a Regularly Porous System on the Hydrodynamic Characteristics of the Clusters of Fuel Elements of a Nuclear Reactor", Journal of Engineering Physics and Thermophysics, vol. 81, No. 2, 2008.

Lanin et al., "Thermal Shock Resistance and Thermal-Mechanical Processing of Sapphire," Journal of the European Ceramic Society, vol. 23 (2003) 455-468.

Lanin et al., "Fracture Kinetics of Thermally Loaded Bodies in Elastic-Brittle State and Criterion of Thermal Stress Resistance," in Fracture Mechanics of Ceramics, vol. 13, Bradt et al. (Eds), Kluwer Academic/Plenum Publishers (2002) 395-411.

Lanin et al., "Numerical Method of Thermal Shock Resistance Estimation by Quenching of Samples in Water," Journal of Material Science, vol. 35 (2000) 2353-2359.

Lanin et al., "Influence of Residual Stresses of Thermal Stress Resistance of Refractory Ceramic," Journal of the European Ceramic Society, vol. 20 (2000) 209-213.

Ponomarev-Stepnoy et al., "Work on Domestically Produced Nuclear Rocket Motors," Atomic Energy, vol. 86, No. 4, 1999, 283-287.

Gagarinskii, "Critical Benchmark Experiments at the kurchatov Institute Russian Scientific Center," Atomic Energy, vol. 84, No. 6, 1998, 359-364.

Wetch et al., "Low-cost space fission power systems utilizing US and former Soviet Union experience and technology," AIP Conf. Proc. 387, 1309-1316 (1997).

Lanin et al., "Mechanical and Thermophysical Properties of Materials in HTGR Fuel Bundles," translated from Atomnaya Energiya, vol. 74, No. 1, pp. 40-44, 1993.

Schneider et al. (Eds.), Thermal Shock and Thermal Fatigue Behavior of Advanced Ceramics, Kluwer Academic Publishers (1993), pp. 37-223.

Wetch et al., Development of nuclear rocket engines in the USSR, presented at AIAA/NASA/OAI Conference on Advanced SEI Technologies, 1991 (8 pages).

Lanin, "Strength and Thermal Strength Resistance of Refractory Compounds," in Materials Science of Carbides, Nitrides, and Borides, Gogotsi et al. (Eds.), Kluwer Academic Publishers (1999) 305-322.

Fedik, "High temperature Carbide Structures in Nuclear Power," in Materials Science of Carbides, Nitrides, and Borides, Gogotsi et al. (Eds.), Kluwer Academic Publishers (1999) 337-342.

Popov et al., "Method of Testing the Heat Resistance of Specimens of Brittle, Electrically Conducting Materials Using Electron-beam Heating," translated from Problemy Prochnosti, No. 9, pp. 77-81 (1984).

Lanin et al., "Determination of Crack Resistance of Brittle Materials," translated from Problemy Prochnosti, No. 2, pp. 13-16 (1984).

Derevyako et al., "Macrostresses in Sintered Carbides," translated from Poroshkovaya Metallurgiya, No. 5 (257), pp. 60-64 (1984).

Gerasimov et al., "Strength of Zirconium Carbide Composites with Disperse Carbon Inclusions," translated from Poroshkovaya Metallurgiya, No. 1 (229), pp. 67-74 (1982).

(56) References Cited

OTHER PUBLICATIONS

Lanin et al., "Strength of Carbide-Graphite Composites With Force and Thermal Loadings," Translated from Problmey Prochnosti, No. 12, pp. 89-95 (1981).
Bulychev et al., "Theory and Technology of Sintering, Thermal, and Chemicothermal Treatment Processes—The Sintering of Zirconium Carbide," translated from Poroshkovaya Metallurgiya, No. 4 (172), pp. 38-42 (1977).
Lanin et al., "Failure of Ceramic Materials In Local Thermal Loading," Translated from Problemy Prochnosti, No. 9, pp. 35-38 (1986).

* cited by examiner

MANDREL-WOUND, ECCENTRIC MONOLITHIC FUEL ASSEMBLY CORE, FUEL ASSEMBLY AND REACTOR INCORPORATING SAME, AND METHODS OF MANUFACTURE

RELATED APPLICATION DATA

This application is based on and claims priority under 35 U.S.C. § 119 to U.S. Provisional Application No. 63/459,450, filed Apr. 14, 2023, the entire contents of which are incorporated herein by reference.

TECHNICAL FIELD AND INDUSTRIAL APPLICABILITY

The present disclosure relates generally to nuclear fission reactors and structures related to nuclear fission reactors, in particular for propulsion. In particular, a fuel assembly core has stacked monolithic fuel bodies, insulation layers, an exhaust support plate, and an inlet flow structure. The fuel assembly core is mandrel-wound to form an assembled insulated fuel assembly core, which is positioned in a fuel assembly outer structure to form a fuel assembly. Fuel assemblies are incorporated into a nuclear thermal propulsion reactor, which may be used in various applications suitable for gas reactor designs, such as space, lunar and terrestrial environments.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Twisted ribbon fuel forms have been previously used in reactor designs (see Burns et al, "Nuclear Thermal Propulsion Reactor Materials", in Nuclear Materials, edited by P. Tsvetkov, London: IntechOpen, 2020), with (U, Zr) C fuel used for the low-temperature portion of the reactor design (i.e., propellant exit gas temperature≤2500 K), and (U, Zr, Nb) C used for the high-temperature portion of the reactor core. These conventional ribbon fuel forms were assembled into a tube with an insulation layer of NbC and ZrC and an outer casing of carbide-graphite material.

However, such conventional assembly allowed for several failure modes. Among these are cracking of the insulation layer, layer separation, and ablation forming holes. Each of these failure modes can allow hot propellant gas, such as hydrogen, to penetrate the layered tube structure, attack the layers, and ultimately cause failure of the casing.

SUMMARY

There is a need for improvements in nuclear thermal propulsion reactors to address these failure modes and to, more generally, reduce defects and improve performance. In particular, improvements related to the geometry of the fuel itself and to the structures, arrangement and manufacturing of fuel assemblies, including of the various components of the fuel assembly, such as an exhaust support plate and an exhaust shield assembly. In addition, improvements related to the manufacture of insulated fuel assembly cores and fuel assemblies containing insulated fuel assembly cores are disclosed, which provide for improved manufacturability.

An embodiment of an insulated fuel assembly core comprises a plurality of fuel monoliths, an exhaust support plate, an exhaust shield assembly, and an insulation layer. The plurality of fuel monoliths is located axially along a longitudinal axis of the insulated fuel assembly core and each of the plurality of fuel monoliths has a shape of an eccentric cylinder and has a composition including a fissionable fuel component.

An embodiment of a method of manufacturing an insulated fuel assembly core comprises forming a tensioned fuel monolith stack mandrel assembly and forming an insulation layer on an outer surface of the tensioned fuel monolith stack mandrel assembly by mandrel winding. Forming the tensioned fuel monolith stack mandrel assembly includes: assembling a plurality of fuel monoliths into a stack along a longitudinal axis, wherein each of the plurality of fuel monoliths has a shape of an eccentric cylinder and includes a first end surface, a second end surface, a side surface connecting the first end surface to the second end surface, and a plurality of first channels extending axially from the first end surface to the second end surface; inserting an alignment drill rod through one of the plurality of first channels in a direction of the longitudinal axis; attaching an exhaust support plate to a first end of the assembled stack to form a core stack, wherein the exhaust support plate includes a first end face, a second end face, a circumferential surface connecting the first end face to the second end face, and a plurality of second channels extending from the first end face to the second end face and attaching the exhaust support plate inserts the alignment rod through one of the plurality of second channels; inserting a first set of tensioning cables through a first portion of the plurality of first channels in the plurality of fuel monoliths and through a first portion of the plurality of second channels in the exhaust support plate; attaching a plurality of second mandrel spacers to a second end of the core stack; inserting the first set of tensioning cables through the plurality of second mandrel spacers; attaching a plurality of first mandrel spacers to a first end of the core stack, wherein the first end of the core stack includes the exhaust support plate attached to the first end of the assembled stack; inserting a second set of tensioning cables through: (i) the plurality of first mandrel spacers, (ii) a second portion of the plurality of second channels in the exhaust support plate, (iii) a second portion of the plurality of first channels in the plurality of fuel monoliths, and (iv) the plurality of first mandrel spacers; tensioning the first set of tensioning cables and the second set of tensioning cables; and attaching a first threaded mandrel cap to a distal end of the plurality of first mandrel spacers and a second threaded mandrel cap to a distal end of the plurality of second mandrel spacers.

The disclosed insulated fuel assembly core can be incorporated into a fuel assembly by locating the insulated fuel assembly core within a fuel assembly outer structure and attaching an inlet connection assembly to an inlet end of the fuel assembly outer structure. Also, a plurality of fuel assemblies can be located in a different one of a plurality of fuel assembly openings in a moderator block to form a nuclear fission reactor structure.

Embodiments of the disclosed insulated fuel assembly core, fuel assembly, and structures and methods of fabrication have application in various fission reactor designs and application in a wide range of fields, including aerospace and industrial applications.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figures 1A, 1B:
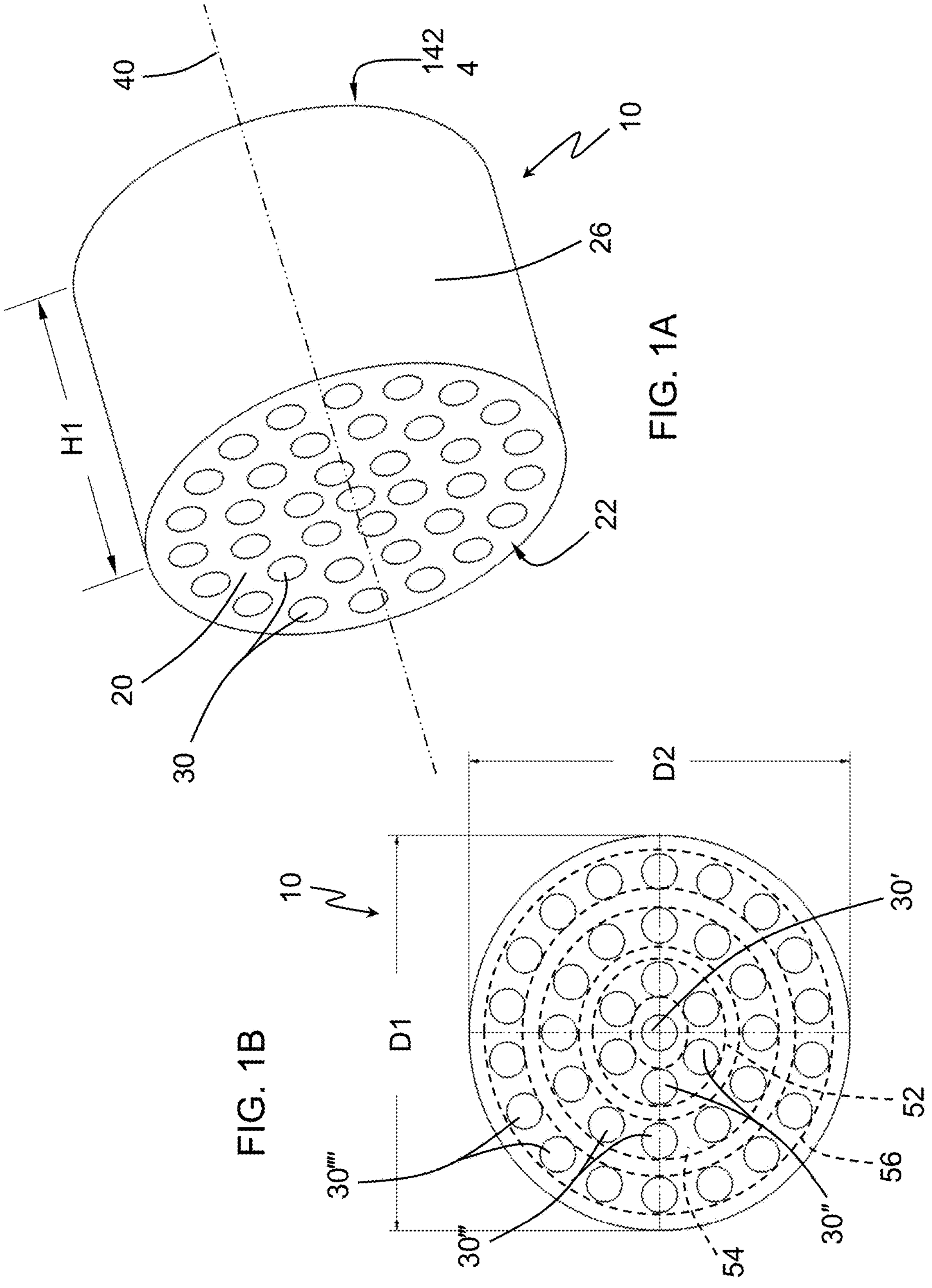
FIGS. 1A-B are a perspective view of an embodiment of a fuel monolith (FIG. 1A) and a view of an end surface of the fuel monolith (FIG. 1B).

In some instances, dimensions of respective constituent elements are appropriately adjusted for clarity. For ease of viewing, in some instances only some of the named features in the figures are labeled with reference numerals.

DETAILED DESCRIPTION

FIG. 1A is a perspective view of an embodiment of a fuel monolith 10 and FIG. 1B is a view of an end surface of the fuel monolith 10. The fuel monolith 10 has a body 20 including a first end surface 22, a second end surface 24, and a side surface 26 connecting the first end surface 22 to the second end surface 24. The fuel monolith 10 has a plurality of channels 30 extending through the body 10 from an inlet opening in the first end surface 22 to an outlet opening in the second end surface 24. The plurality of channels 30 provide a flow path for propellant gas, such as hydrogen, to flow through the fuel monolith 10 during operation. The flow of propellant gas throughout the plurality of channels 30 also cools the fuel monolith 10.

In some embodiments, the plurality of channels 30 are arranged symmetrically relative to a longitudinal axis 40 of the body 20 of the fuel monolith 10. For example, the plurality of channels 30 can be arranged in groups of concentric rings, with a central channel 30', an inner ring 52 of channels 30", an intermediate ring 54 of channels 30", and an outer ring 56 of channel 30". Channels in any one ring can be evenly distributed in the circumferential direction or unevenly distributed in the circumferential direction. The concentric rings can be evenly distributed in the radial direction or can be unevenly distributed in the radial direction. In some embodiments, the axis of each of the plurality of channels 30 is parallel to the longitudinal axis 40. In other embodiments, the axis of a first portion of the plurality of channels 30 is parallel to the longitudinal axis 40 and the axis of a second portion of the plurality of channels 30 is skewed relative to the longitudinal axis 40. For example, the axis of the central channel 30' and one or more of (a) the axis of the plurality of channels 30" in inner ring 52 and (b) the axis of the plurality of channels 30" in intermediate ring 54 can be parallel to the longitudinal axis 40, and the axis of the plurality of channels 30" in outer ring 56 can be skewed relative to the longitudinal axis 40.

In cross-section perpendicular to longitudinal axis 40, the body 20 of the fuel monolith 10 has the shape of an ellipse with a first diameter D1 that is different from a second diameter D2 (where the first diameter is perpendicular to the second diameter) resulting in the body 20 of the fuel monolith 10 having an eccentric cylindrical shape, e.g., an eccentric, right cylinder of height H1 with elliptical end surfaces. As an ellipse, the first diameter D1 is the major axis of the ellipse and the second diameter D2 is the minor axis of the ellipse. In exemplary embodiments, the difference in length of the first diameter D1 and the second diameter D2 is from greater than 0.5 mm to 5 mm, alternatively the difference in length is greater than 1.0 mm or greater than 2.5 mm and is less than 2.0 mm or less than 2.5 mm or less than 4.0 mm. In still further alternatives, the difference in length is about 2.0 mm (such as 1.8±0.1 mm, 1.6±0.1 mm, 1.4±0.1 mm, or 1.2±0.1 mm) or about 2.0 mm to about 5.0 mm (such as 4.5±0.1 mm, 4.0±0.1 mm, 3.5±0.1 mm, 3.0±0.1 mm or 2.5±0.1 mm). In exemplary embodiments, the eccentricity of the body 20 of the fuel monolith 10 is greater than zero to 0.6, alternatively greater than zero to 0.4 or greater than zero to 0.15, such as in a range from 0.01, 0.02, 0.05 or 0.10 to 0.6, 0.5, 0.4, 0.3, 0.2, 0.15, 0.10, or 0.05.

The eccentricity of the body 20 of the fuel monolith 10 facilitates alignment of the plurality of channels 30 in the fuel monoliths when the fuel monoliths are stacked together to form the fuel assembly core. In some embodiments, the first diameter D1 is 27 mm and the second diameter D2 is 26 mm, resulting in a 1.0 mm locking feature. In other embodiments, the first diameter D1 is 29.9 mm and the second diameter D2 is 28.9 mm, resulting in a 1.0 mm locking feature. The locking feature functions to maintain alignment of the channels 30 across the plurality of fuel monoliths 10 without the need for other mechanical locking features, such as alignment tubes, trapped spheres in pockets, keyways, or other geometrical locking means. The first diameter D1 and the second diameter D2 can have other sizes, with the difference D1-D2 being the size of the locking feature. As the difference in diameters increases, the strength of the locking feature increases. However, as the difference in diameters decreases less than 1 mm, the alignment of channels 30 between adjacent fuel monoliths 10 is less likely and results in the need for supplemental locking features, such as other mechanical locking features. Examples of suitable sizes for the locking feature are 1.0 mm to 4.0 mm.

In optional embodiments, in cross-section perpendicular to longitudinal axis 40, the body 20 of the fuel monolith 10 has the shape of circle and the fuel monolith 10 has a right cylindrical shape and an eccentricity of zero.

In exemplary embodiments, the fuel monolith 10 has a composition including a fissionable fuel component. One example of a fissionable fuel component is a uranium-based material, such as ZrUC or UC—ZrC—NbC. Other uranium-based materials include $UO_2$, cermet of $UO_2$ and W, UN with W cermet, and $UO_2$ with Mo cermet. In exemplary embodiments, the composition is a solid solution including the fissionable fuel component. In one example, the composition of the fuel monolith 10 includes uranium having a U-235 assay above 5 percent and below 20 percent. Other compositions that can processed by injection molding techniques to form fuel monoliths 10 can also be used.

Figure 1C:
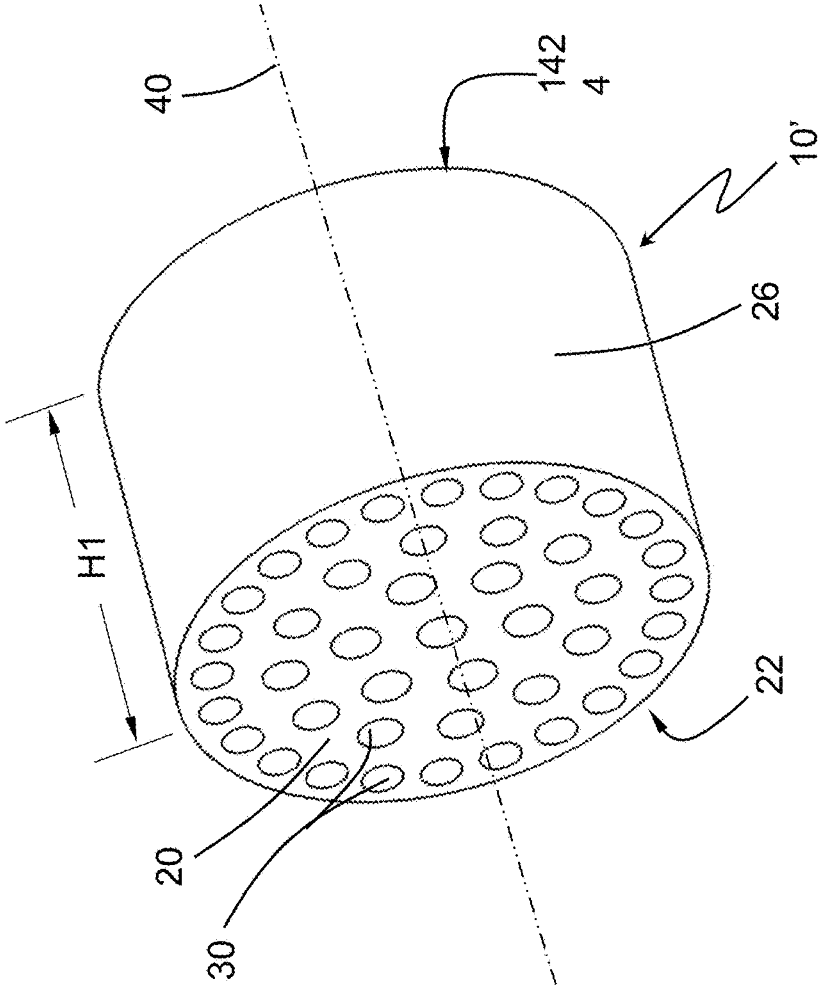
FIGS. 1C-D are a perspective view of another embodiment of a fuel monolith (FIG. 1C) and a view of an end surface of the fuel monolith (FIG. 1D).
Figure 1D:
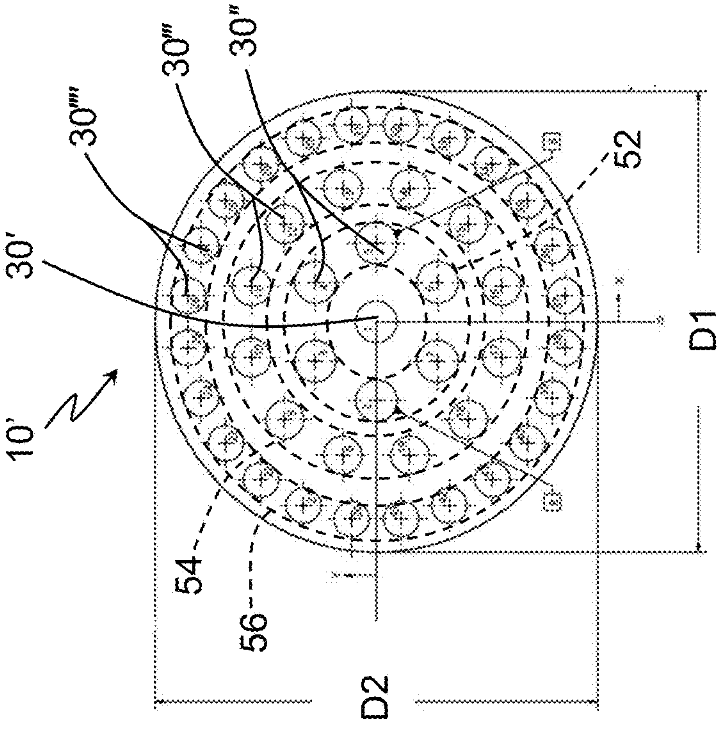

FIG. 1C is a perspective view of another embodiment of a fuel monolith 10' and FIG. 1D is a view of an end surface of the fuel monolith 10'. Fuel monolith 10' and fuel monolith 10 are substantially the same and the disclosure related to fuel monolith 10 is applicable to fuel monolith 10'. Further, similar features are labeled with similar reference numerals. One difference between fuel monolith 10' and fuel monolith 10 is the number and arrangement of channels 30, with fuel monolith 10' having more channels 30" in the outer ring 56 than fuel monolith 10. Another difference between fuel monolith 10' and fuel monolith 10 is the angular rotation and resulting radial alignment of channels 30 in successive rings. Another difference between fuel monolith 10' and fuel monolith 10 is, instead of a single through hole size, the sizes of coolant holes vary, which enhance cooling of the fuel monolith on the exterior surface 26. As used further herein, fuel monolith 10 and fuel monolith 10' are interchangeable and reference to fuel monolith 10 can alternatively be replaced by reference to fuel monolith 10'.

Figures 2A, 2B:
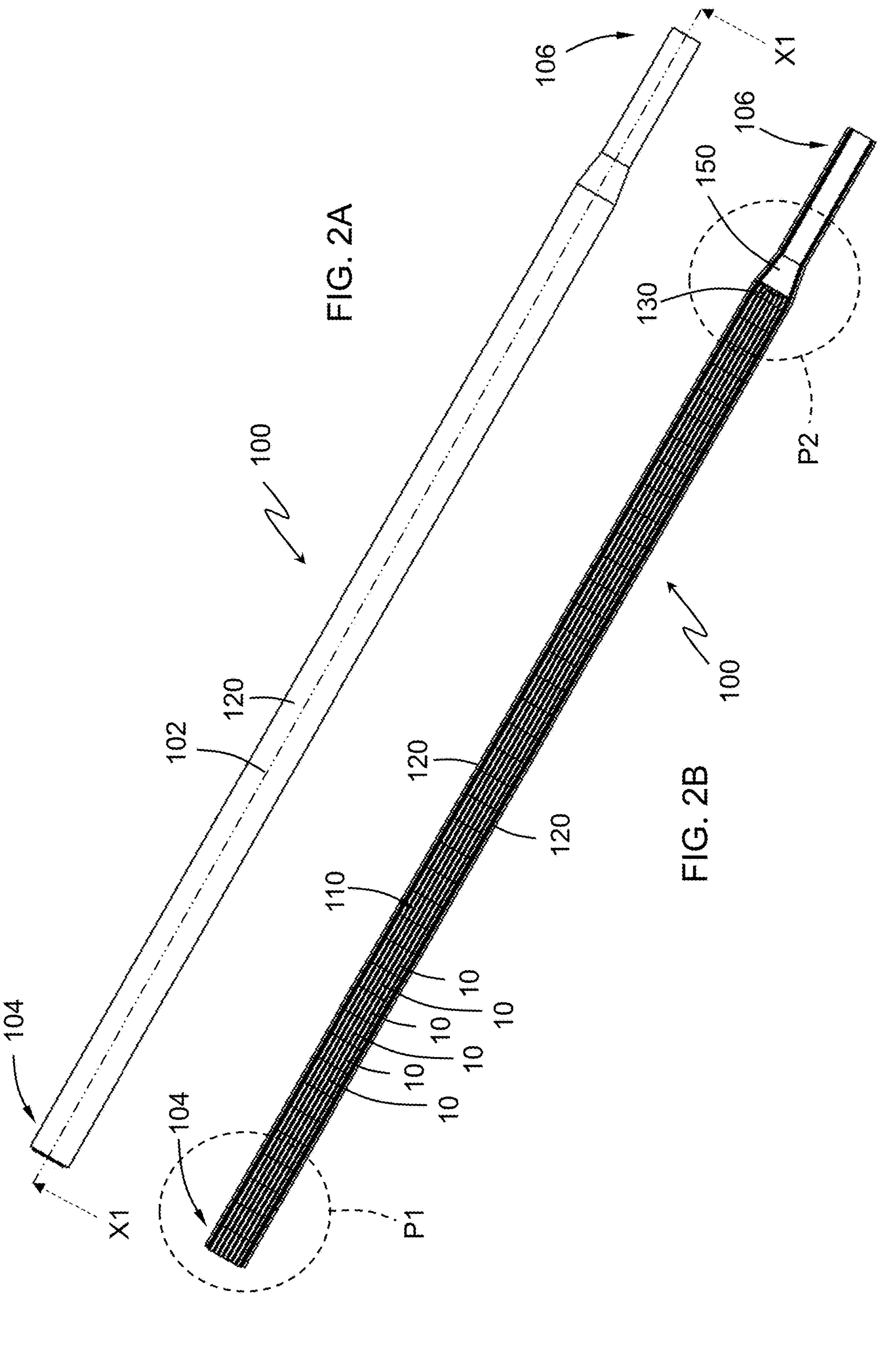
FIG. 2A is a perspective view of an embodiment of an insulated fuel assembly core.
FIG. 2B is a cross-sectional view of the insulated fuel assembly core shown in FIG. 2A taken at X1-X1.

FIG. 2A is a perspective view of an embodiment of an insulated fuel assembly core 100 and FIG. 2B is a cross-sectional view of the insulated fuel assembly core 100 shown in FIG. 2A taken at X1-X1, which coincides with the longitudinal axis 102 of the insulated fuel assembly core 100. The insulated fuel assembly core 100 extends from a first end 104 to second end 106. The first end 104 is an inlet end for propellant gases during operation and the second end 106 is an outlet end for propellant gases during operation. In the insulated fuel assembly core 100, a plurality of fuel monoliths 10 are stacked, end face to end face, to form a fuel assembly core 110. The insulated fuel assembly core 100 further includes one or more outer layers of insulation 120, an exhaust support plate 130, and an exhaust shield assembly 150.

Figure 2C:
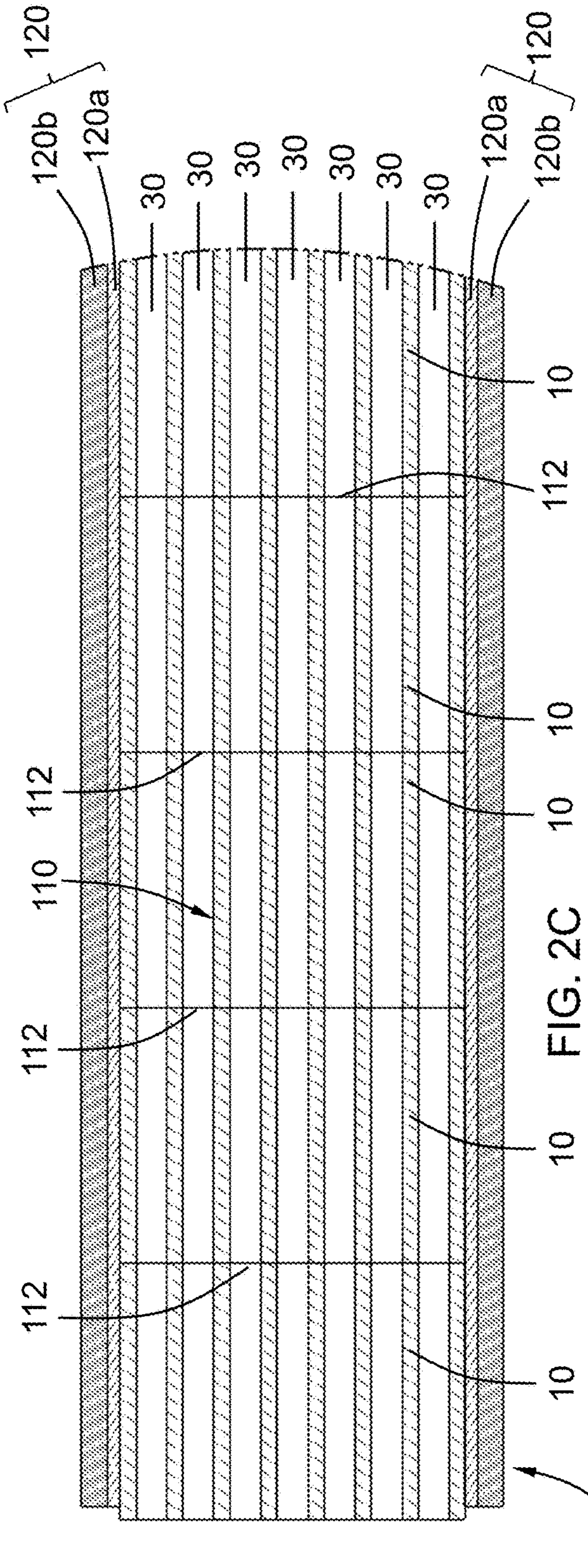
FIG. 2C is a magnified view of the area P1 in FIG. 2B showing, in cross-section, the inlet end of the insulated fuel assembly core.
Figure 2D:
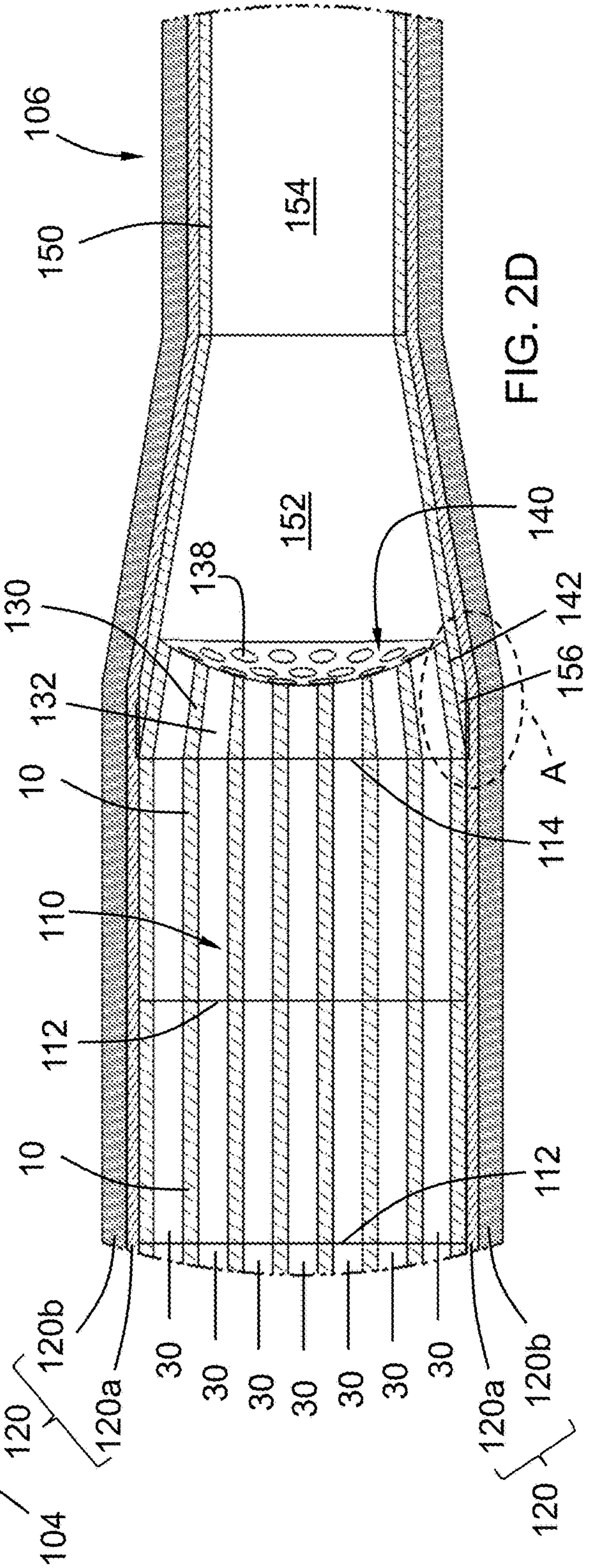
FIG. 2D is a magnified view of the area P2 in FIG. 2B showing, in cross-section, a portion of the exhaust end of the insulated fuel assembly core.

FIG. 2C is a magnified view of the area P1 in FIG. 2B showing, in cross-section, the inlet end of the insulated fuel assembly core 100 and FIG. 2D is a magnified view of the area P2 in FIG. 2B showing, in cross-section, a portion of the exhaust end of the insulated fuel assembly core 100. In both FIGS. 2C and 2D, several fuel monoliths 10 are shown stacked, with end faces abutting each other at respective interfaces 112 and with channels 30 aligned along the axially length of the fuel assembly core 110. Insulation 120 is radially outward of the fuel assembly core 110 and includes an inner insulation layer 120*a* and an outer insulation layer 120*b*. At the second end 106, the exhaust support plate 130 is stacked on the fuel assembly core 110 with an end face of the exhaust support plate 130 abutting the end face of the adjacent fuel monolith 10 at an interface 114, and the exhaust shield assembly 150 is mated to the exhaust support plate 130 (see Region A).

The exhaust support plate 130 includes a plurality of channels 132 that extend through the body of the exhaust support plate 130 from an inlet opening 134 in the first end face 136 to an outlet opening 138 in the second end face 140. The plurality of channels 132 provide a flow path for propellant gas, such as hydrogen, to flow through the exhaust support plate 130 during operation. The inlet openings 134 of the plurality of channels 132 are aligned with the plurality of channels 30 in the fuel monoliths 10 of the fuel assembly core 110 and can be arranged similarly to the arrangement of the plurality of channels 30 in the fuel monoliths 10, such as having the same symmetrical arrangement and/or being arranged in groups of concentric rings with even or uneven circumferential and/or radial distribution. The first end face 136 of the exhaust support plate 130 is planar to facilitate abutting to the end face of the adjacent fuel monolith 10 and the second end face 140 of the exhaust support plate 130 is concave to facilitate directing the flow of propellant gas exiting the outlet openings 138.

The exhaust support plate 130 is formed from a material with good corrosion resistance to the exhausting propellant gas. Both chemical corrosion and wear corrosion resistance are preferred. An example material for the exhaust support plate 130 is tungsten or a tungsten-based alloy or a W—Re alloys (for example, with a Re content between 3-50 wt %) or a carbide-based material, such as ZrC. In some example materials for the exhaust support plate 130, the material can be dispersion strengthened with carbides and oxides, for example, HfC, $ThO_2$, and/or $La_2O_3$.

In exemplary embodiments, the exhaust shield assembly 150 includes a truncated conical section 152 and a tubular section 154. In exemplary embodiments, the truncated conical section 152 of the exhaust shield assembly 150 transitions from an elliptical shape at a first end (so as to mate to the elliptical shape of the eccentric cylindrical shape of the fuel monoliths 10 and exhaust support plate 130) to a circular shape at a second end, where the truncated conical section 152 is attached to the tubular section 154.

Region A in FIG. 2D shows the conical section 152 of the exhaust shield assembly 150 mated to the exhaust support plate 130. The circumferential surface 142 of the exhaust support plate 130 is tapered and the inner diameter surface of the conical section 152 of the exhaust shield assembly 150 is correspondingly tapered to provide a contact area between the circumferential surface 142 and the inner diameter surface of the conical section 152. In Region A, a wall thickness is tapered so that the outer diameter surface of the end portion 156 of the exhaust shield assembly 150 is aligned with, e.g., at the same radial distance as, the circumferential surface of the fuel assembly core 110. This feature results in the size of the outer diameter surface of the fuel assembly core 110 being maintained past the interface 114, which can reduce a potential stress point in the insulation 120 in that location.

The exhaust shield assembly 150 is formed from a material with good corrosion resistance to the exhausting propellant gas. Both chemical corrosion and wear corrosion resistance are preferred. An example material for the exhaust shield assembly 150 is tungsten or a tungsten-based alloy or a W—Re alloys (for example, with a Re content between 3-50 wt %) or a carbide-based material, such as ZrC. In some example materials for the exhaust support plate 130, the material can be dispersion strengthened with carbides and oxides, for example, HfC, $ThO_2$, and/or $La_2O_3$.

In alternative embodiments, the transition from the eccentric cylindrical shape of the fuel monoliths 10 to a circular shape can occur in the exhaust support plate 130, with the first end face 136 of the exhaust support plate 130 having the elliptical shape of the eccentric cylindrical shape of the fuel monoliths 10 and the second end face 140 of the exhaust support plate 130 being circular shaped.

Figures 3A, 3B:
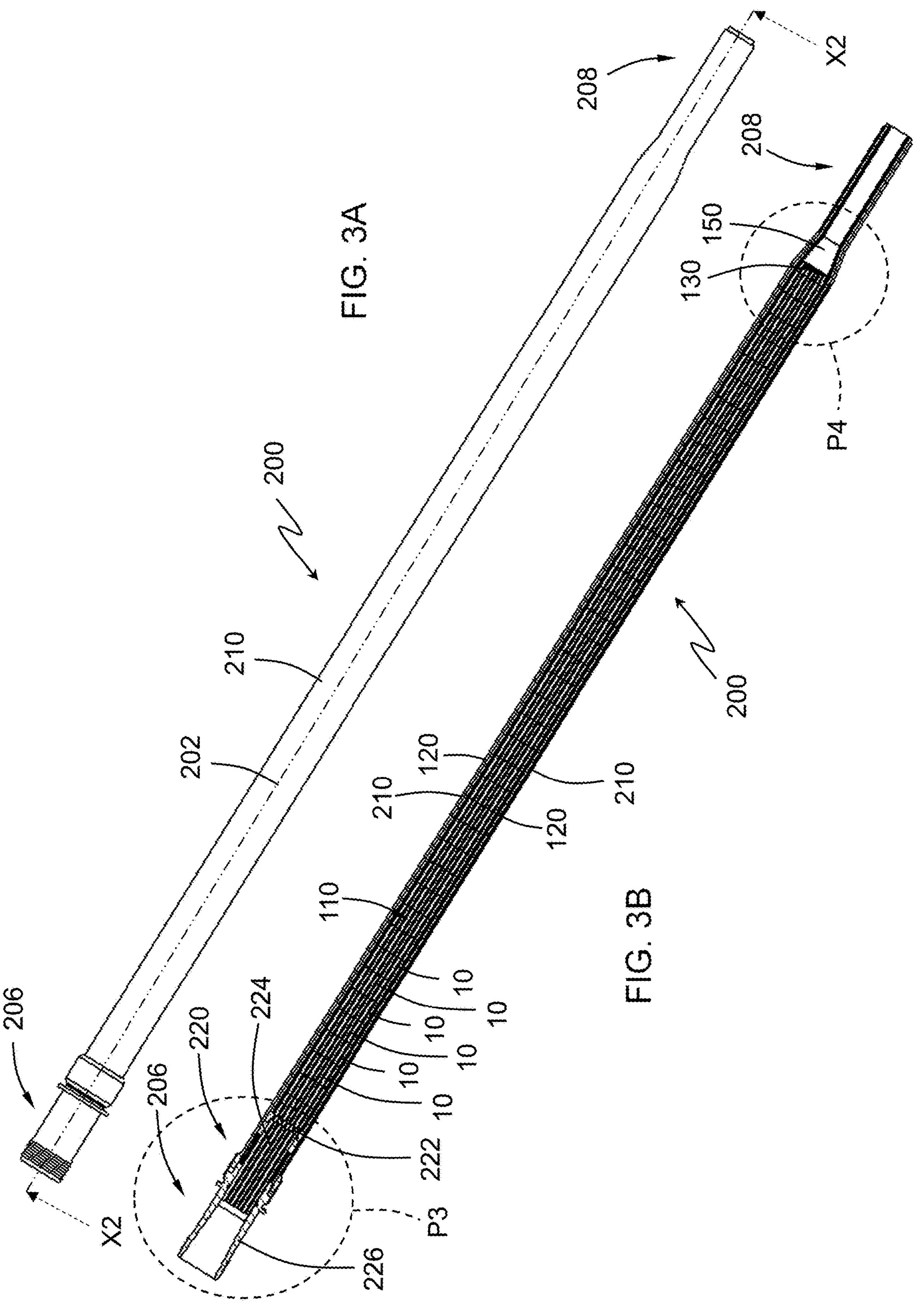
FIG. 3A is a perspective view of an embodiment of a fuel assembly.
FIG. 3B is a cross-sectional view of the fuel assembly shown in FIG. 3A taken at X2-X2.

FIG. 3A is a perspective view of an embodiment of a fuel assembly 200 and FIG. 3B is a cross-sectional view of the fuel assembly 200 shown in FIG. 3A taken at X2-X2, which coincides with the longitudinal axis 202 of the fuel assembly 200. The fuel assembly 200 includes an insulated fuel assembly core 100 within a fuel assembly outer structure 210 and extends from a first end 206 to second end 208. The first end 206 is an inlet end for propellant gases during operation and the second end 208 is an outlet end for propellant gases during operation.

Figure 3C:
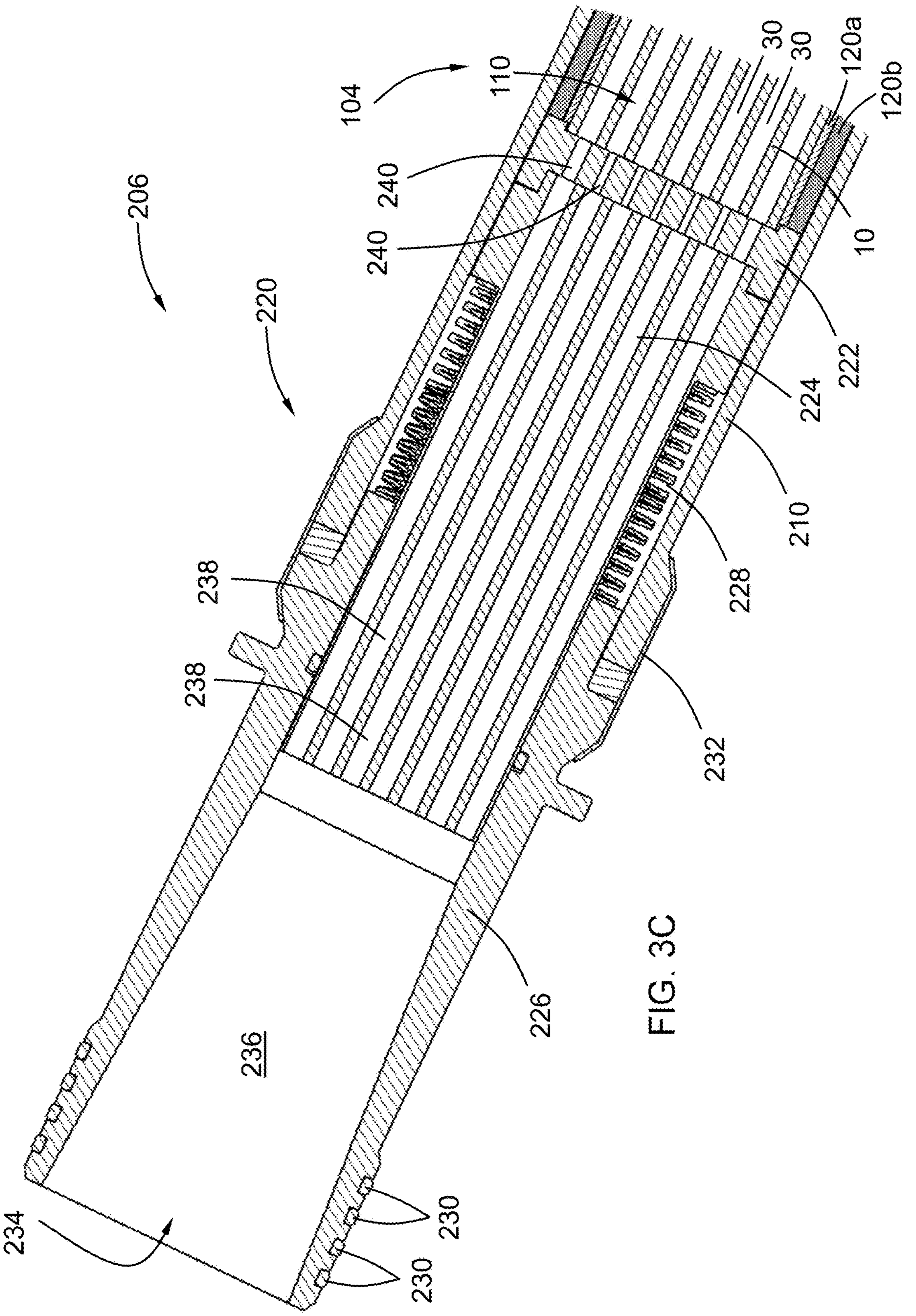
FIG. 3C is a magnified view of the area P3 in FIG. 3B showing, in cross-section, the inlet end of the fuel assembly.

FIG. 3C is a magnified view of the area P3 in FIG. 3B showing, in cross-section, the first end 206 of the fuel assembly 200. At the first end 206, the fuel assembly 200 includes an inlet connection assembly 220. The inlet connection assembly 220 includes an orifice plate 222, a flow stabilizer 224, an inlet housing 226, a biasing element 228, and seals 230. The inlet connection assembly 220 is mated to the fuel assembly outer structure 210 by, for example, crimp 232. During operation, propellant gases enter the inlet connection assembly 220 through opening 234, pass through flow stabilizer 224 and orifice plate 222, and enter into the insulated fuel assembly core 100. The channels 238 in the flow stabilizer 224 and the openings 240 in the orifice plate 222 are aligned with the channels 30 in the fuel monoliths 10 in the insulated fuel assembly core 100. In the upper volume 236 of the inlet housing 226, the flow of the propellant gases is turbulent and the channels 238 in the flow stabilizer 224 and the openings 240 in the orifice plate 222 reduce the turbulent flow of the propellant gases before the propellant gases enter the insulated fuel assembly core 100. The biasing element 228, such as a spring, accommodates changes in the axial dimension of the insulated fuel assembly core 100, such as from thermal expansion. The biasing element 228 is located in a slot in inlet housing 226 and the body of the inlet housing 226 shields the biasing element 228 from the propellant gases flowing through the inlet connection assembly 220.

Figure 3D:
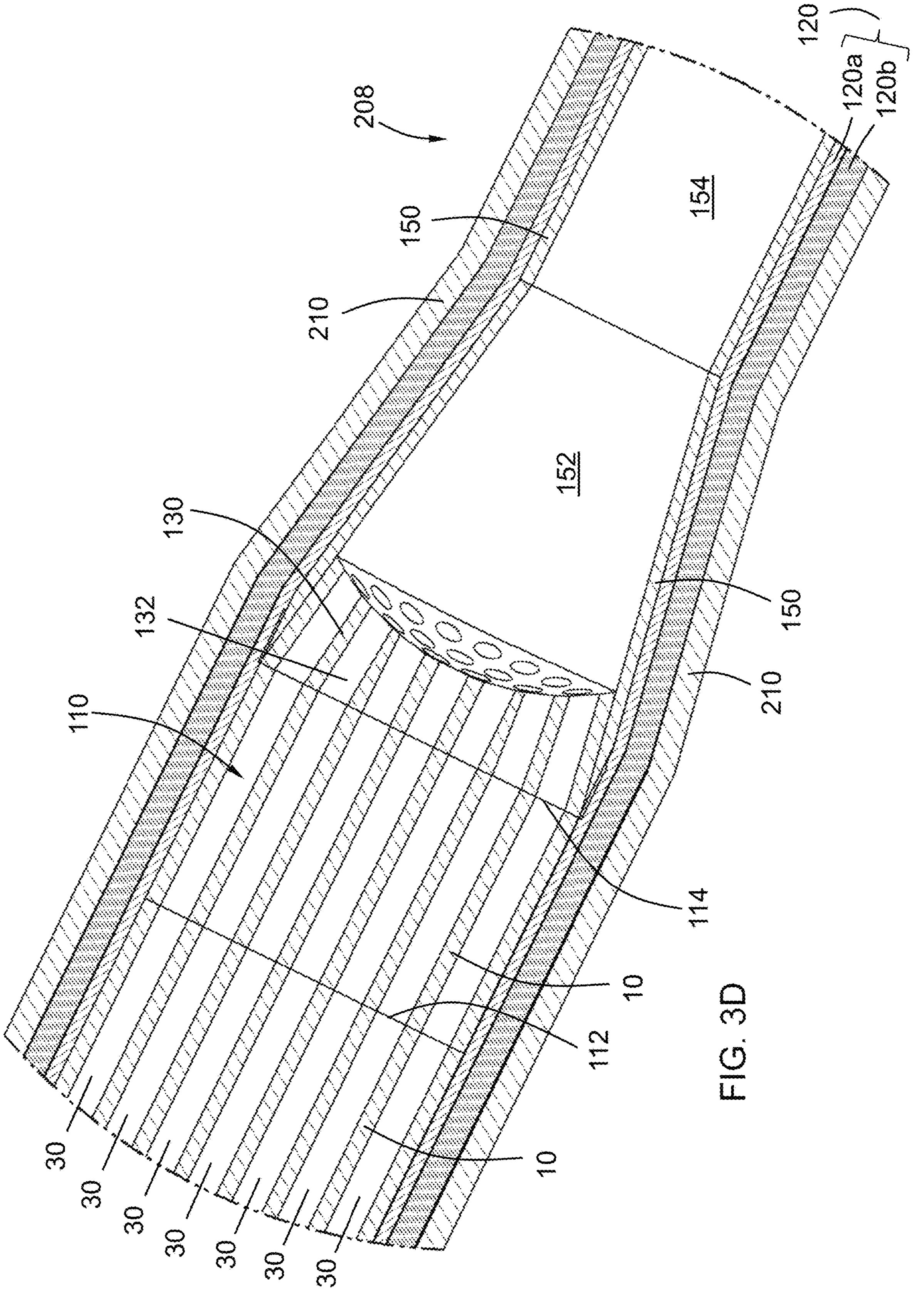
FIG. 3D is a magnified view of the area P4 in FIG. 3B showing, in cross-section, a portion of the exhaust end of the fuel assembly.

FIG. 3D is a magnified view of the area P4 in FIG. 3B showing, in cross-section, a portion of the second end 208 of the fuel assembly 200. The structures and features of the portion of the second end 208 of the fuel assembly 200 shown in FIG. 3D are the same as those shown and described in connection with the portion of the exhaust end of the insulated fuel assembly core 100 shown in FIG. 2D, with the addition of the fuel assembly outer structure 210, which is outward of the insulation 120.

It should be noted that truncated conical section 152 and tubular section 154 can be manufactured as separate pieces and joined, for example, by welding. However, welding can leave a seam joint between the two pieces. Alternatively, the truncated conical section 152 and tubular section 154 can be manufactured as a unitary structure, such as by additive manufacturing or by machining, for example by sinker electrical discharge machining (EDM) manufacturing from a billet so that there is no welded seam joint between the two pieces.

Figure 4:
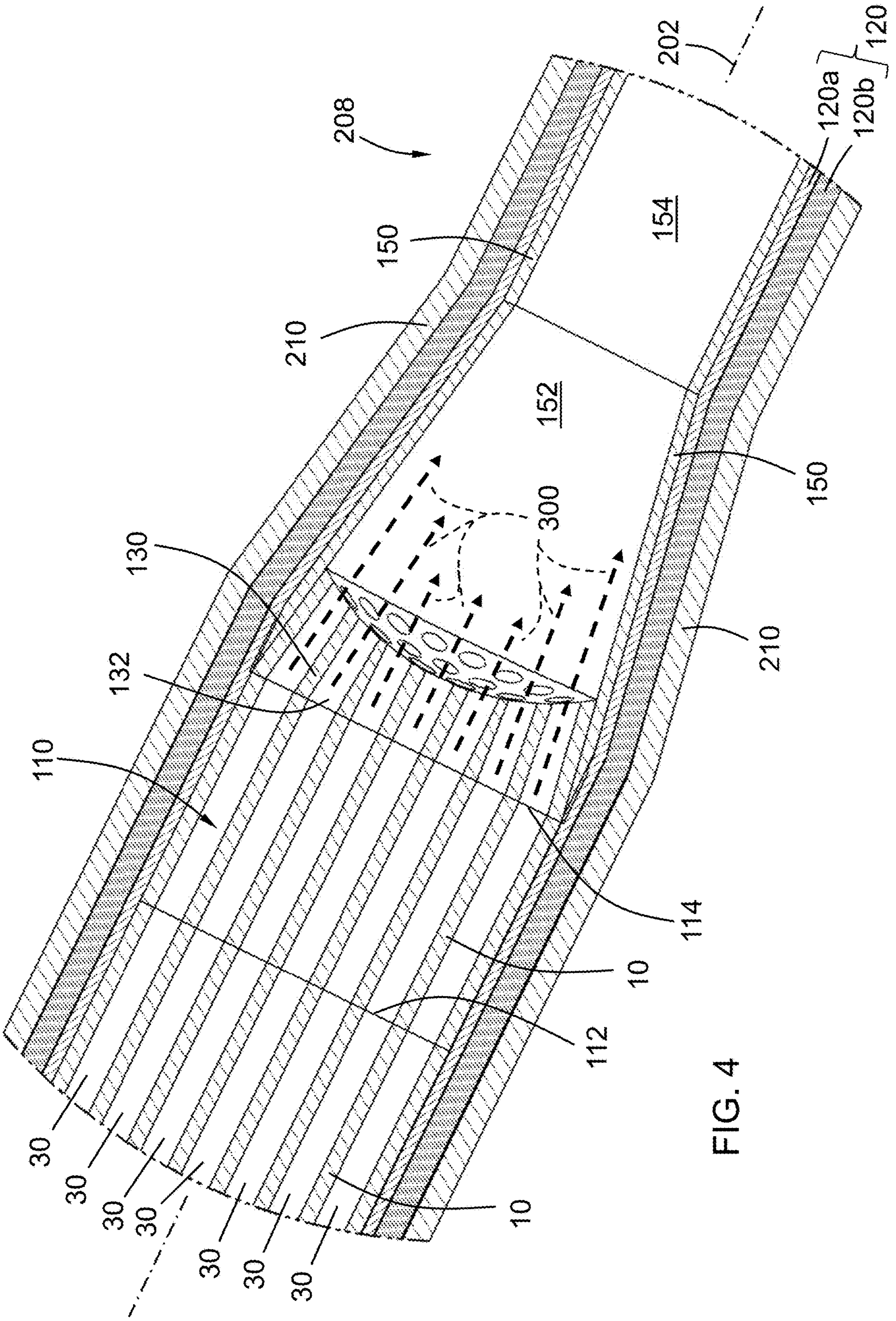
FIG. 4 is a cross-section of a portion of the exhaust end of the fuel assembly annotated to illustrate the flow through the exhaust support plate.

FIG. 4 is a cross-section of a portion of the exhaust end 206 of the fuel assembly 200 annotated to illustrate the flow 300 through the channels 132 of the exhaust support plate 130. As described further herein, the axes of channels 132 at a periphery region of the exhaust support plate 130 are angled relative to the longitudinal axis 202 of fuel assembly 200 and flow 300 through these angled channels 132 is also angled relative to the longitudinal axis 202 of fuel assembly 200 and are sufficiently angled to avoid impingement of the flow against the inner surface of the exhaust shield assembly 150, particularly in the truncated conical section 152. In exemplary embodiments, the flow 300 through the angled channels 132 is parallel to the interior surface of the truncated conical section 152. Also as described further herein, the axes of channels 132 at the central region of the exhaust support plate 132 are parallel to the longitudinal axis 202 of fuel assembly 200, and flow 300 through these non-angled channels is also parallel to the longitudinal axis 202 of fuel assembly 200.

Figure 5:
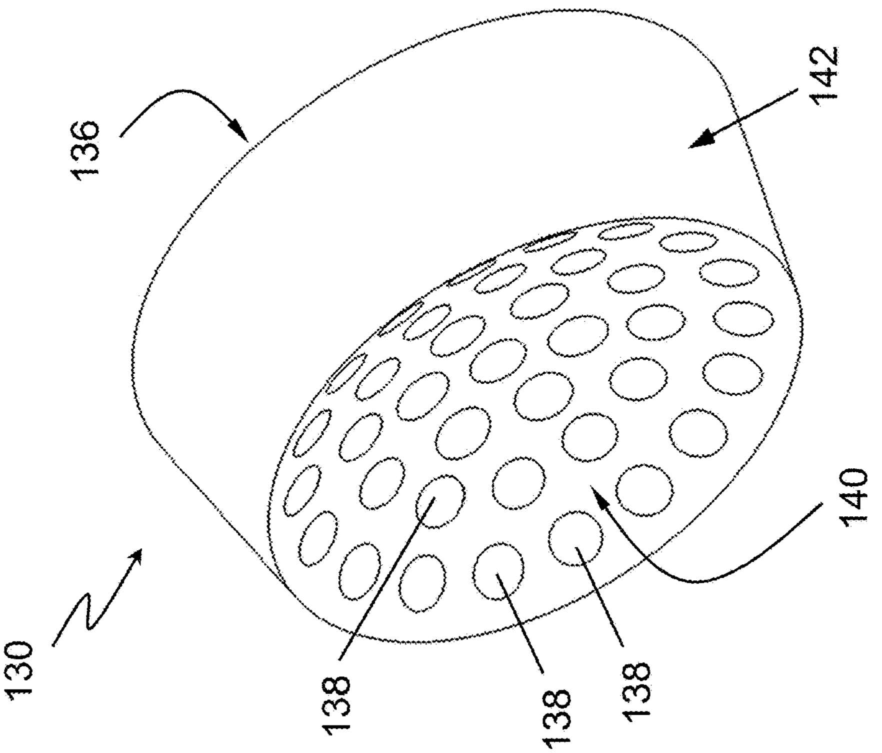
FIG. 5 is a perspective view of an embodiment of an exhaust support plate.
Figure 6B:
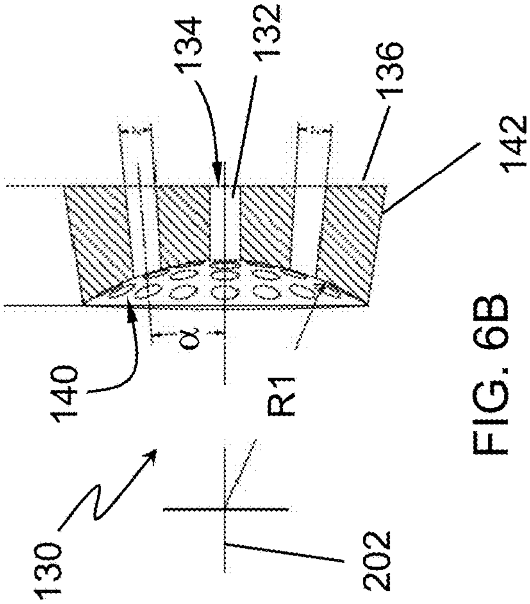
FIGS. 6A-C are an end view (FIG. 6A), a first cross-sectional view (FIG. 6B) and a second cross-sectional view (FIG. 6C) of the exhaust support plate shown in FIG. 5.
Figure 6A:
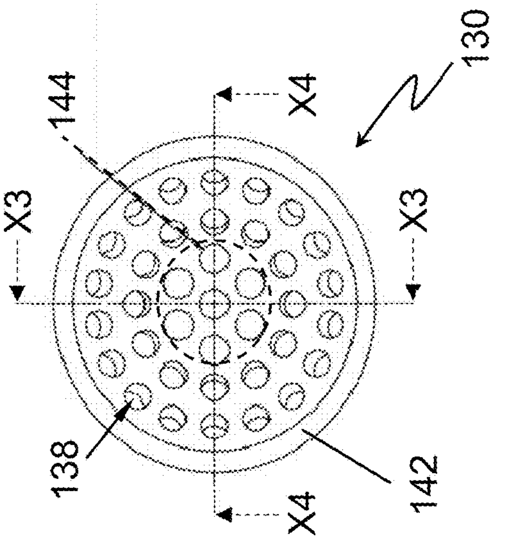
Figure 6C:
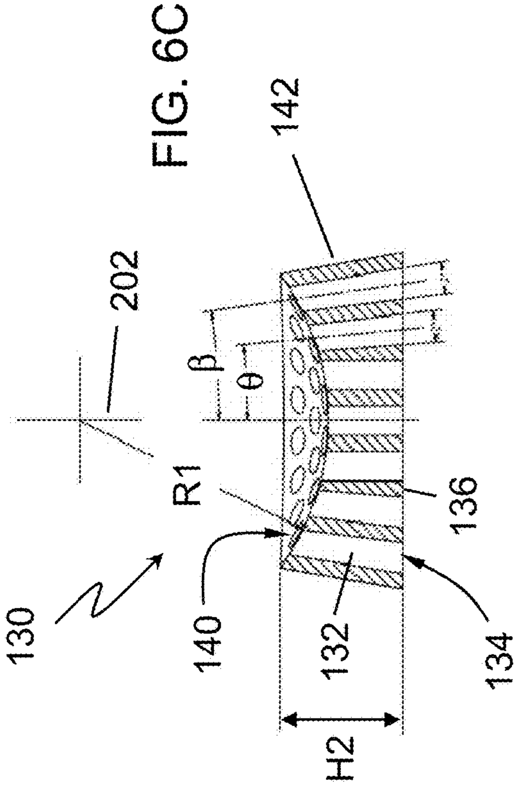

FIG. 5 is a perspective view of an embodiment of an exhaust support plate 130 and FIGS. 6A-C are an end view (FIG. 6A), a first cross-sectional view (FIG. 6B) and a second cross-sectional view (FIG. 6C) of the exhaust support plate 130 shown in FIG. 5 showing various features disclosed herein. The angled channels and non-angled channels are observable in FIGS. 6A-C. For example, in FIG. 6A, the channels 132 in central region 144 have axes parallel to the longitudinal axis 202 of fuel assembly 200 and, in the plan view of the second end face 140, the inlet opening 134 and outlet opening 136 are aligned and, when viewed in a direction along the longitudinal axis 202, one can see straight through these parallel channels 132. In contrast, the channels 132 in the periphery region, i.e., radially outward from the central region 144, have axes angled relative to the longitudinal axis 202 of fuel assembly 200 and, in the plan view of the second end face 140, the inlet opening 134 and outlet opening 136 are misaligned and, when viewed in a direction along the longitudinal axis 202, one sees the inner surfaces of these non-parallel channels 132.

FIG. 6B is a cross-sectional view of the exhaust support plate 130 shown in FIG. 6A taken at X3-X3, which coincides with a first diameter of exhaust support plate 130, such as the minor diameter in the case where the exhaust support plate 130 has an elliptical shape to correspond to the eccentric cylinder shape of the fuel monoliths 10. The second end face 140 is concave and the surface is on a radius R1. The cross-section in FIG. 6B includes three channels 132. The axis of the central channel is a located to be coincident to the longitudinal axis 102 of the insulated fuel assembly core 100 and is a parallel channel. Two channels are outward from the central channel, and each have an axis that is oriented relative to the longitudinal axis 202 at an angle $\alpha$.

FIG. 6C is a cross-sectional view of the exhaust support plate 130 shown in FIG. 6A taken at X4-X4, which coincides with a second diameter of exhaust support plate 130, such as the major diameter in the case where the exhaust support plate 130 has an elliptical shape to correspond to the eccentric cylinder shape of the fuel monoliths 10. The first diameter along X3-X3 is perpendicular to the second diameter along X4-X4. The cross-section in FIG. 6C includes seven channels 132. The central three channels in include the central channel with its axis located to be coincident to the longitudinal axis 102 of the insulated fuel assembly core 100 and two channels outward of the central channel with their axes parallel to the longitudinal axis 102. Each of these three channels are a parallel channel. Outward from the parallel channels are non-parallel channels. There are two non-parallel channels to each side of the parallel channels and in each grouping of two, a first non-parallel channel has an axis that is oriented relative to the longitudinal axis 202 at an angle $\theta$ and a second non-parallel channel has an axis that is oriented relative to the longitudinal axis 202 at an angle $\beta$. The first non-parallel channel is radially inward relative to the second non-parallel channel.

In exemplary embodiments, R1 ranges from 10 mm to 50 mm (although the second end face 140 can optionally be planar with no radius), angle $\alpha$ ranges from 0 degrees to 20 degrees (such as 4 to 5 degrees, or 8 to 10 degrees), angle $\theta$ ranges from 0 degrees to 20 degrees (such as 4 to 6 degrees, or 8 to 12 degrees), angle $\beta$ ranges from 0 degrees to 20 degrees (such as 6 to 10 degrees, or 10 to 15 degrees), and H2 (the height of the exhaust support plate 130) ranges from 5 mm to 50 mm (such as 12 to 20 mm). In some embodiments, $\alpha<\theta<\beta$, such as $\alpha$=4.6 degrees, $\theta$=5.4 degrees, and $\beta$=8 degrees.

Although the central region 144 is shown in FIGS. 6A-C as consisting of the central channel and the first ring of channels and the periphery region is shown as consisting of the second ring of channels and third ring of channels, the boundary between the central region and the peripheral region and which channels or rings of channels are in each region can vary based on the design of the insulated fuel assembly core.

FIGS. 6D-L include end views (FIGS. 6D and 6I), and various cross-sectional views (FIGS. 6E-H and J-L) of an alternative embodiment of an exhaust support plate 130'. The alternative embodiment of the exhaust support plate 130' is substantially similar to the exhaust support plate 130 shown and described herein, and the disclosure related to exhaust support plate 130 is applicable to exhaust support plate 130'. Further, similar features are labeled with similar reference numerals. Differences between exhaust support plate 130 and the alternative embodiment of the exhaust support plate 130' include the number and arrangement (both radial and circumferential) of the channels 132' and the longitudinal orientation of the channels 132', i.e., angle of the centerline of the channel 132' relative to the centerline of the center channel 132'.

Figures 6D, 6E, 6F, 6G, 6H:
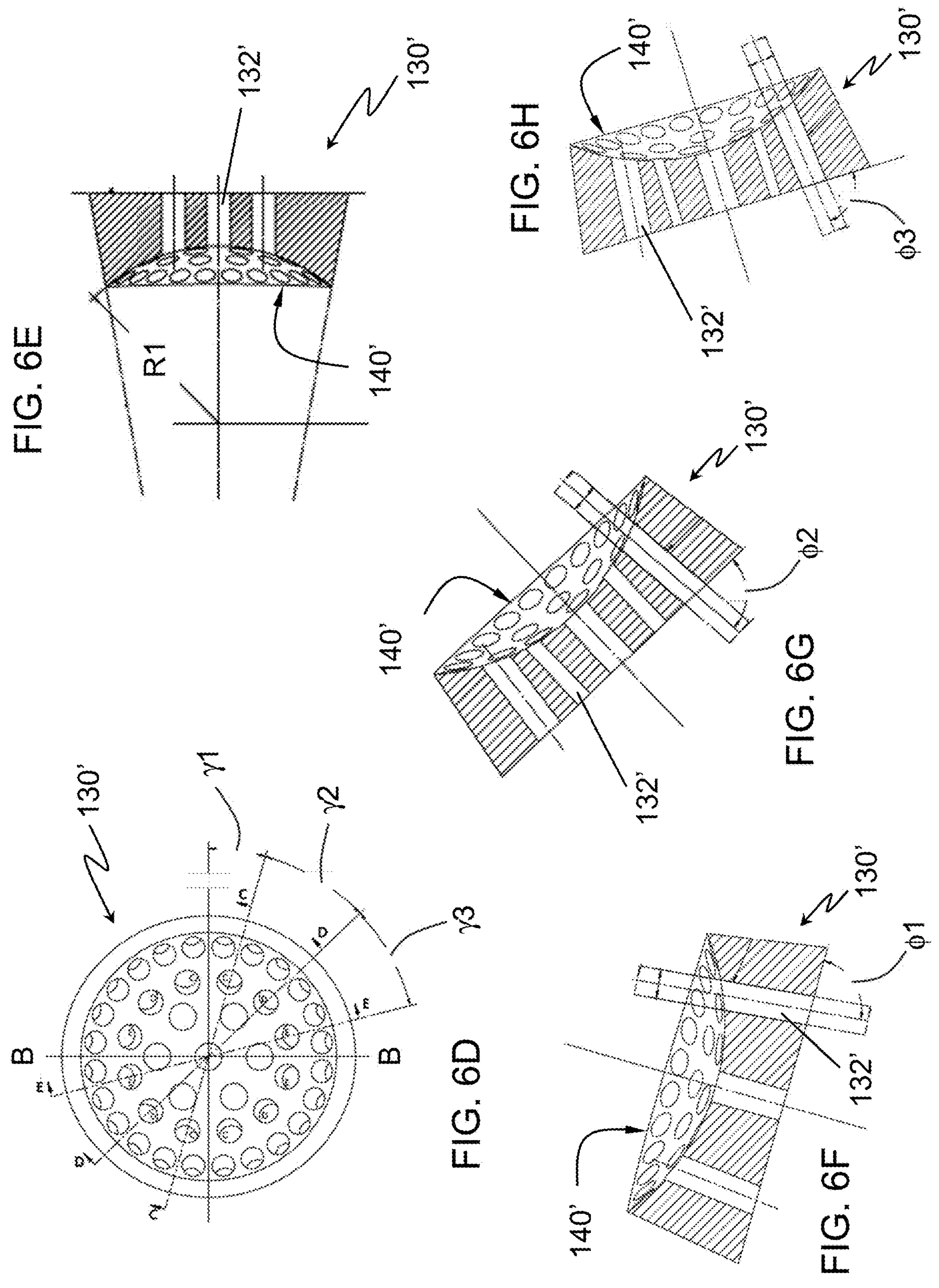
FIGS. 6D-L include end views (FIGS. 6D and 6I), and various cross-sectional views (FIGS. 6E-H and J-L) of an alternative embodiment of an exhaust support plate.
Figure 6L:
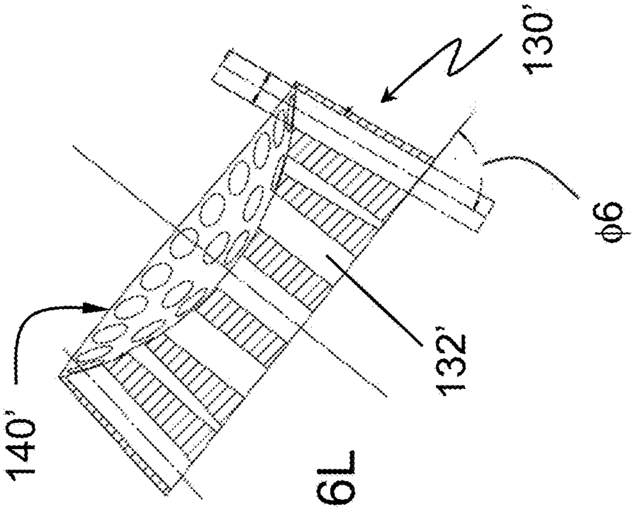
Figure 6I:
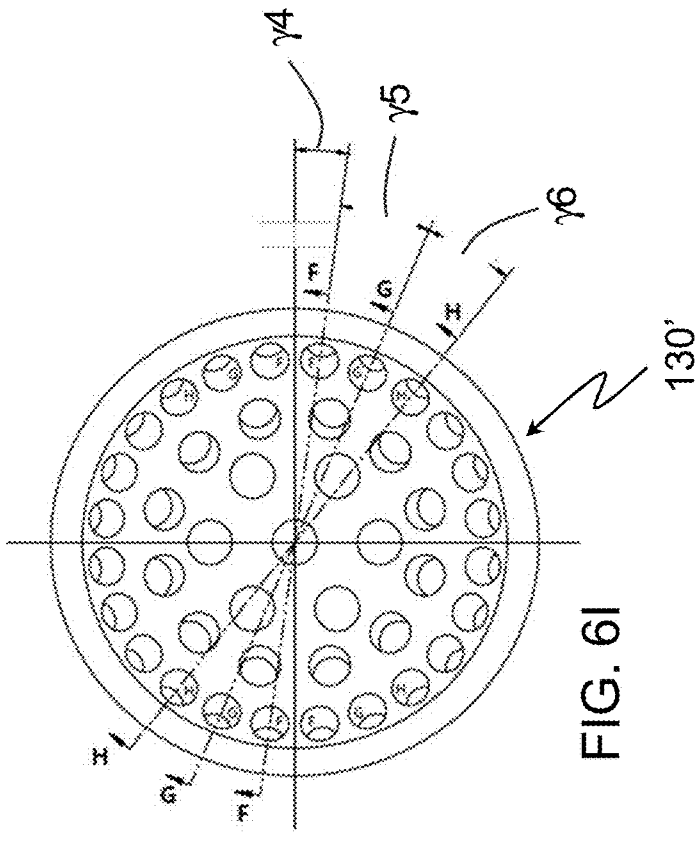
Figure 6K:
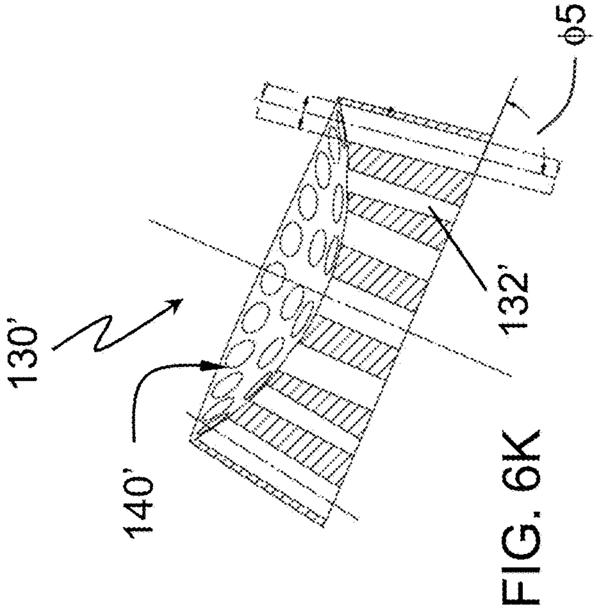
Figure 6J:
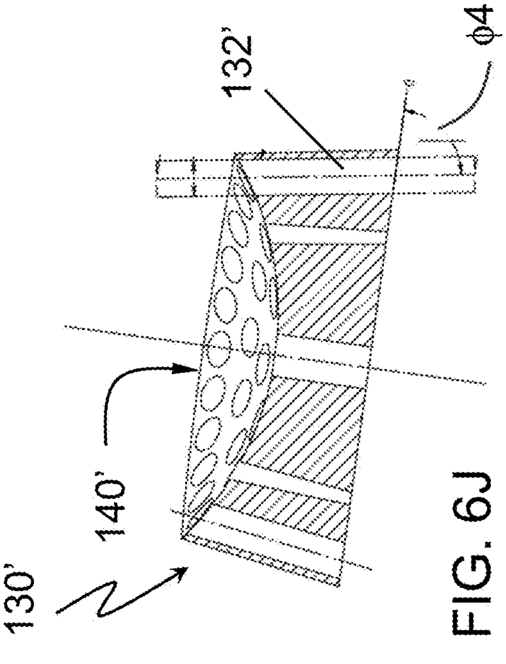

Details of the position and orientation of the channels 132' are shown in the various cross-sectional views in correspond to the annotated cross-sections as follows: For the cross-sections in FIGS. 6D-L, in which: FIG. 6E corresponds to Section B-B; FIG. 6F corresponds to Section C-C; FIG. 6G corresponds to Section D-D; and FIG. 6H corresponds to Section E-E. For the cross-sections in FIG. 6I, FIG. 6J corresponds to Section F-F; FIG. 6K corresponds to Section G-G; and FIG. 6L corresponds to Section H-H.

In general, the various angles shown and labeled in FIGS. 6D to 6L are as set forth in the following Tables 1 and 2.

TABLE 1

| | Angle | | | | | | |
|---|---|---|---|---|---|---|---|
| | R1 | $\gamma 1$ | $\gamma 2$ | $\gamma 3$ | $\gamma 4$ | $\gamma 5$ | $\gamma 6$ |
| Value (degrees) | 20 | 15.844 | 30.802 | 29.157 | 7.799 | 15.513 | 15.287 |

TABLE 2

| | Angle | | | | | |
|---|---|---|---|---|---|---|
| | $\phi 1$ | $\phi 2$ | $\phi 3$ | $\phi 4$ | $\phi 5$ | $\phi 6$ |
| Value (degrees) | 84.099 | 83.947 | 83.8 | 81.281 | 81.403 | 81.358 |

The angles orient the channels 132, 132' so that they are essentially parallel to the face of the elliptical loft forming the circumferential surface 142 of the exhaust support plate 130, e.g., within ±5 degrees of parallel, alternatively within ±1 degree of parallel. This angle is such that the openings of the channels 132,132' on the second end face 140, i.e., the surface formed by R1, do not intersect with each other. The positions of inlet openings 134 of the channels are located so that the inlet openings 134 line up with the channels 30 in the fuel monolith 10.

The exhaust shield assembly 150 can be formed from separate parts joined together or can be formed as a unitary part. For example, a truncated conical section 152 and a tubular section 154 can be formed separately and joined tougher, for example, by resistance welding. Alternatively, a unitary exhaust shield assembly 150' can have a truncated conical section 152' and a tubular section 154' that are formed as a singular part, which eliminates the welding joint.

Figure 7:
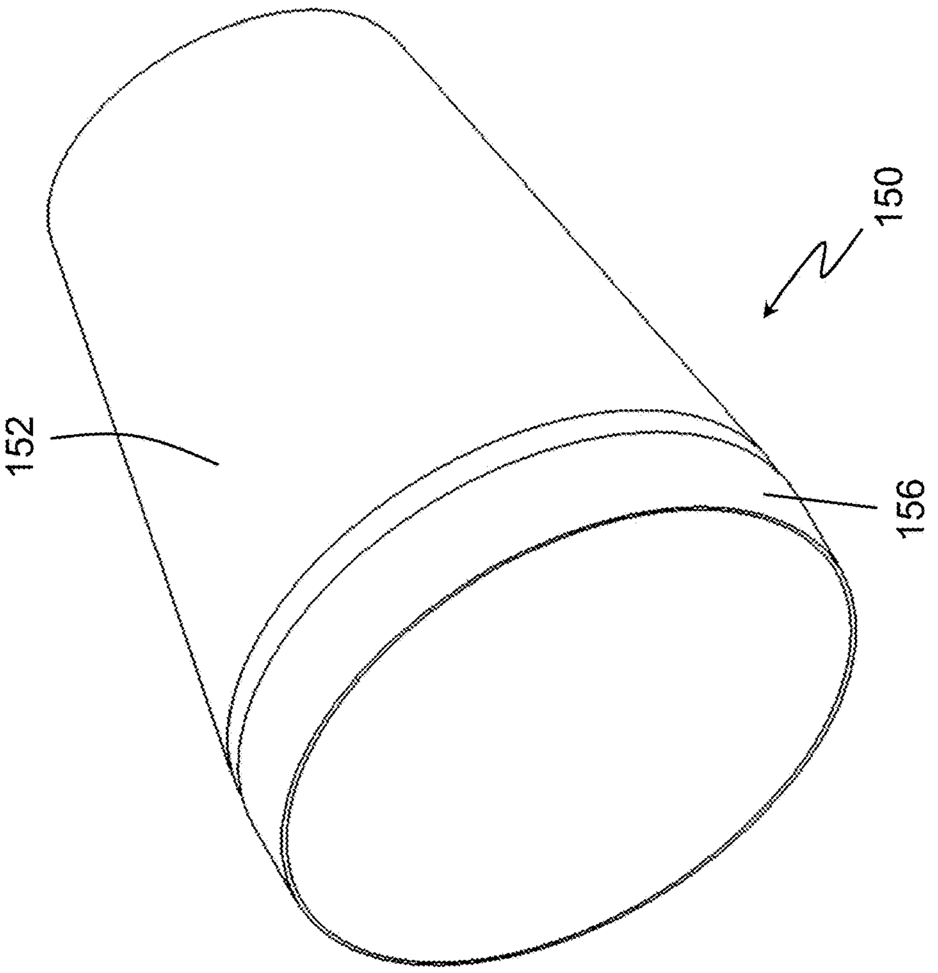
FIG. 7 is a perspective view of an embodiment of the truncated conical section of an exhaust shield assembly.
Figure 8B:
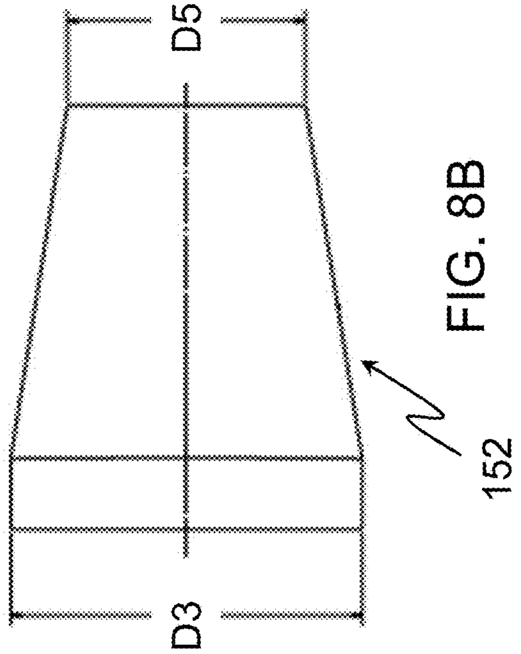
FIGS. 8A-C are an end view (FIG. 8A), a side view (FIG. 8B), and a cross-sectional view (FIG. 8C) of the truncated conical section of an exhaust shield assembly shown in FIG. 7.
Figure 8A:
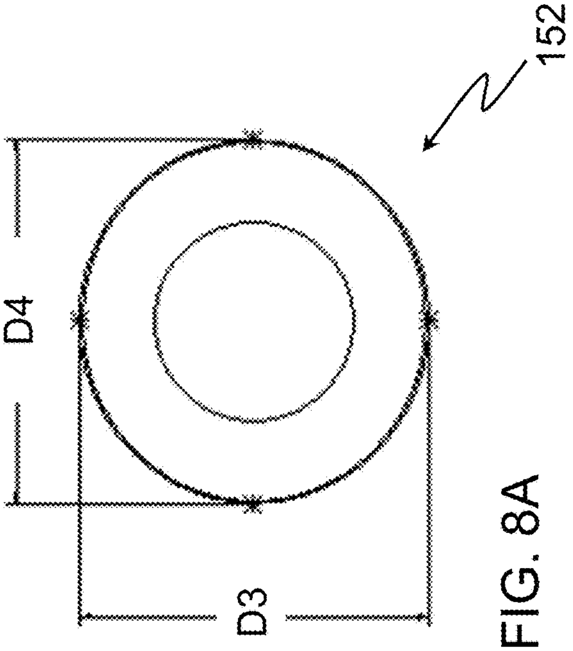
Figure 8C:
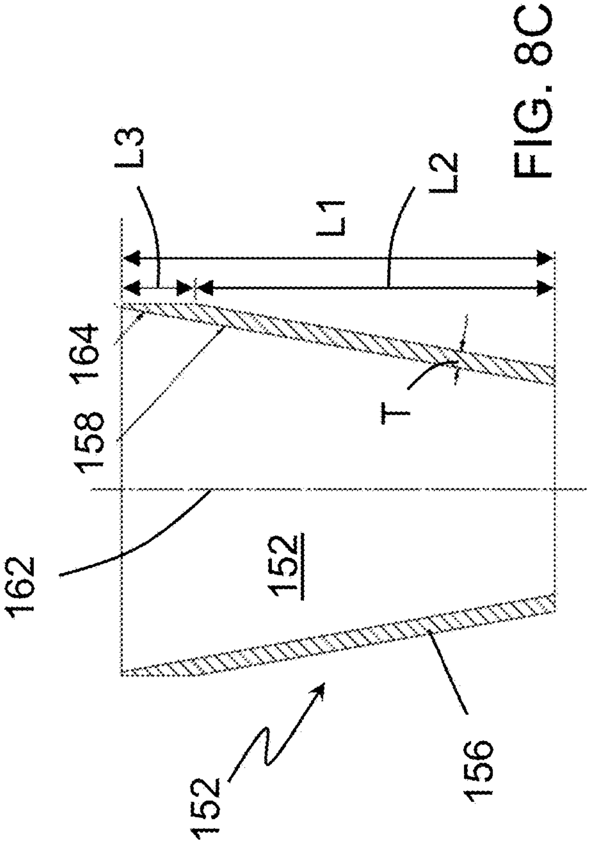

FIG. 7 is a perspective view of an embodiment of the truncated conical section 152 of an exhaust shield assembly 150 showing various features disclosed herein and FIGS. 8A-C are an end view (FIG. 8A), a side view (FIG. 8B), and a cross-sectional view (FIG. 8C) of the truncated conical section 152 shown in FIG. 7. In the case where the first end of the truncated conical section 152 is being attached to an exhaust support plate 130, the exhaust support plate 130 has a corresponding elliptical shape with a first diameter (D3) that is less than a second diameter (D4). The second end of the truncated conical section 152 has a third diameter D5, and diameter D5 is less than diameter D3. The exhaust shield assembly 150 has an overall length L1, and has two longitudinal sections: a first longitudinal section 158 that has an exterior surface that is angled relative to the longitudinal centerline 162, a constant thickness T, and a length L2; and a second longitudinal section 164 that has an exterior surface that is parallel relative to the longitudinal centerline 160, a tapered thickness, and a length L3. Length L3 is less than length L2.

Figure 8E:
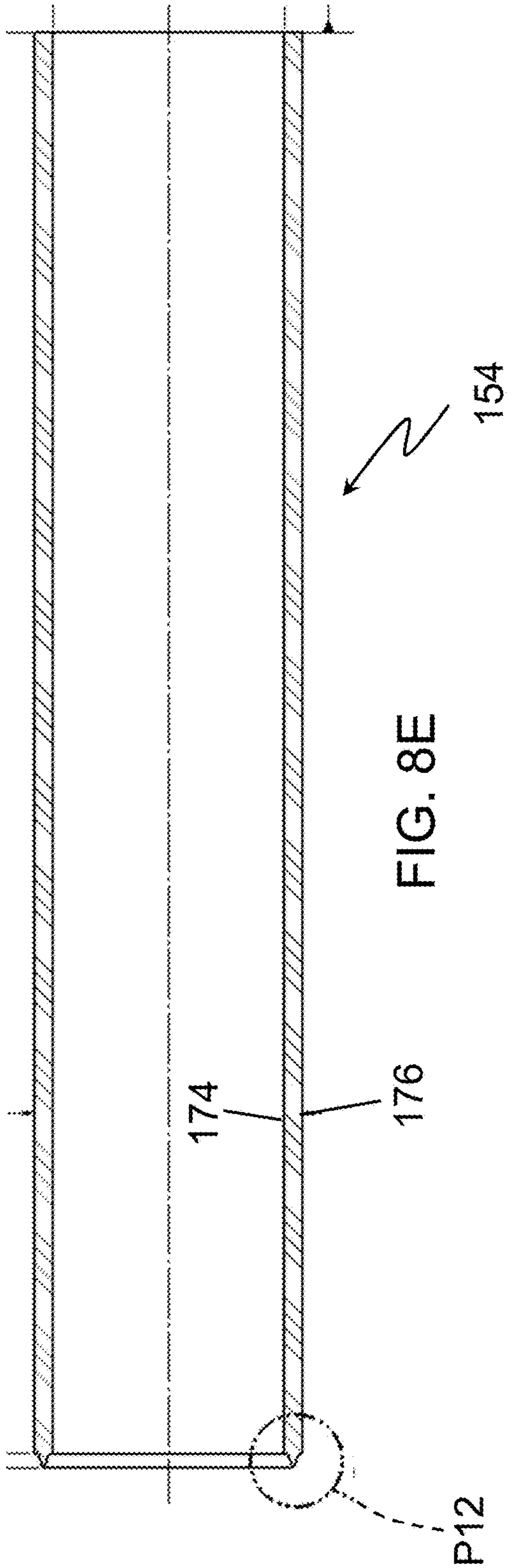
FIGS. 8D-E are a perspective view (FIG. 8D) and a longitudinal, cross-sectional view (FIG. 8E) of an embodiment of a tubular section of an exhaust shield assembly.
Figure 8D:
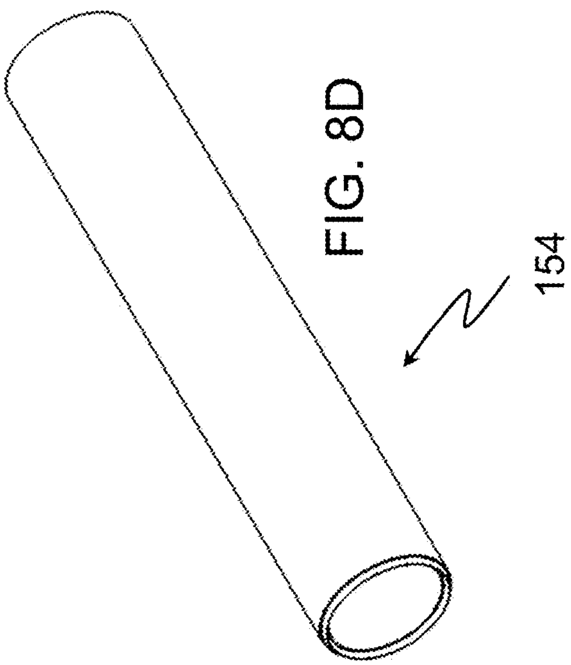
Figure 8F:
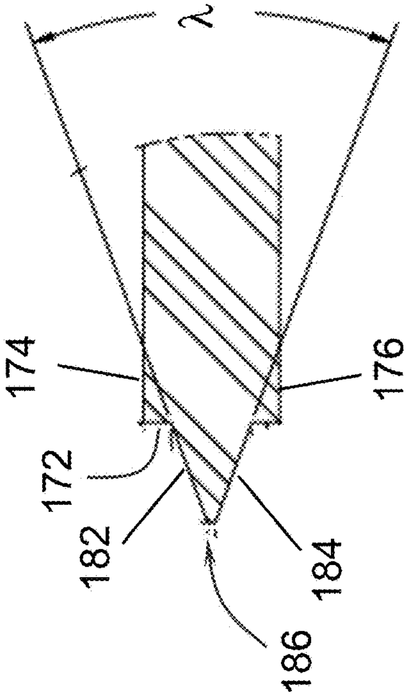
FIG. 8F is a magnified view of the area P12 in FIG. 8E.

FIGS. 8D-E are a perspective view (FIG. 8D) and a longitudinal, cross-sectional view (FIG. 8E) of an embodiment of a tubular section 154. In this embodiment, the tubular section 154 has a constant inner diameter and outer diameter along the entire length. FIG. 8F is a magnified view of the area P12 in FIG. 8E showing, in cross-section, the end surfaces at the inlet end of the tubular section 154. The end face 172 joins the inner surface 174 and the outer surface 176 of the tubular section 154 and includes tapered surfaces 182,184. Tapered surfaces 182,184 are angled relative to each other at an angle λ with the apex of the angle forming a ridge 186 extending along the end face 172 of the unitary exhaust shield assembly 150". The angle λ can be, for example, 20 to 30 degrees. The ridge 186 and tapered surfaces 182,184 provide the geometry for a resistance projection welding joint when assembling the tubular section 154 to the truncated conical section 152.

Figure 9B:
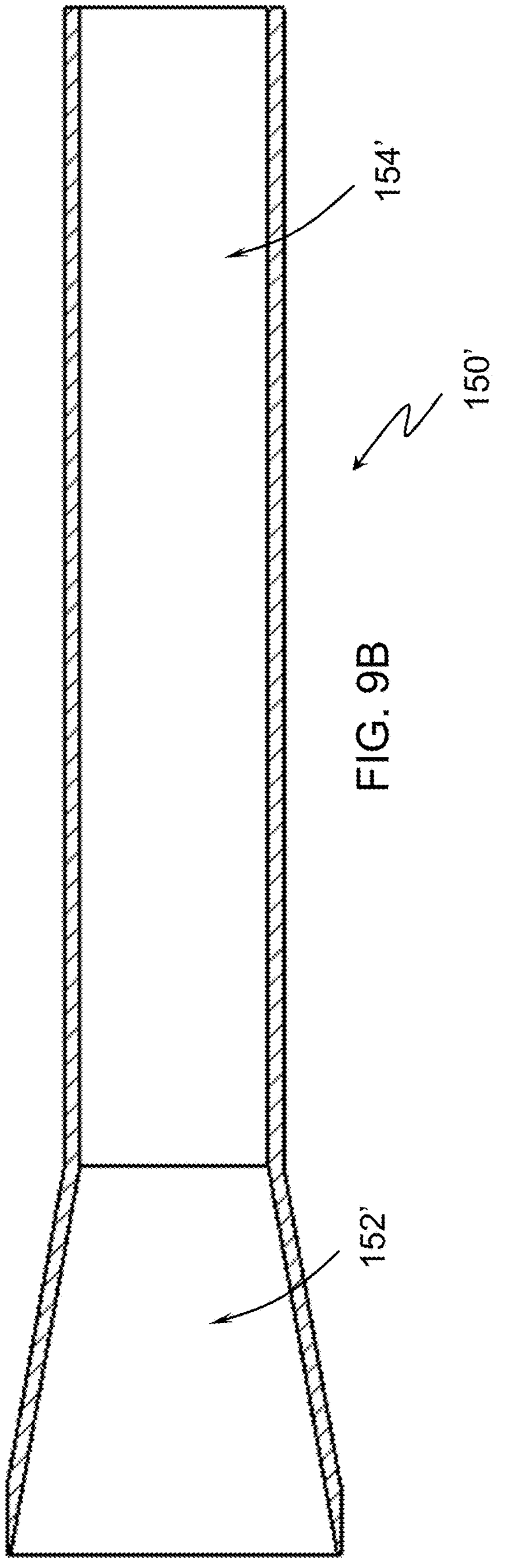
FIGS. 9A-B include a perspective view (FIG. 9A) and a longitudinal, cross-sectional view (FIG. 9B) of a first embodiment of a unitary exhaust shield assembly.
Figure 9A:
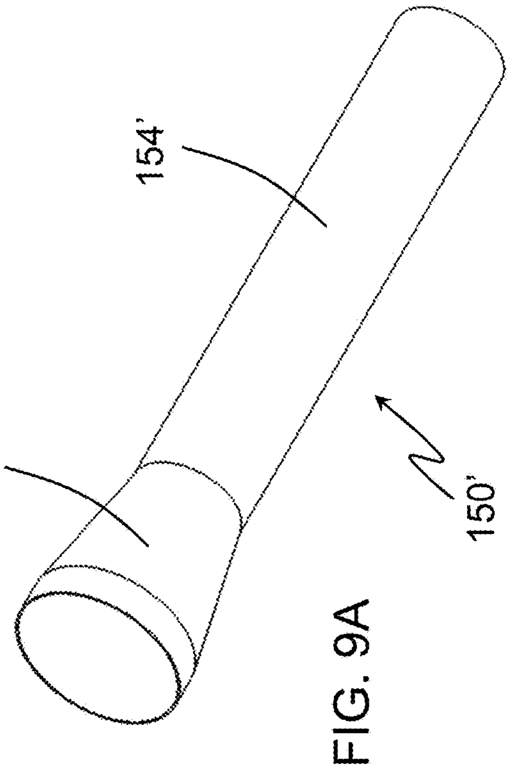

In alternative embodiments of the unitary exhaust shield assembly is a unitary structure. FIGS. 9A-B illustrate an embodiment of a unitary exhaust shield assembly 150'. The unitary exhaust shield assembly 150' is shown in a perspective view (FIG. 9A) and a longitudinal, cross-sectional view (FIG. 9B). The unitary exhaust shield assembly 150' includes a conical section 152' and a tubular section 154' and is made as a singular part by, for example, additive manufacturing. The features of the conical section 152' are substantially similar to those of the exhaust shield assembly 150 shown and described herein, and the disclosure related exhaust shield assembly 150 is applicable to conical section 152' of the unitary exhaust shield assembly 150'. Further, similar features are labeled with similar reference numerals.

Figure 9C:
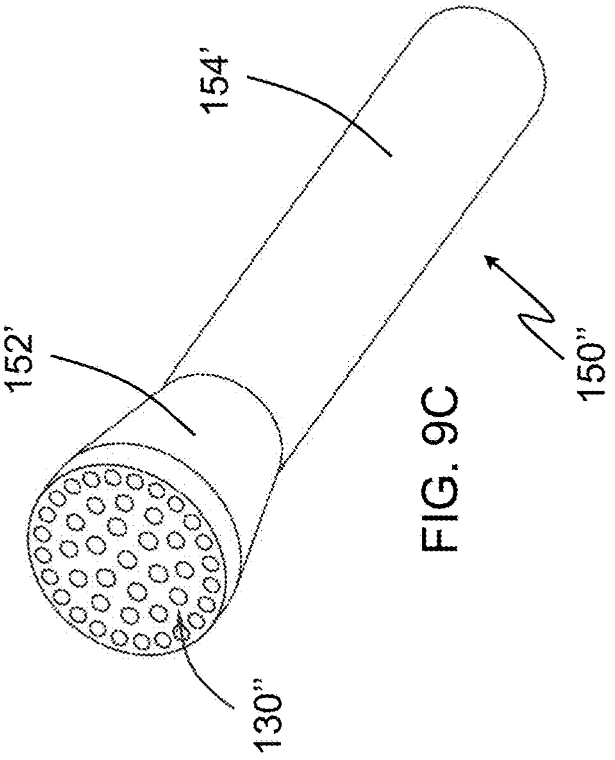
FIG. 9C is a perspective view of a second embodiment of a unitary exhaust shield assembly.

FIG. 9C is a further alternative embodiment of a unitary exhaust shield assembly 150" in which an exhaust support plate 130" has been further incorporated as part of the unitary structure of the unitary exhaust shield assembly 150".

Figure 10:
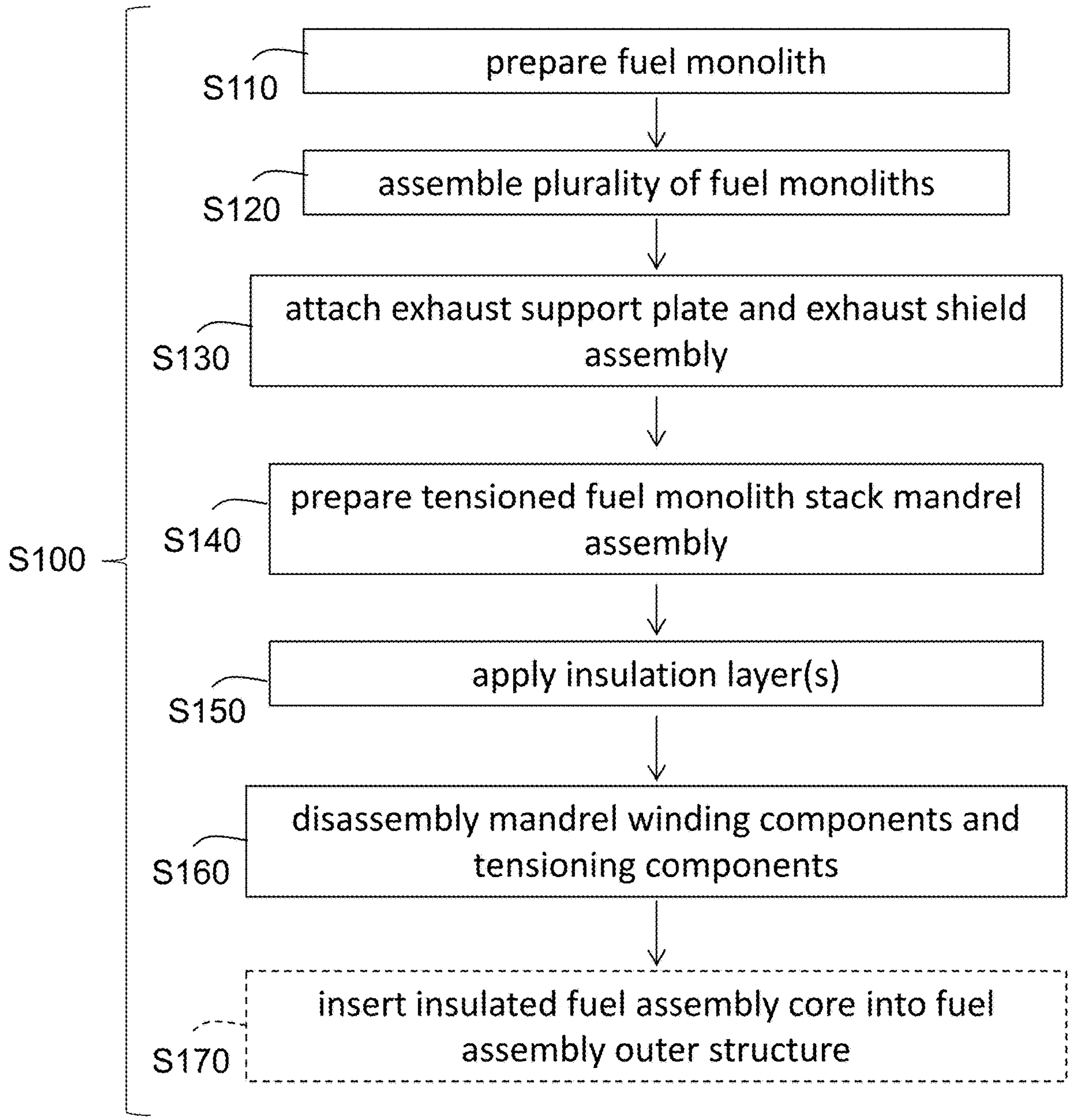
FIG. 10 is a flow diagram setting forth various steps in an embodiment of a method of manufacture of an insulated fuel assembly core and a fuel assembly.

FIG. 10 is a flow diagram setting forth various steps in an embodiment of a method of manufacture of an insulated fuel assembly core and a fuel assembly. The method S100 for manufacturing an insulated fuel assembly core 100 includes steps of: S110 preparing the fuel monoliths 10, S120 assembling the fuel monoliths 10, S130 attaching ancillary components, such as the exhaust support plate 130 and the exhaust shield assembly 150, S140 preparing a tensioned fuel monolith stack mandrel assembly, S150 applying the insulation layer 120; S160, disassembling components used in the mandrel assembly, such as mandrel winding components and tensioning components. The insulated fuel assembly core 100 can be manufactured by S170 positioning the insulated fuel assembly core 100 into a fuel assembly outer structure 210. Additional finish processing of the fuel assembly 200 can occur as needed, such as abrasive polishing of the exterior surfaces, which can promote bonding of the insulation layer 120.

Step S110 prepares the fuel monolith 10, which may include manufacturing and post-manufacturing processing of the fuel monolith 10 or may include only post-manufacturing of a pre-manufactured fuel monolith 10. Manufacturing the fuel monolith 10 can be by various techniques. In an exemplary embodiment, the fuel monolith 10 is formed by injection molding techniques, such as ceramic injection molding, followed by debinding (e.g., by thermal-based or chemical-based debinding techniques) and sintering. Ceramic injection molding is highly precise and repeatable, resulting in dimensions and shape of the fuel monolith 10 being tightly controlled and substantially the same (within manufacturing tolerances) between production runs, particularly the side surface 26 and the eccentricity of the body 20 of the fuel monolith 10. Also, the first end surface 22 and the second end surface 24 are manufactured flat and parallel.

Where needed, the manufactured fuel monolith 10 can be subject to post-manufacturing processing. For example, surfaces of the manufactured fuel monolith 10 can be post-manufacturing processed by, for example, grinding to final dimension, such as by dual faced grinding and lapping techniques. Also, as needed, channels 30 of the manufactured fuel monolith 10 can be post-manufacturing processed to form channels 30 or to finish process the channels 30 to final shape, size and/or configuration. Other post-manufacturing processing can be used, such as wet polishing techniques to provide a smooth surface finish, or coatings, such as $Nb_2C$ or ZrC (depending on fuel type).

Step S120 assembles a plurality of fuel monoliths 10. In exemplary embodiments, the plurality of fuel monoliths 10 are stacked end face-to-end face. The eccentric shape of the fuel monoliths 10 provides a guide for aligning the channels 30 of the stacked fuel monoliths 10. Optionally, an additional guide, such as a drill rod 480, can be inserted into one or more channels 30, typically into the parallel channels, and used to align the stacked fuel monoliths 10. Preferably, at least two drill rods 480 and up to 6 or 7 drill rods 480 (as the number of parallel channels allows) are used as additional guides. For precision in alignment, clearance of the drill rod 480 to the interior diameter of the channel 30 is as small as possible, for example, 25 microns to 75 microns of clearance.

Step S130 attaches the exhaust support plate 130 and exhaust shield assembly 150 to the assembled plurality of fuel monoliths 10 to form a fuel assembly core 110. The eccentric shape of the exhaust support plate 130 provides a guide for aligning the channels 132 of the exhaust support plate 130 and the channels 30 of the stacked fuel monoliths 10. Optionally, the additional guide, such as a drill rod, can facilitate such alignment. The exhaust shield assembly 150 is attached to the exhaust support plate 130. For example, by an end portion 156 of the conical section 152 of the exhaust shield assembly 150 fitting over the circumferential surface 142 of the exhaust support plate 130.

The exhaust support plate 130 and the truncated conical section 152 and the tubular section 154 forming the exhaust shield assembly 150 can be formed as separate pieces or formed as a unitary structure. The separate pieces can be joined by welding, such as resistance welding, or by a mechanical joint. When using resistance welding, addition of Rhenium in the alloy of the materials to be welded assists in resistive welding. Manufacturing techniques for forming the exhaust support plate 130 and the truncated conical section 152 and the tubular section 154 forming the exhaust shield assembly 150 as separate pieces include 3D wire electrical discharge machining (3D wire EDM) and EBEAM printing calibrated for tungsten production, such as the Arcam Spectra H electron beam melting system. EBEAM printing creates a roughened surface finish on the outer surface of the final part, which can be advantageous in subsequent application of the insulation layer 120. When manufactured as separate parts, the joining surfaces have tight tolerances to facilitate mating of the separate pieces. For example, 3D wire EDM manufacturing can be used with a true profile tolerance of, for example, 0.1 mm for interior holes and 0.03 mm for the exterior of the elliptical loft region. Manufacturing techniques for forming the exhaust support plate 130 and the truncated conical section 152 and the tubular section 154 forming the exhaust shield assembly 150 (or a subset of these pieces) as a unitary structure include additive manufacturing techniques. An advantage of additive manufacturing these pieces is the elimination of joints. Eliminating joints in these pieces reduces the potential for errors in manufacturing, makes the pieces faster to manufacture, and increases strength of the structure. However, unitary manufacture, particularly by additive manufacturing, affects the surface roughness of, e.g., the flow channels 132, which impacts flow 300 through the flow channels 132. Post-manufacturing processing, such as grinding or wet polishing techniques to provide a smooth surface finish, or high temperature coatings, can be used to reduce as-manufactured surface roughness of the flow channels 132 (similar to post-manufacturing processing of the channels 30).

Step S140 prepares a tensioned fuel monolith stack mandrel assembly 400. The structures and processes of preparing a tensioned fuel monolith stack mandrel assembly 400 are discussed further herein, in particular in connection with FIGS. 10A-G, 11A-C and 12.

Step S150 applies the insulation layer 120 to the tensioned fuel monolith stack mandrel assembly 400. The content and location of the insulation layer 120 can vary based on thermal requirements. For example, the most radially inward layers of insulation (as opposed to the most radially outward layers of insulation) and the insulation layer over the fuel assembly 200 at the second end 208 (as opposed to the first end 206) are exposed to the highest temperatures and are most susceptible to hydrogen corrosion. Anticipated operating conditions include and temperature of the inlet Hydrogen flow during full power thrust of approximately 300K, a temperature in the middle of the fuel assembly of approximately 1,300K during full power thrust, and a temperature of the exhaust Hydrogen flow during full power thrust of approximately 2750K. In high ISP embodiments, the temperature of the exhaust Hydrogen flow can be 3000K. Therefore, geometrical and material choices are made to provide the best resistance at these locations to the anticipated operating conditions.

As seen in FIGS. 2B-D, the insulation layer 120 has a plurality of layers. In example embodiments, the insulation layer 120 has two layers—an inner insulation layer 120*a* and an outer insulation layer 120*b*. In alternative embodiments, the insulation layer 120 can have more than two layers including, for example, one or more intermediate layers between the inner insulation layer 120*a* and the outer insulation layer 120*b*. The intermediate layer(s) can be an insulation layer or cannot be an insulation layer, such as a structural layer providing composite reinforcement and compressive forces.

The inner insulation layer 120*a* is a compliant and compressive layer that is hydrogen resistive and has low thermal conductivity. In some embodiments, the inner insulation layer 120*a* is made from a random-orientation matting of ZrC fiber. Random-orientation matting is roll-wrapped around the tensioned fuel monolith stack mandrel assembly 400. The random-orientation matting is wrapped tightly, but it does not have to provide structural support. The primary role of inner insulation layer 120*a* is to provide high temperature resistance to hot Hydrogen and provide thermal shielding to the other layer(s) of insulation and to the fuel assembly outer structure 210. In exemplary embodiments, the inner insulation layer 120*a* is 1 mm thick but in alternate embodiments the inner insulation layer 120*a* is 2 mm thick or more. Fiber densities of the ZrC random-oriented matting can be 40-60%, with void spaces of 60-40%, respectively. Greater void space is generally desired to decrease the through-layer radial thermal conductivity and, therefore, increase the performance of the inner insulation layer 120*a*, as well as that of the overall insulation layer 120.

In alternative embodiments, the inner insulation layer 120*a* is made from $ZrO_2$, SiC, carbon fiber, carbon fiber with surface conversion to ZrC or carbon fiber completely converted to ZrC using either tow strands and mandrel wrapping or using woven material and roll wrapping to form the inner layer. Chemical compatibility with hydrogen and high temperatures are the primary factors weighed when choosing an insulator material type, format (tow vs felt vs woven) and application method (mandrel wrapping vs roll wrapping).

In further alternative embodiments, the inner insulation layer 120*a* may be a thin tungsten spiral wrapped foil having a thickness of, for example, 25 microns to 50 microns. This tungsten layer may be used to seal hydrogen flow paths so that there is a high resistance for flowing hydrogen to escape the fuel assembly core 110.

Another example material suitable for the inner insulation layer 120*a* is to manufacture the inner insulation layer 120*a* separately and then apply it to the fuel assembly core 100. In this regard, carbon fiber can be basket weaved over a solid zirconia oxide mandrel, impregnated with phenolic and baked at 1300° C. to form a low temp C/C composite. The C/C composite is removed from the mandrel and surface converted to ZrC. Surface conversion to ZrC provides improvements to survival in the hydrogen environment at the hot end of the fuel assembly 200 (~2700 K) and provides improvements to fuel assembly 200 performance. Thus, in some embodiments, surface conversion to ZrC may be implemented in the portion of the fuel assembly 200 toward the outlet end, and may not be implemented in the cooler, inlet end of the fuel assembly 200. The resulting composite can then be layed-up on the fuel assembly core 100 as inner insulation 120*a*.

The inner insulation layer 120*a* is typically applied dry, without a binder. This decreases the thermal conductivity of inner insulation layer 120*a*. The dry, inner insulation layer 120*a* is held in place by the subsequent layers of the insulation layer 120.

The inner insulation layer 120*a* may use a variety of geometrical wrapping patterns, such as helical winding patterns or basket weave helical patterns. Basket weave helical patterns are used to decrease fiber density and therefore decrease radial thermal conductivity in both the inner insulation layer 120*a* and the other layers of the insulation layer 120. Basket weave patterns are formed by increasing the fiber bandwidth in CNC mandrel wrapping control software beyond the actual fiber width as applied to the mandrel. By increasing this fiber bandwidth, an open weave with high porosity can be achieved. For example, a basket weave pattern can have 2 mm thick fibers oriented at 45 degrees, with an ~2 mm space between each tow.

The inner insulation layer 120*a* can optionally be retained by a gripping feature, which consists of a roughened surface finish or other mechanical features, such as spiked protrusions, on the outer circumferential surface of the fuel assembly core 110. Application of the other layers of the insulation layer 120, such as the outer insulation layer 120*b*, compresses the inner insulation layer 120*a* to engage with the gripping feature. The gripping feature can be located at separate regions along the length of the fuel assembly core 110 and prevents motion of the inner insulation layer 120*a* relative to the fuel assembly core 110 during thermal cycling. Gripping features may also be applied to the outer circumferential surface of the exhaust support plate 130 and/or the exhaust shield assembly 150.

The outer insulation layer 120*b* is created by mandrel wrapping with a twin tow machine and is made using carbon fiber. In alternative embodiments, the outer insulation layer 120*b* is made using SiC fiber or $ZrO_2$ fiber tows. Wrapping using twin tows (No. 56) can be advantageous relative to wrapping with a single tow since it has been observed the tension of a single fiber causes deflection in the insulated fuel core assembly 100. Twin tow winding orients the two tows 180 deg apart, which prevents this deflection.

The outer insulation layer 120*b* can consist of multiple layers, such as from one to twenty sublayers depending on the fiber type used for the insulator winding and the thickness of the overall insulator. In exemplary embodiments, inner sublayers (such as sublayers one to three) are applied dry, without a binder so as to decrease the thermal conductivity. The dry sublayers are held in place by the subsequent sublayers of the outer insulation layer 120*b*. Outer sublayers (such as the three to five most outer sublayers) are applied wet using a phenolic resin (BK 5236M Phenolic Impregnating Resin from Bakelite Synthetics, or similar). The low viscosity of this phenolic resin has desirable properties for the wet layup stage of mandrel winding. Ideal viscosity of the phenolic resin is in the range of 300-700 Cps.

The insulation layer 120, e.g., the inner insulation layer 120*a* and the sublayers of the outer insulation layer 120*b*, are applied over an axial length of the tensioned fuel monolith stack mandrel assembly 400 that is greater than the length of the fuel assembly core 100. This is done so that any variation in the tow winding, such as due to the change in direction of the winding equipment at each turnaround region, does not occur at a location coincident with the fuel assembly core 100. For example, the turnaround region can be located where the mandrel spacers of the tensioned fuel monolith stack mandrel assembly 400 are located. By having any variation in the tow winding occur axially spaced from the fuel assembly core 100, the winding of the insulation layer 120 at the fuel assembly core 100 is more uniform.

For application of the insulation layers in Step S150, an axial tension can be applied to the tensioned fuel monolith stack mandrel assembly 400. For example, pneumatic chucks can be incorporated into the winding system and attached to the axial ends of the tensioned fuel monolith stack mandrel assembly 400 e.g., via threaded mandrel end caps 440, 470, and a tension applied from the winding equipment to the tensioned fuel monolith stack mandrel assembly 400. Depending on the amount of tension already applied to the tensioned fuel monolith stack mandrel assembly 400 from internal tensioning components (as discussed herein), only a minor amount of axial tension (for example, less than 1500 Newtons (337 lbf), such as 222 Newtons (50 lbf), 445 Newtons (100 lbf) or 1245 Newtons (280 lbf)) is needed to be applied to the tensioned fuel monolith stack mandrel assembly 400 to maintain the tensioned fuel monolith stack mandrel assembly 400 straight during application of the insulation layers. Excess axial tension (for example, above 445 Newtons) can cause stretching of the internal tension components, and therefore gaps between the fuel monoliths 10 can occur. Excess axial tension also increases the overall torque on the tensioned fuel monolith stack mandrel assembly 400 due to bearing drag on the idle chuck where the axial tension is applied. If higher tensions are to be used, the idle chuck can be actively driven using a motor synchronized with the primary drive chuck.

Once the outer sublayers are impregnated with phenolic resin, the wound and impregnated tensioned fuel monolith stack mandrel assembly 400 is then cured according to the heat treatment schedule applicable to the phenolic resin. The cure process can be conducting in a controlled manner in a suitable heating system, such as a tubular heating system with insulation, which allows for even heating of the phenolic resin while the wound and impregnated tensioned fuel monolith stack mandrel assembly 400 is slowly rotated inside using the rotation axis of the mandrel winding machine. Slowly rotating the wound and impregnated tensioned fuel monolith stack mandrel assembly 400 helps maintain straightness during the phenolic resin cure cycle.

Further and/or alternative details on mandrel wound insulation is contained in U.S. patent application Ser. No. 18/118,193, the entire contents of which are incorporated herein.

In Step S160, the mandrel winding components and tensioning components are disassembled from the cured tensioned fuel monolith stack mandrel assembly 400. The structures and processes of disassembling the mandrel winding components and tensioning components are discussed further herein, in particular in connection with FIGS. 10A-G, 11A-C, and 12.

Once disassembled, the insulated fuel assembly core 100 can be optional post-processed and then inserted into a fuel assembly outer structure 210. Post processing can include, for example, machining to final dimensions. Example machining processes include centerless grinding.

Step S170 inserts the insulated fuel assembly core 100 into a fuel assembly outer structure 210, such as by inserting the insulated fuel assembly core 100 into the fuel assembly outer structure 210.

Once inserted into the fuel assembly outer structure 210, other components can be attached as necessary to form the fuel assembly 200. For example, the inlet connection assembly 220 can be attached, for example, using crimp 232.

Figures 11A, 11B:
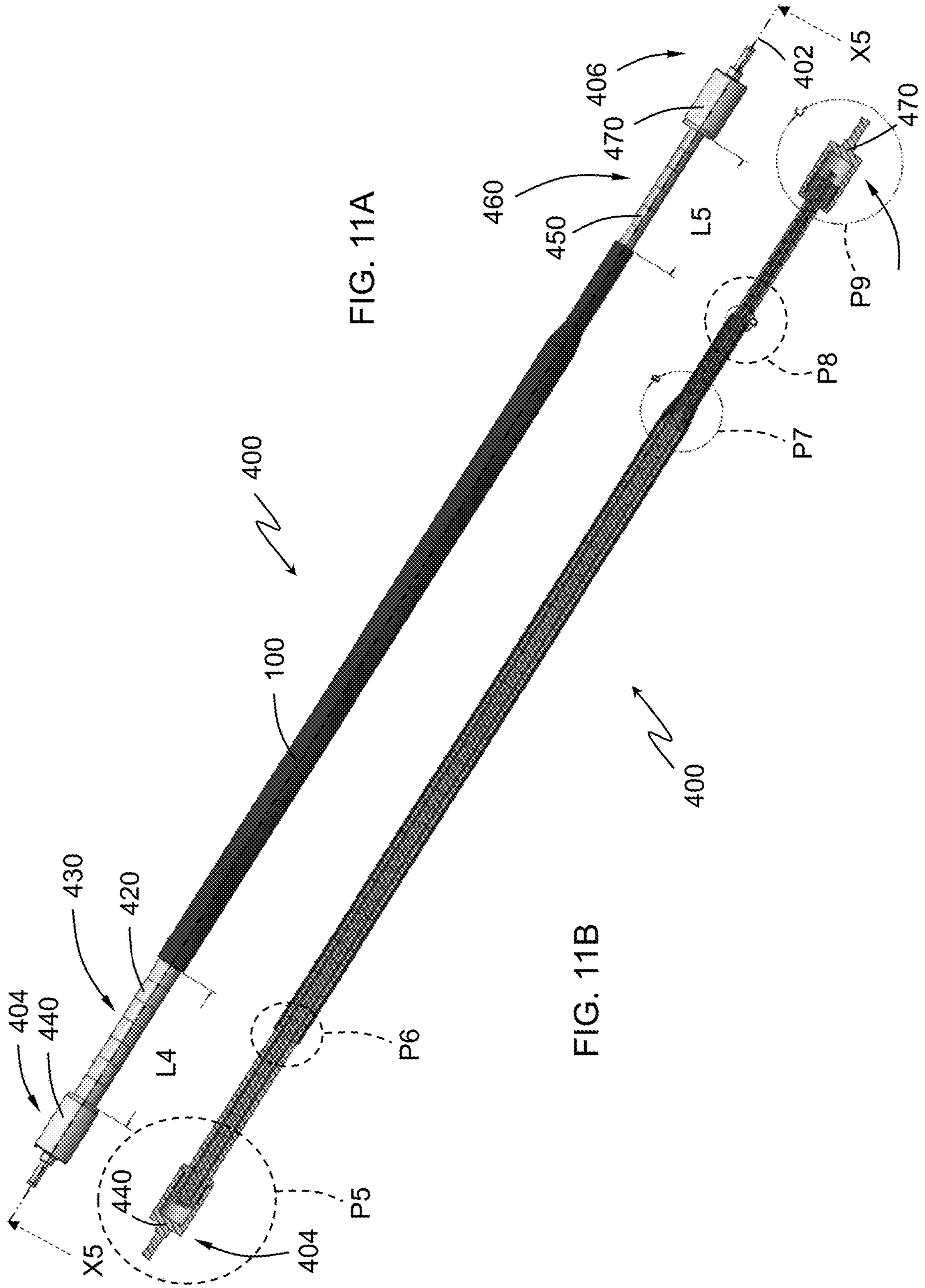
FIG. 11A is a perspective view of an embodiment of a tensioned fuel monolith stack mandrel assembly.
FIG. 11B is a cross-sectional view of the tensioned fuel monolith stack mandrel assembly shown in FIG. 11A taken at X5-X5.

FIG. 11A is a perspective view of an embodiment of a tensioned fuel monolith stack mandrel assembly 400 and FIG. 11B is a cross-sectional view of the tensioned fuel monolith stack mandrel assembly 400 shown in FIG. 11A taken at X5-X5.

The tensioned fuel monolith stack mandrel assembly 400 extends along axis 402 from a first end 404 to second end 406 and includes (i) the fuel assembly core 100 (shown with insulation layer 120), (ii) internal tensioning components (see also FIGS. 11C-G and 12A-C), (iii) at the first end 404, a plurality of mandrel spacers 420 in a first mandrel spacer section 430 and a first threaded mandrel end cap 440, and (iv) at the second end 406, a plurality of mandrel spacers 450 in a second mandrel spacer section 460 and a second threaded mandrel end cap 470. An exposed section of the first mandrel spacer section 430 has a length L4 and is between the first end 104 of the fuel assembly core 100 and the first threaded mandrel end cap 440. An exposed section of the second mandrel spacer section 460 has a length L5 and is between the second end 106 of the fuel assembly core 100 and the second threaded mandrel end cap 470.

FIGS. 11C to 11G show various portions of the tensioned fuel monolith stack mandrel assembly 400 I magnified view.

Figure 11C:
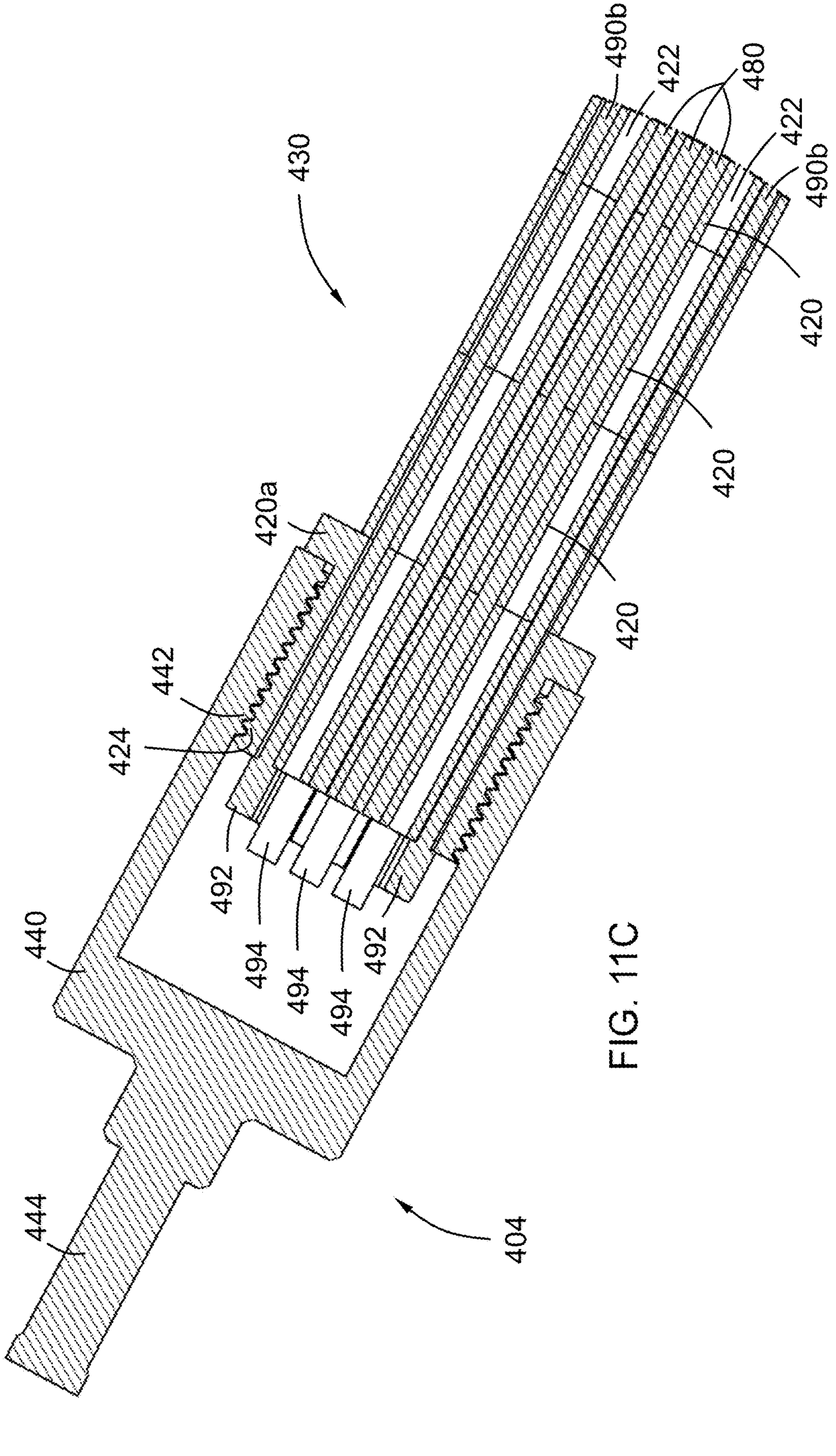
FIG. 11C is a magnified view of the area P5 in FIG. 11B showing, in cross-section, the threaded mandrel end cap and mandrel spacers at a first end of the tensioned fuel monolith stack mandrel assembly.

FIG. 11C is a magnified view of the area P5 in FIG. 11B showing, in cross-section, the threaded mandrel end cap 440 and several mandrel spacers 420 at the first end 404 of the tensioned fuel monolith stack mandrel assembly 400. The mandrel spacers 420 are arranged adjacent the first end 104 of the insulated fuel assembly core 100 as an axial extension of the insulated fuel assembly core 100. The mandrel spacers 420 are typically cylindrical or eccentric bodies and include a plurality of holes 422 that, when arranged adjacent the first end 104 of the insulated fuel assembly core 100, are aligned with the channels 30 in the fuel monoliths 10. One mandrel spacer, typically the endmost mandrel spacer 420*a*, includes a threaded surface 424 by which the first threaded mandrel end cap 440 can be attached via a complementary threaded surface 442 of the first threaded mandrel end cap 440. The threaded surface 424 can be on a fixture attached to the mandrel spacer or be incorporated directly into the surface of the mandrel spacer. Other attachment means than threaded connections can be used, such as fasteners, biased-connectors, or welds. The first threaded mandrel end cap 440 also includes an axial projection 444. The axial projection 444 mates to a holder assembly (not shown) for rotation of the tensioned fuel monolith stack mandrel assembly 400 during application of the insulation layer 120.

Figure 11D:
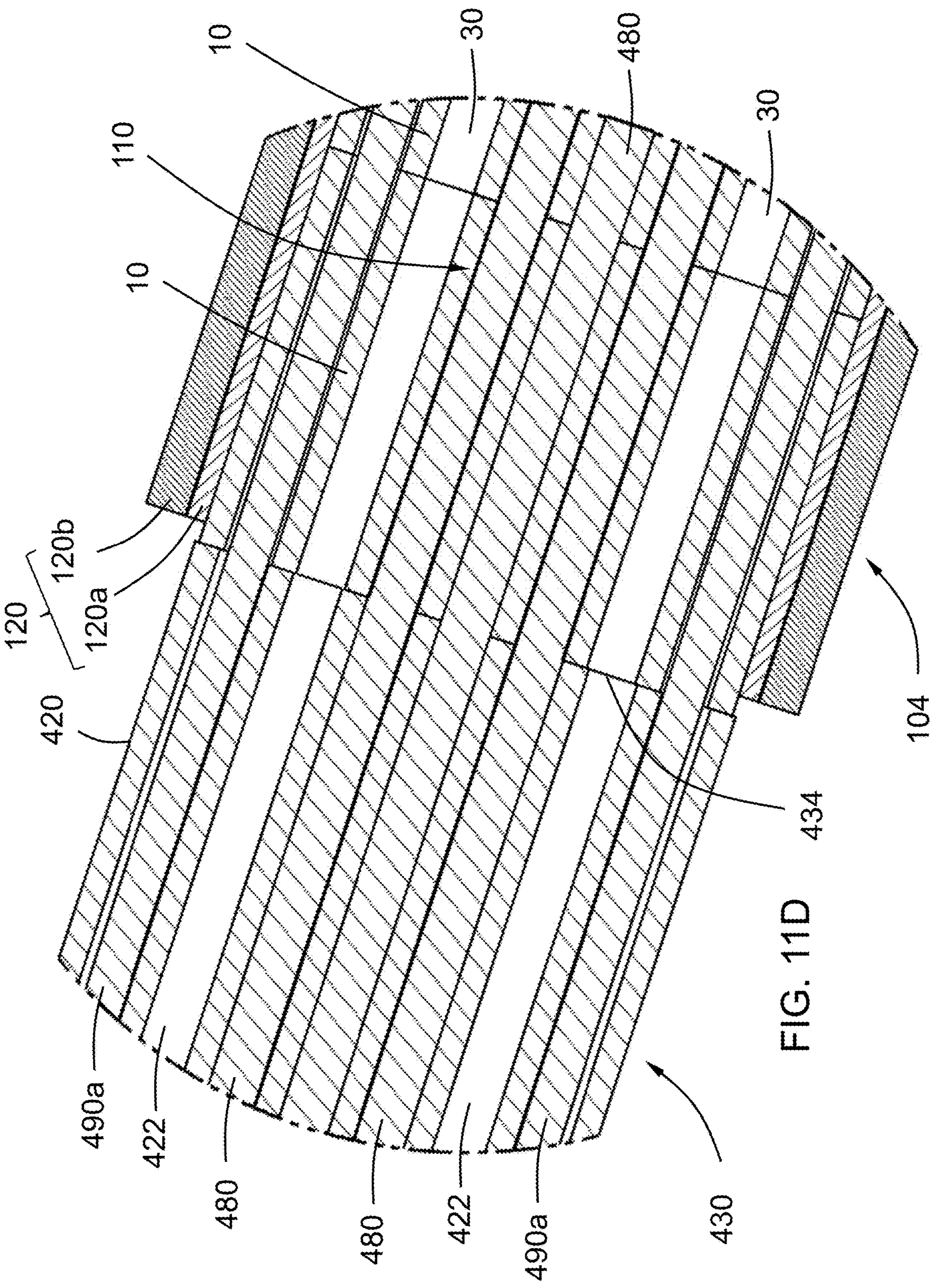
FIG. 11D is a magnified view of the area P6 in FIG. 11B showing, in cross-section, the mandrel spacers and inlet end of the insulated fuel assembly core in a first portion of the tensioned fuel monolith stack mandrel assembly.

FIG. 11D is a magnified view of the area P6 in FIG. 11B showing, in cross-section, the mandrel spacers 420 and first end 104 of the insulated fuel assembly core 100 in a first portion of the tensioned fuel monolith stack mandrel assembly. In FIG. 11D, the interface 434 between the fuel monolith 10 at the first end 104 of the insulated fuel assembly core 100 and the mandrel spacer 420 at an end of the first mandrel spacer section 430 is shown.

Figure 11E:
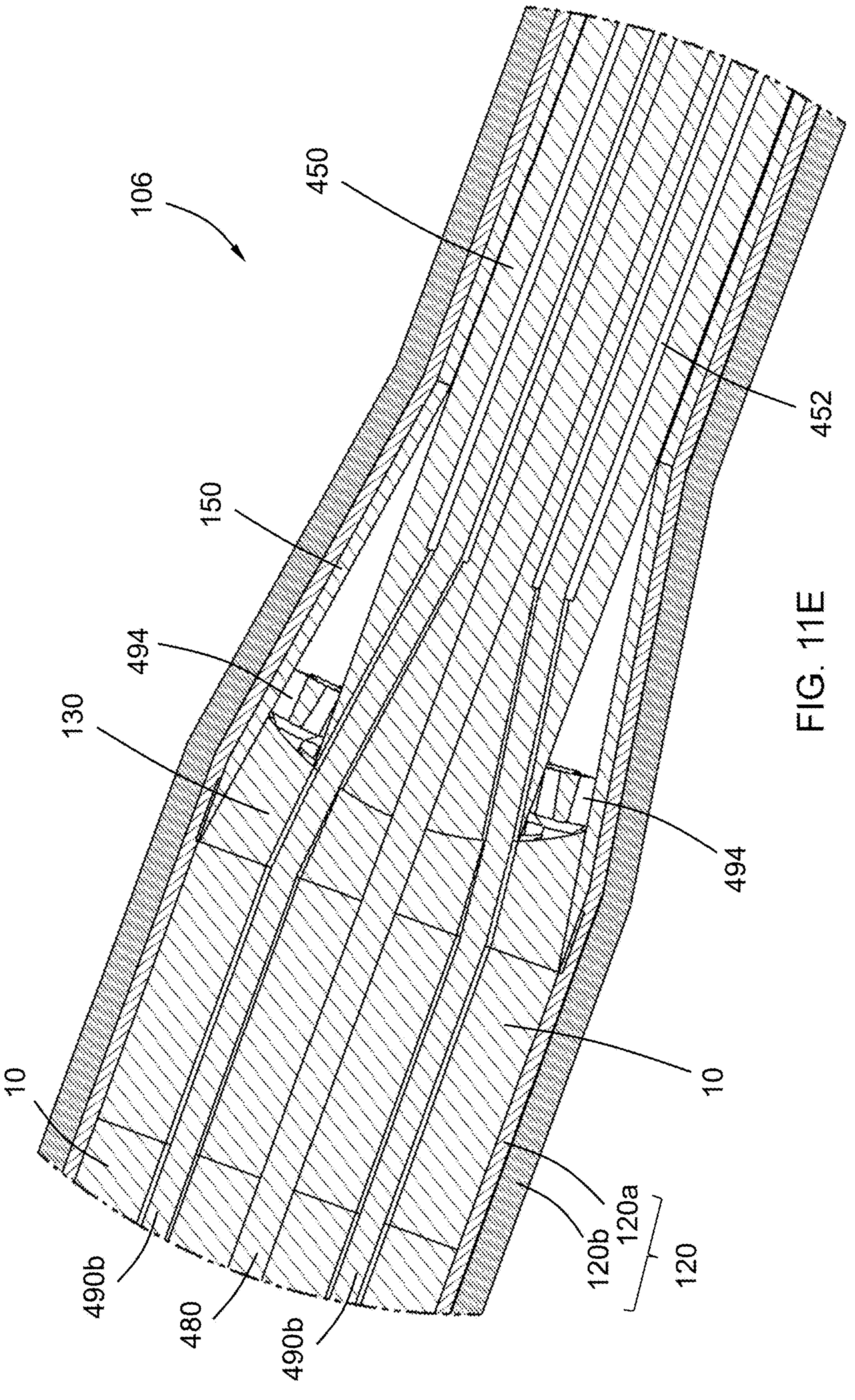
FIG. 11E is a magnified view of the area P7 in FIG. 11B showing, in cross-section, a first portion of the exhaust end of the insulated fuel assembly core in a second portion of the tensioned fuel monolith stack mandrel assembly.

FIG. 11E is a magnified view of the area P7 in FIG. 11B showing, in cross-section, a first portion of the second end 106 of the insulated fuel assembly core 100 in a second portion of the tensioned fuel monolith stack mandrel assembly 400. The mandrel spacers 450 are typically cylindrical or eccentric bodies and have a different size than mandrel spaces 420 so as to fit within the interior space of the tubular section 154 of the exhaust shield assembly 150. Mandrel spacers 450 include a plurality of holes 452. An end of mandrel spacer 450 interfaces with the second end face 140 of the exhaust support plate 130 and holes 452 in the mandrel spacers 450 are aligned with the channels 132 in the exhaust support plate 130 (which themselves are aligned with channels 30 in the fuel monolith).

Figure 11F:
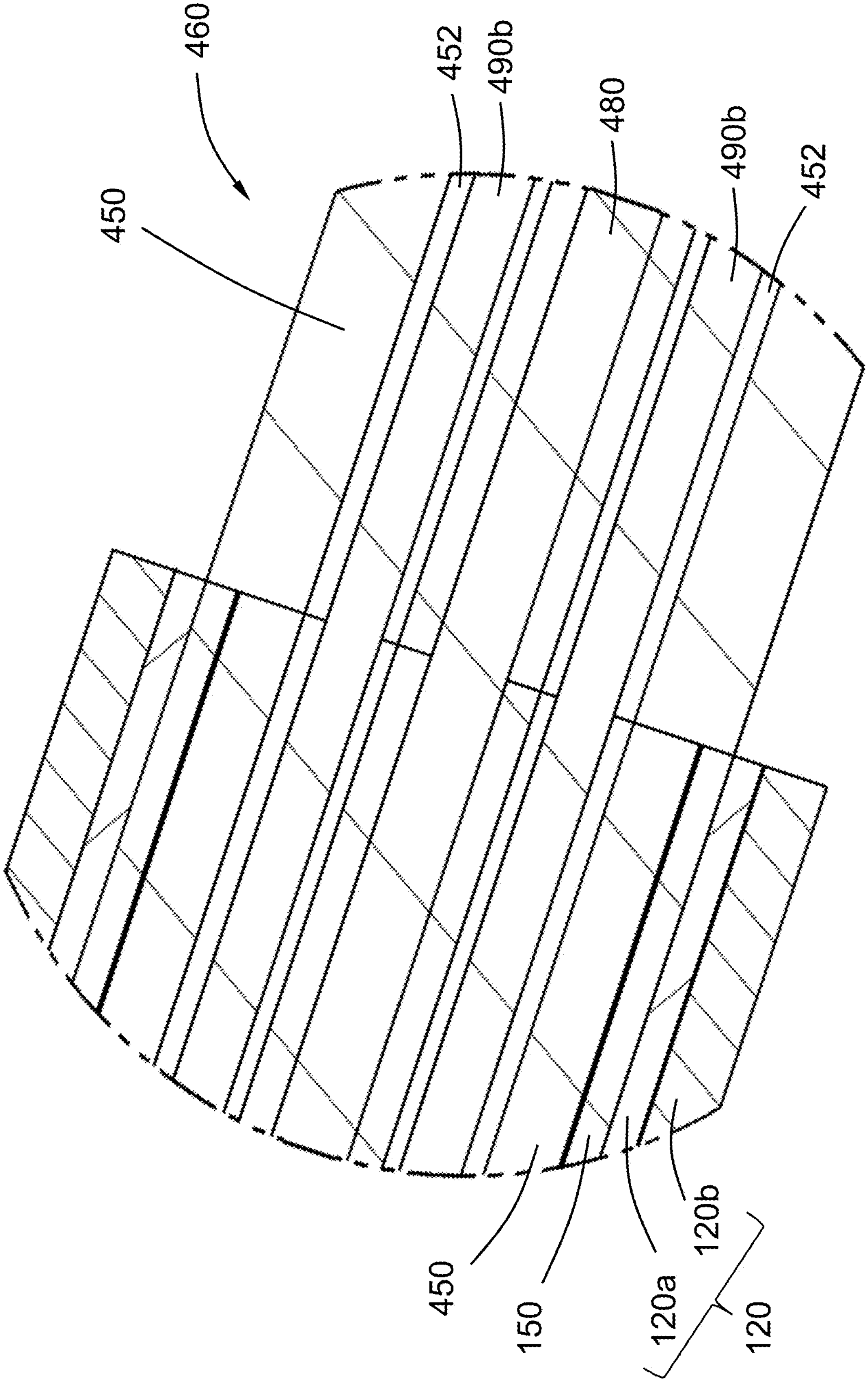
FIG. 11F is a magnified view of the area P8 in FIG. 11B showing, in cross-section, the mandrel spacers and a second portion of the exhaust end of the insulated fuel assembly core in a third portion of the tensioned fuel monolith stack mandrel assembly.

FIG. 11F is a magnified view of the area P8 in FIG. 11B showing, in cross-section, the mandrel spacers 450 and a second portion of the second end 106 of the insulated fuel assembly core 100 in a third portion of the tensioned fuel monolith stack mandrel assembly 400. The mandrel spacers 450 continue from within the exhaust shield assembly 150 and are arranged as an axial extension of the insulated fuel assembly core 100.

Figure 11G:
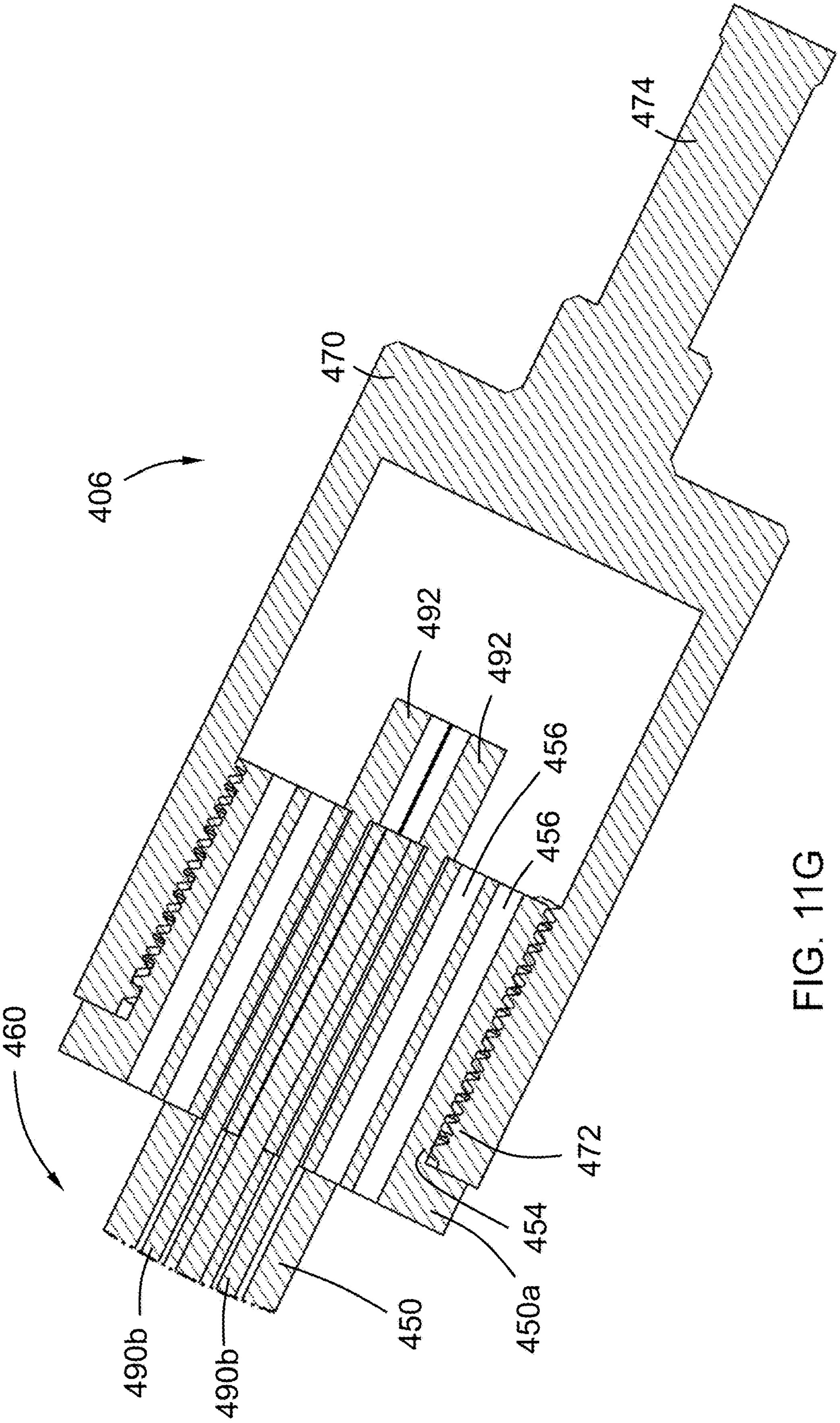
FIG. 11G is a magnified view of the area P9 in FIG. 11B showing, in cross-section, the threaded mandrel end cap and mandrel spacers at a second end of the tensioned fuel monolith stack mandrel assembly.

FIG. 11G is a magnified view of the area P9 in FIG. 11B showing, in cross-section, the second threaded mandrel end cap 470 and mandrel spacers 450 at a second end 406 of the tensioned fuel monolith stack mandrel assembly 400. One mandrel spacer, typically the endmost mandrel spacer 450*a*, includes a threaded surface 454 by which the second threaded mandrel end cap 470 can be attached via a complementary threaded surface 472 of the second threaded mandrel end cap 470. The threaded surface 454 can be on a fixture attached to the mandrel spacer or be incorporated directly into the surface of the mandrel spacer. Other attachment means than threaded connections can be used, such as fasteners, biased-connectors, or welds. In some embodiments, the endmost mandrel spacer 450*a* can be the same as the endmost mandrel spacer 420*a* (hence holes 456, which are unused in endmost mandrel spacer 450*a*). The second threaded mandrel end cap 470 also includes an axial projection 474. The axial projection 444 mates to a holder assembly (not shown) for rotation of the tensioned fuel monolith stack mandrel assembly 400 during application of the insulation layer 120.

Mandrel spacers 420, 450 can be made of aluminum (such as 6061 Aluminum) or stainless steel (such as 17-4PH Stainless Steel or 304 stainless steel), or other suitable material.

Figure 12A:
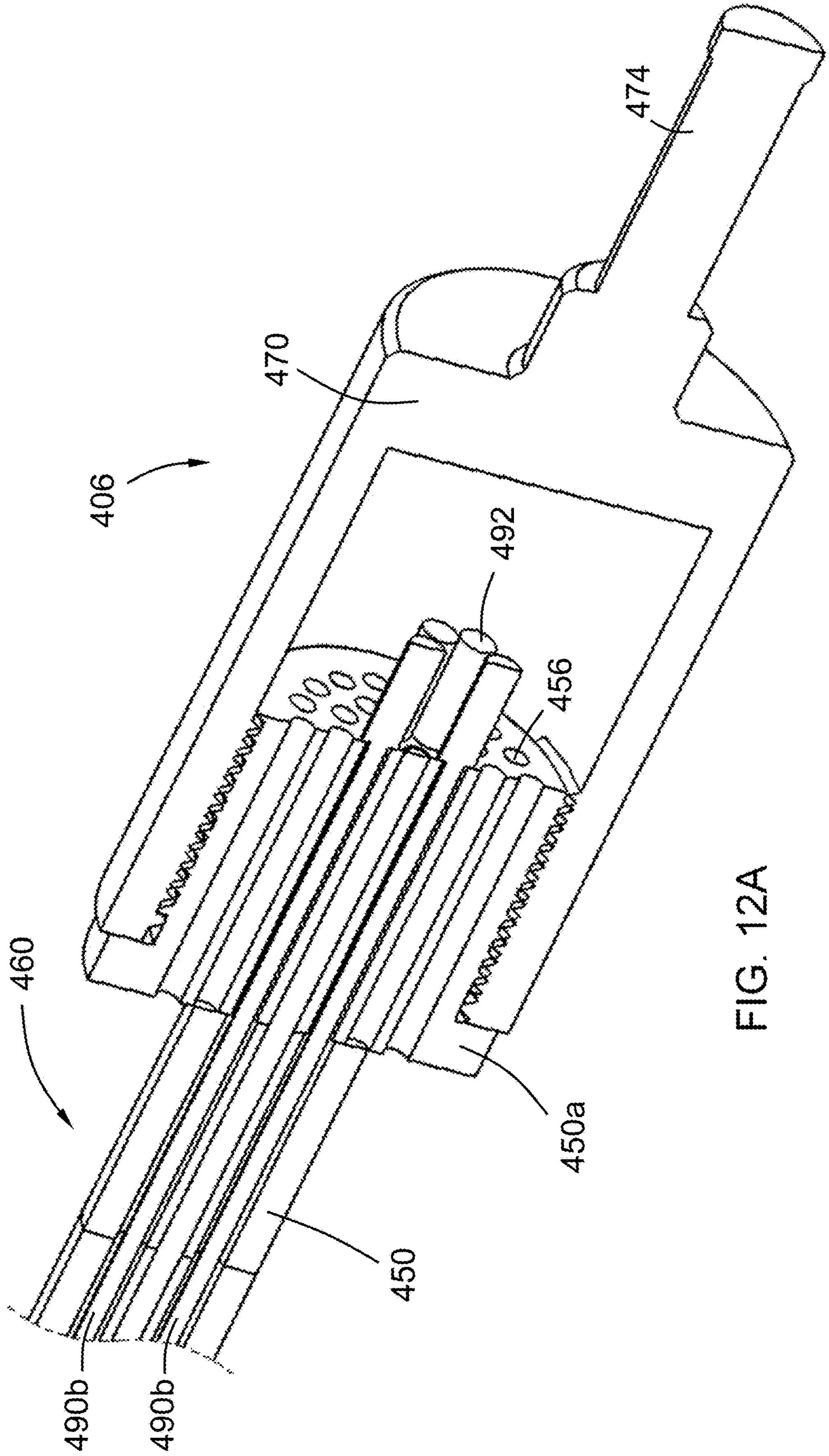
FIGS. 12A-C are perspective, cross-sectional views showing the arrangement of tension components in different portions of the tensioned fuel monolith stack mandrel assembly.
Figure 12B:
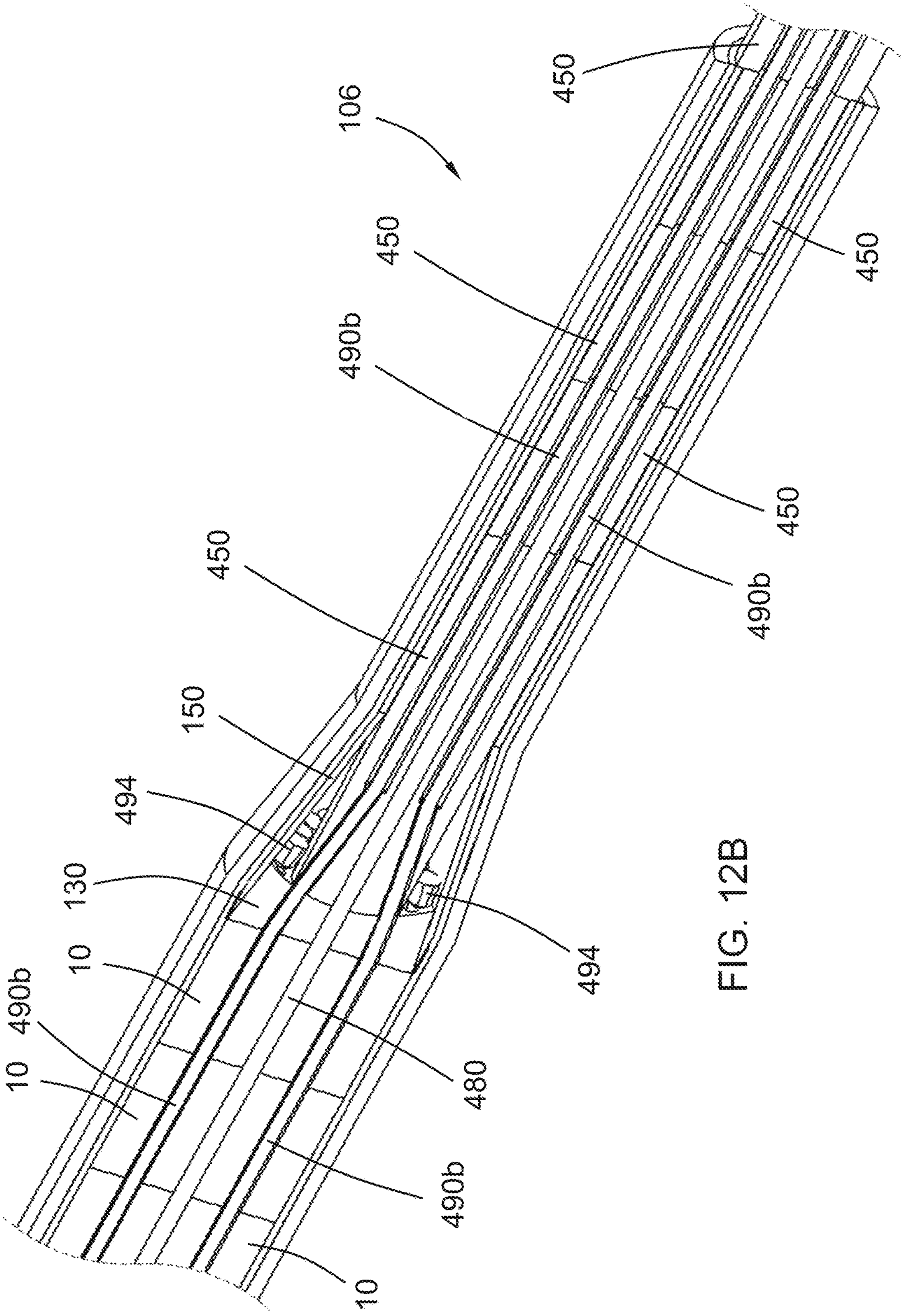
Figure 12C:
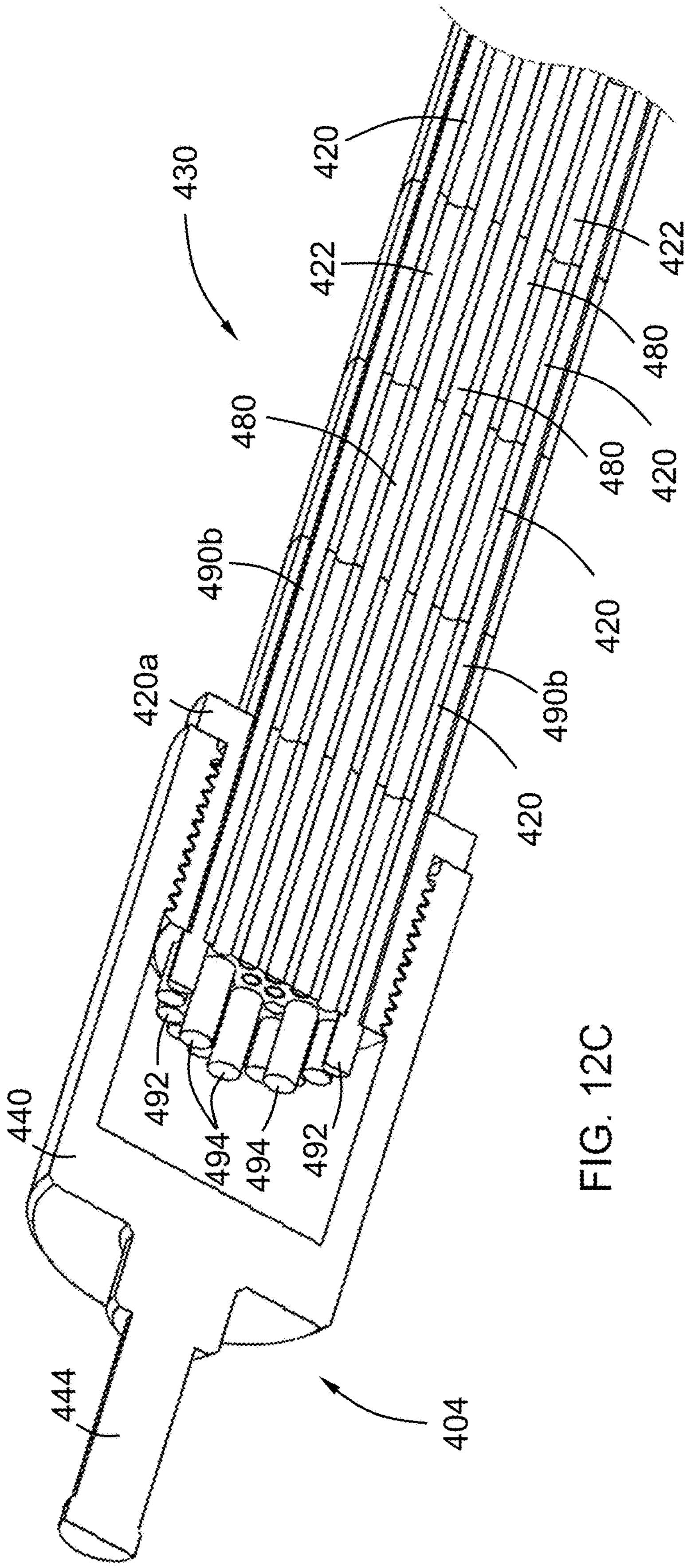

The internal tensioning components are shown in FIG. 11B and in a combination of FIGS. 11C to 11G and in a combination of FIGS. 12A-C. The internal tensioning components include a first set of tensioning cables 490*a* and a second set of tensioning cables 490*b*. The first set of tensioning cables 490*a* are shorter than the second set of tensioning cables 490*b*. Embodiments of the tensioned fuel monolith stack mandrel assembly 400 use up to 16 to 20 tensioning cables 490*a* and up to 6 to 10 tensioning cables 490*b*. the number of tensioning cables can vary based on the dimensions of the components and the number of channels/holes. Additionally, the number of tensioning cables can be less than the number of channels/holes, in which case tensioning cables are populated in channels/holes that are arranged in a symmetrical pattern (when viewed along the longitudinal axis).

The first set of tensioning cables 490*a* extend from a first end at an end surface of the endmost mandrel spacer 420*a* to a second end at the second end face 140 of the exhaust support plate 130. Thus, the first set of tensioning cables 490*a* extend through the first mandrel spacers 420 in the first mandrel spacers section 430, through the fuel monoliths 10 and the exhaust support plate 130 of the fuel assembly core 100. In the exhaust support plate 130, the first set of tensioning cables 490*a* are located in the non-parallel channels 132 at the periphery of the exhaust support plate 130.

The first set of tensioning cables 490*a* are tensioned and then terminated at each of the first end and the second end so as to maintain the tension in the first set of tensioning cables 490*a*. Termination can be by suitable means, such as by a crimp 494 or with a termination fixture.

The second set of tensioning cables 490*b* extend from a first end at an end surface of the endmost mandrel spacer 420*a* to a second end at an end surface of endmost mandrel spacer 450*a*. Thus, the second set of tensioning cables 490*b* extend through the first mandrel spacers 420 in the first mandrel spacers section 430, through the fuel assembly core 100 (including the fuel monoliths 10 and the exhaust support plate 130 and the exhaust shield assembly 150), and through the second mandrel spacers 450 (both the second mandrel spacers 450 in the second end 106 of the fuel assembly core 100 and the second mandrel spacers section 450 in the second mandrel spacers section 460). In the exhaust support plate 130, the second set of tensioning cables 490*b* are located in both the parallel channels 132 and the non-parallel channels 132 radially inward from the non-parallel channels 132 in which the first set of tensioning cables 490*a* are located.

The second set of tensioning cables 490*b* are tensioned and then terminated at each of the first end and the second end so as to maintain the tension in the second set of tensioning cables 490*b*. Termination can be by suitable means, such as by a crimp 492 or with a termination fixture.

It should be noted that not all channels 30 of the fuel monoliths 10 and not all channels 132 of the exhaust support plate 130 contain an internal tensioning component. Rather, some channels 30, 132 are left empty in the tensioned fuel monolith stack mandrel assembly 400.

The tension cables can be any suitable cable, such as stainless-steel cable made of 316 L or tungsten cables. Examples include Bare 7×49, commercial (SS or W) and Bare 1×19, commercial (SS) cables available from Carl Stahl Sava Industries, Inc., Riverdale, New Jersey.

Also illustrated are drill rods 480, which are used to align components of the fuel assembly core 100 during assembly, such as when stacking the fuel monoliths 10 and the exhaust support plate 130. While the drill rods 480 provide strength to the tensioned fuel monolith stack mandrel assembly 400 and help prevent bowing, they do not apply significant, if any, compressive forces on the tensioned fuel monolith stack mandrel assembly 400. In some embodiments, the drill rod 480 that is located in central channel 30' of the fuel monoliths 10 can include threaded ends for application of threaded terminations that can be used to tension the drill rod 480 in channel 30'. In addition, a threaded drill rod allows the application of compressive forces on the tensioned fuel monolith stack mandrel assembly 400, e.g., by threading a termination nut.

FIGS. 12A-C are perspective, cross-sectional views showing the arrangement of tension components in different portions of the tensioned fuel monolith stack mandrel assembly 400.

FIGS. 11A-11G and 12A-12C include insulation layers 120 and depict the tensioned fuel monolith stack mandrel assembly 400 after application of the insulation layers 120, i.e. after Step S150, but before disassembly of the mandrel winding components and tensioning components, i.e., before Step S160. The tensioned fuel monolith stack mandrel assembly 400 before application of the insulation layers 120, i.e. after Step S140 and before Step S150 would be the same as that depicted in FIGS. 11A-11G and 12A-12C, but without the insulation layers 120.

Returning to Step S160 in method S100 and FIG. 10, disassembly of the mandrel winding components and tensioning components can include removing the mandrel winding components, such as the threaded mandrel end caps 440, 470, and removing the internal tensioning components, such as the mandrel spacers 420, 450 and the tensioning cables 490*a*, 490*b*. Typically, not all the internal tensioning components are directly accessible after applying the insulation layer 120, so it is contemplated that the cured tensioned fuel monolith stack mandrel assembly 400 will be post-wound processed to allow for removal of at least some internal components. For example, it is contemplated that the cured insulation layer 120 will be cut to form a finished end of the insulated fuel assembly core 200. Such a cut can be located in the turnaround region of the mandrel winding process and sufficiently close to the first end 104 or second end 106 of the fuel assembly core 100 to provide access to the internal tensioning components in each location. For example, once accessible, the terminations 492, 494 of the tensioning cables 490*a*, 490*b* at one end can be removed by, e.g., by cutting, and the cable removed from the cured tensioned fuel monolith stack mandrel assembly 400 by pulling the other end of the tensioning cables 490*a*, 490*b* to withdraw the cables through the channels/holes.

Figure 13:
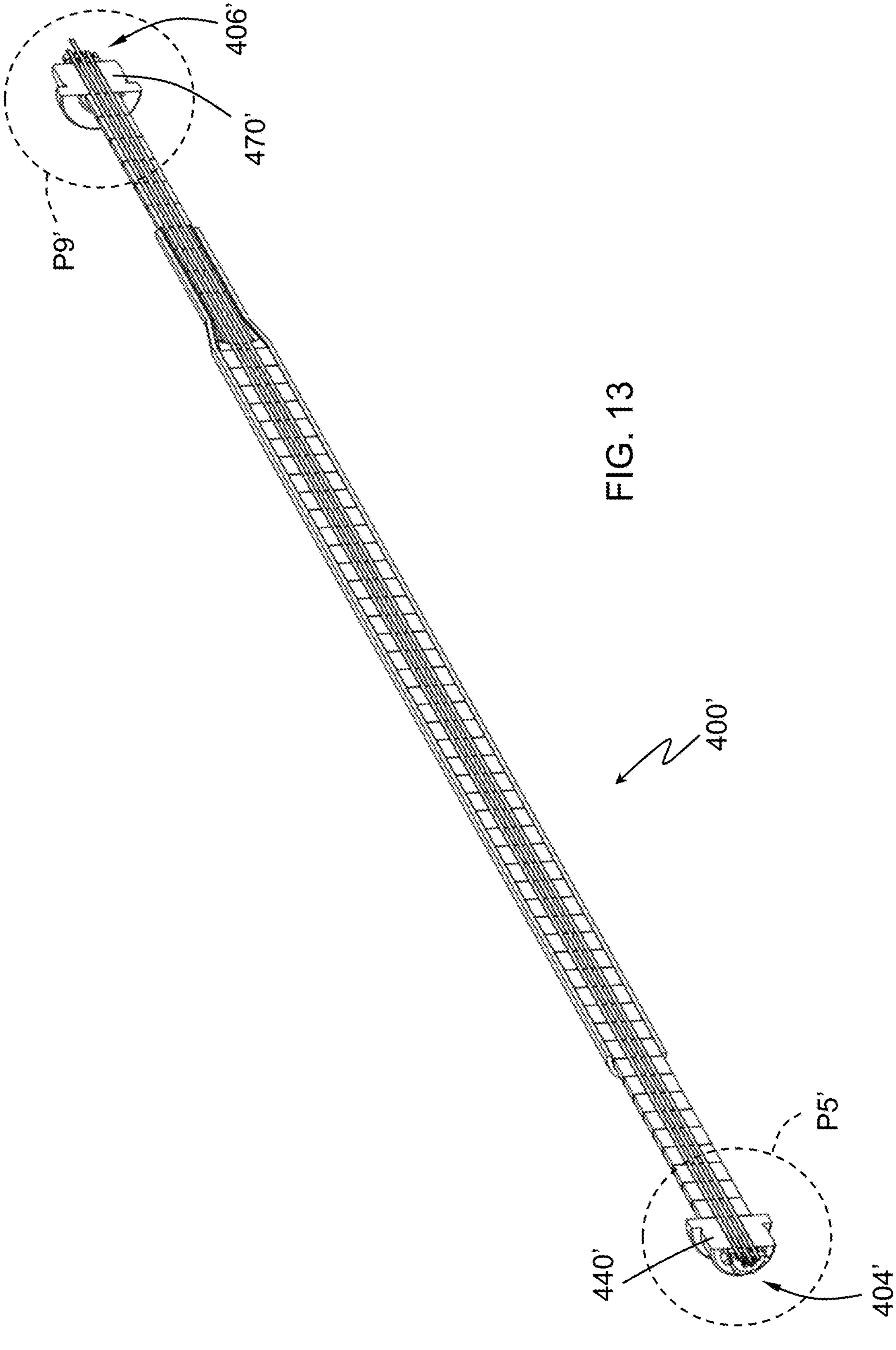
FIG. 13 is a cross-sectional view of an alternative embodiment of a tensioned fuel monolith stack mandrel assembly.

FIG. 13 is a cross-sectional view of an alternative embodiment of a tensioned fuel monolith stack mandrel assembly. The alternative embodiment of the tensioned fuel monolith stack mandrel assembly 400' is substantially similar to the tensioned fuel monolith stack mandrel assembly 400 shown and described herein, and the disclosure related to fuel monolith 10 is applicable to fuel monolith 10'. Further, similar features are labeled with similar reference numerals.

In the alternative embodiment of the tensioned fuel monolith stack mandrel assembly 400', the threaded mandrel end caps 440, 470 have been replaced by mandrel tensioning caps 440', 470' at each of the first end 404' and the second end 406'. Also, one or more tensioning cables in an inner grouping of channels have been replaced by drill rods 480'.

In exemplary embodiments, a plurality of drill rods 480', for example, five to nine drill rods 490', alternatively seven drill rods 490', are used. The drill rods 480' are close slip fit to the interior channels 30' of the fuel element, the support plate, and the spacers of the tensioned fuel monolith stack mandrel assembly 400'. The drill rods 480' are threaded on each end to allow for threaded nuts to be used to tension the drill rods 480'. The threaded ends of the drill rods 480' extend past end surfaces of the mandrel tensioning caps 440', 470' so that the threaded nuts can be attached to threaded ends and tightened to place the fuel monolith stack mandrel assembly 400' in tension. The use of drill rods 490' in place of tensioning cables simplifies assembly and increases rigidity to the tensioned fuel monolith stack mandrel assembly 400' in resistance to torsion during winding.

Figure 14A:
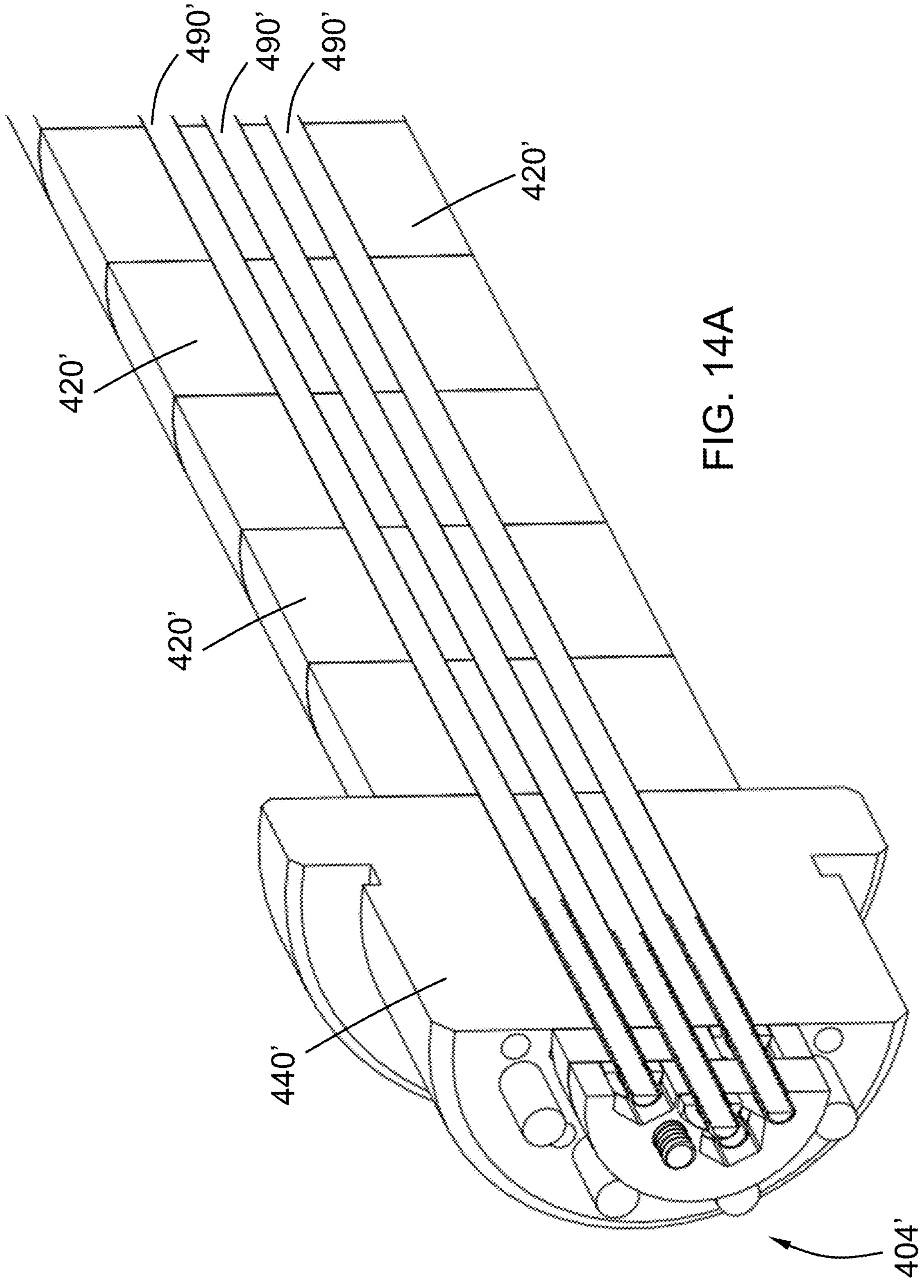
FIG. 14A is a magnified view of the area P5' in FIG. 13 showing, in cross-section, the mandrel tensioning cap and mandrel spacers at a first end of the alternative embodiment of the tensioned fuel monolith stack mandrel assembly.
Figure 14B:
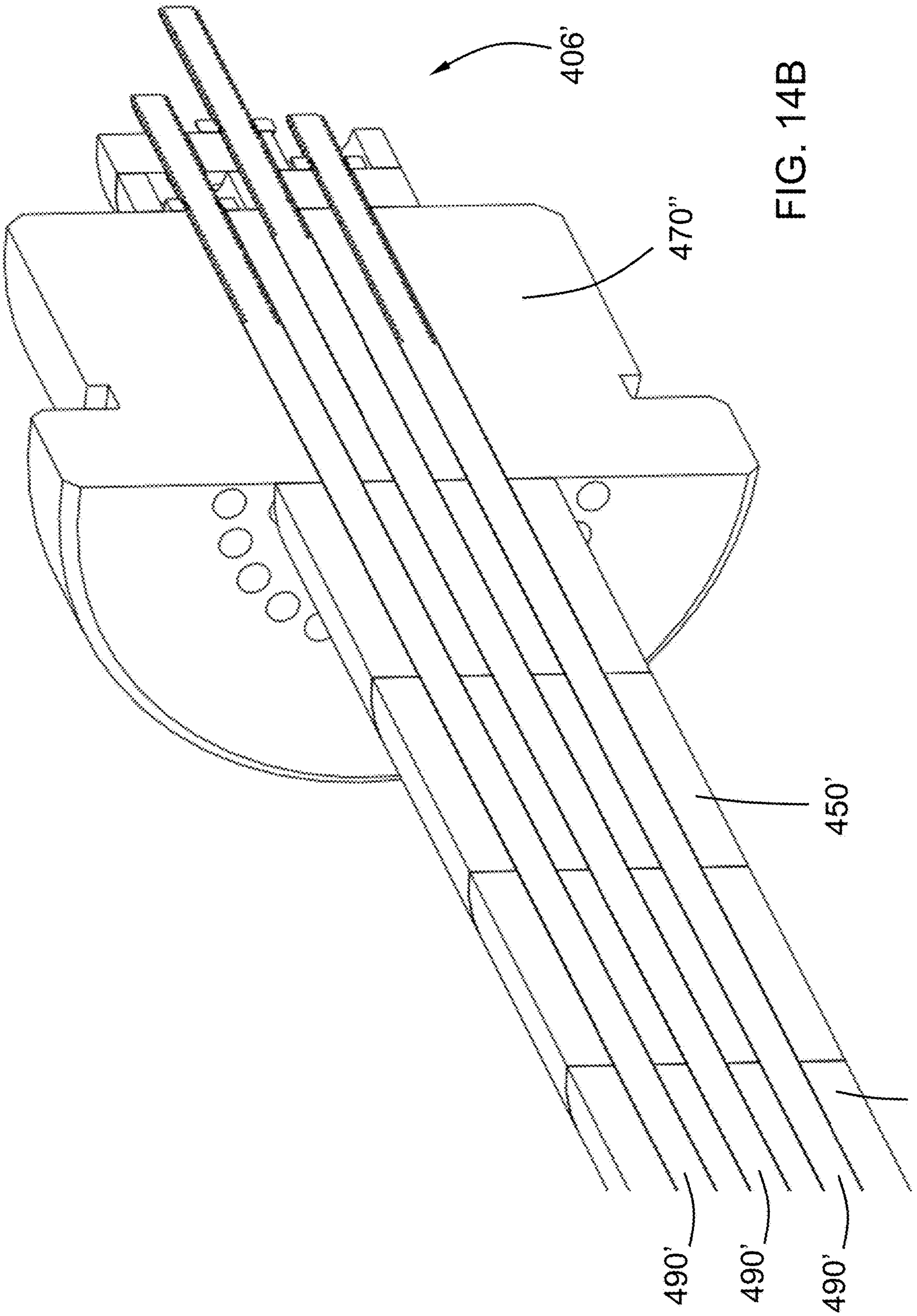
FIG. 14B is a magnified view of the area P9' in FIG. 13 showing, in cross-section, the mandrel tensioning cap and mandrel spacers at a second end of the alternative embodiment of the tensioned fuel monolith stack mandrel assembly.
Figure 14C:
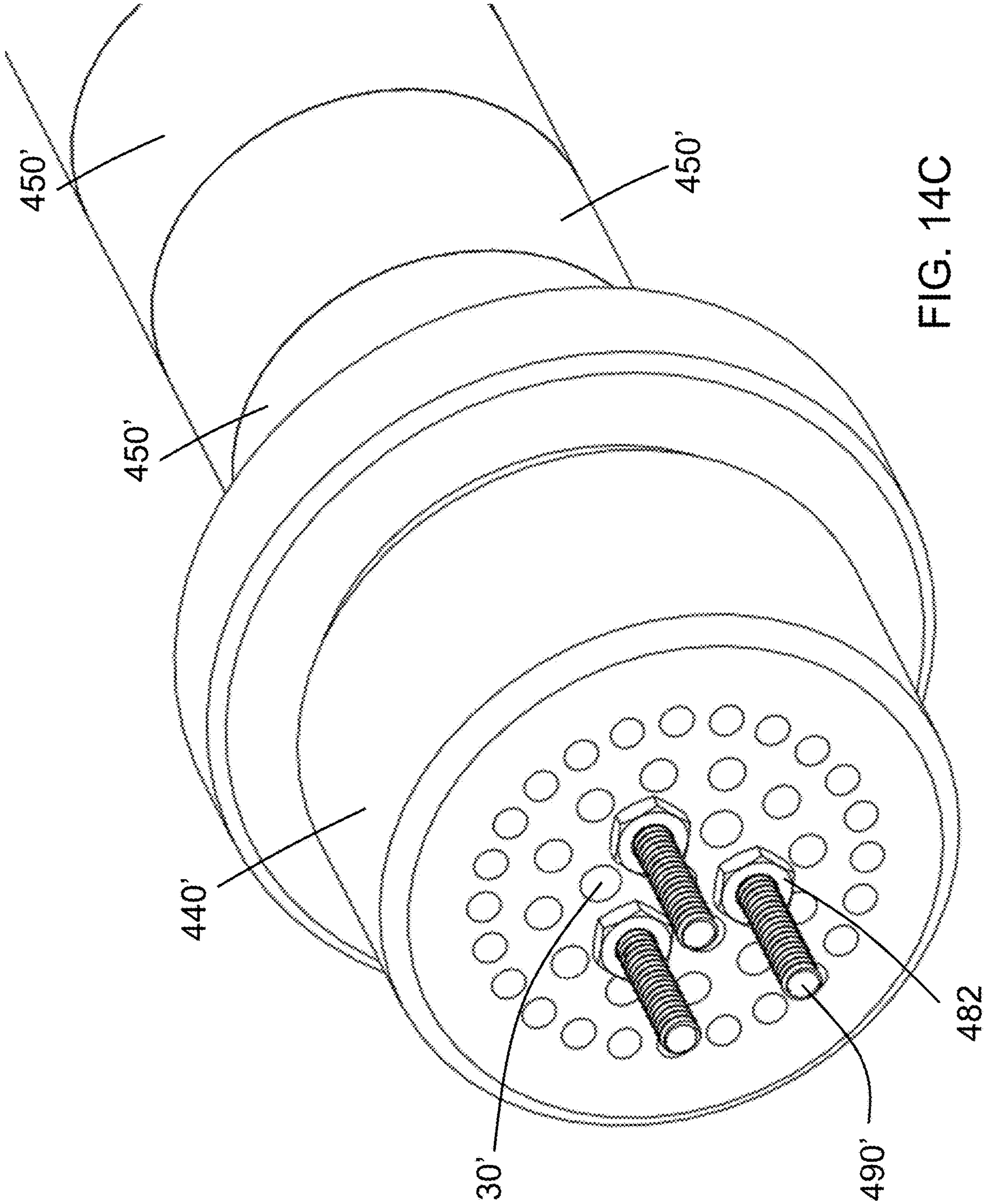
FIGS. 14C to 14F are perspective views of the first end of the alternative embodiment of the tensioned fuel monolith stack mandrel assembly at various points in time during assembly.
Figure 14D:
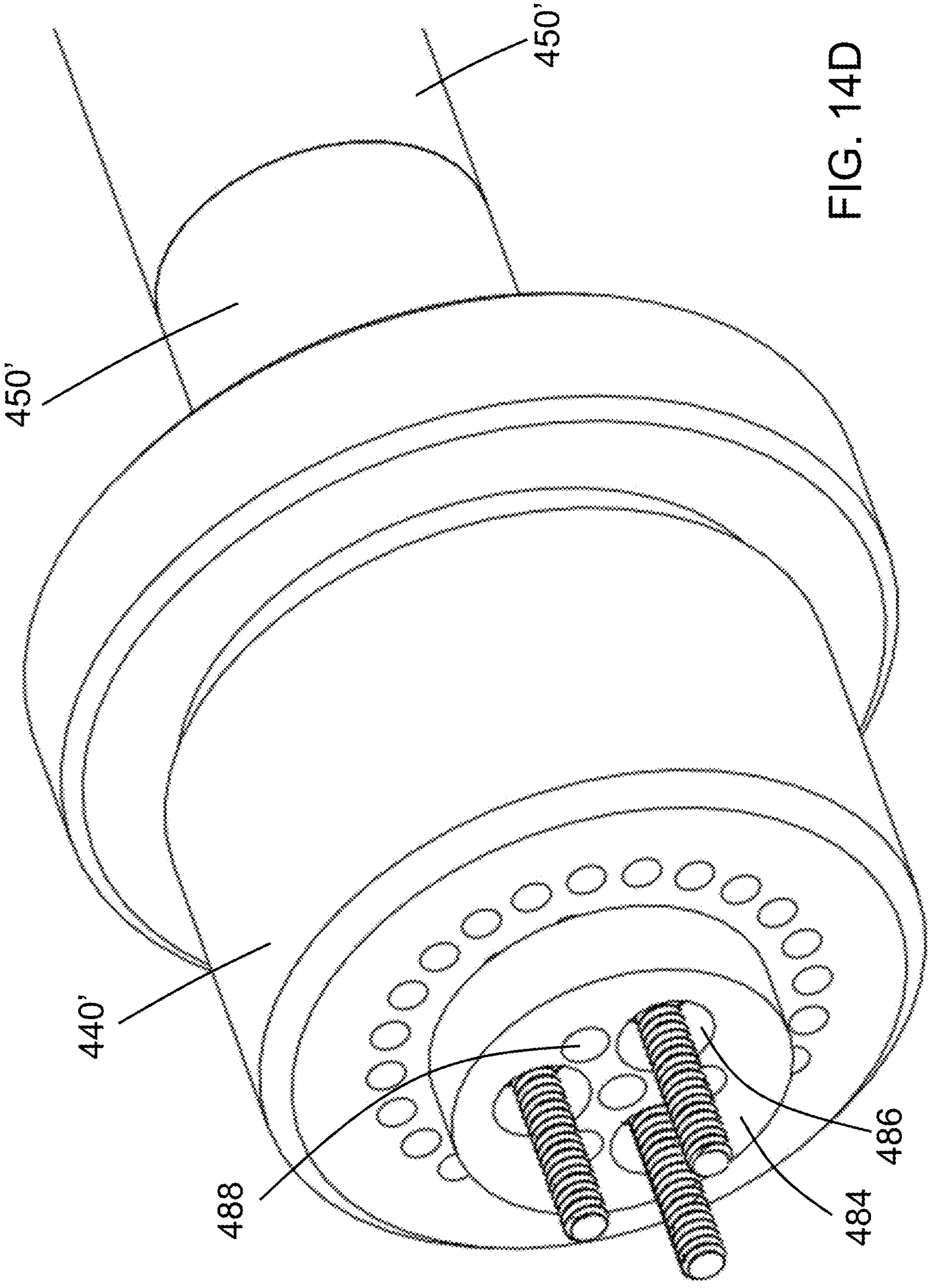
Figure 14E:
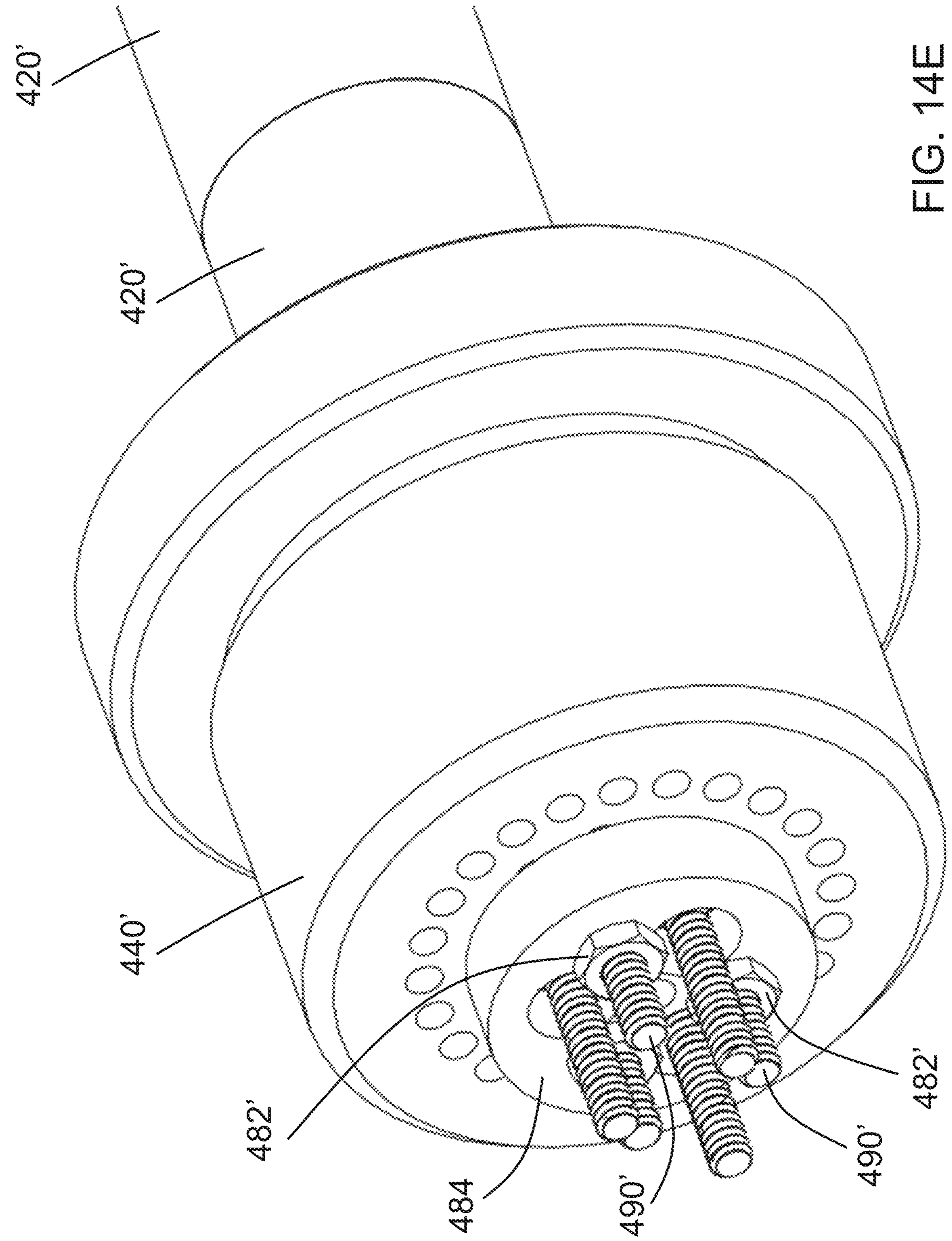
Figure 14F:
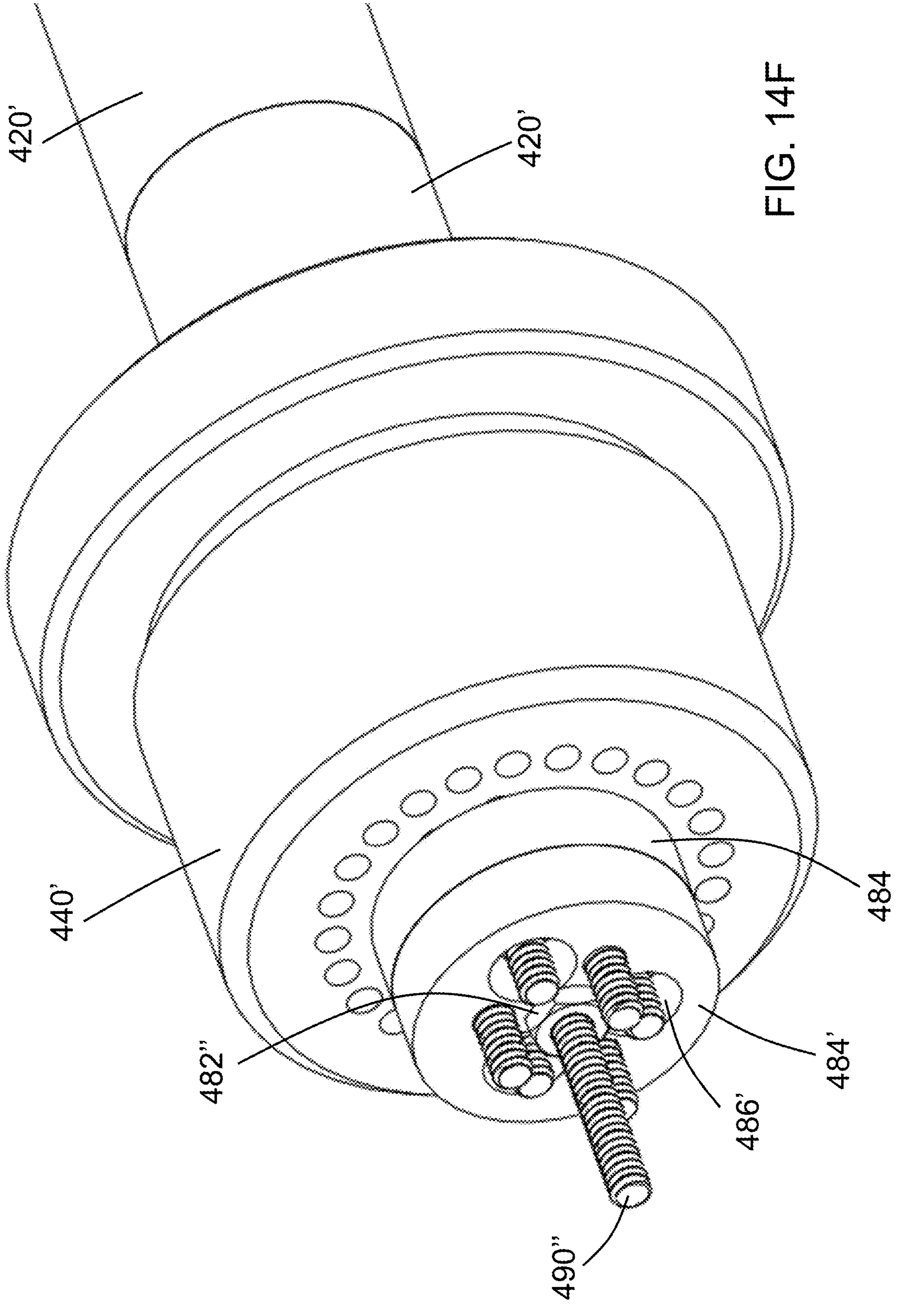

FIG. 14A is a magnified view of the area P5' in FIG. 13 showing, in cross-section, the mandrel tensioning cap 440' and mandrel spacers 420' at a first end 404' of the alternative embodiment of the tensioned fuel monolith stack mandrel assembly 400'. FIG. 14B is a magnified view of the area P9' in FIG. 13 showing, in cross-section, the mandrel tensioning cap 470' and mandrel spacers 450' at a second end 406' of the alternative embodiment of the tensioned fuel monolith stack mandrel assembly 400'.

FIGS. 14C to 14F are perspective views of the first end 404' of the alternative embodiment of the tensioned fuel monolith stack mandrel assembly 400' at various points in time during assembly. In a first step (see FIG. 14C), drill rods 490' are inserted, e.g., by sliding, into channels 30'. Typically, the drill rods 490' will be symmetrically arranged around a centerline of the fuel monolith stack mandrel assembly 400'. A threaded nut 482 is threaded onto the end of each drill rod 490' and tightened. Then (see FIG. 14D), a first spacer 484 is added over the end of each drill rod 490'. The first spacer 484 has a geometrically-shaped countersunk recess 486 for each opening in the first spacer 484 through which a drill rod 490' will protrude and additional holes 488 that align with holes in the mandrel tensioning cap 440' that are covered by the first spacer 484, but not occupied at this point by a drill rod 490'. The geometrically-shaped countersunk recess 486 for the first spacer 484 has the shape of a circle or other shape that allows for a tool to be inserted and mate with the threaded nut 482 to facilitate tightening by turning the threaded nut 482 with a tool. Another set of drill rods 490' are inserted, e.g., by sliding, though holes in the first spacer 484 and into channels 30' and a threaded nut 482' is threaded onto the end of each drill rod 490' and tightened (See FIG. 14E). Then (see FIG. 14F), a second spacer 484' is added over the end of each drill rod 490'. The second spacer 484' has a countersunk recess 486' for each opening in the second spacer 484' through which a drill rod 490' will protrude that provides a clearance for tightening of the threaded nut 482'. In addition, a center drill rod 490" is added and tensioned with a threaded nut 482".

Figure 14G:
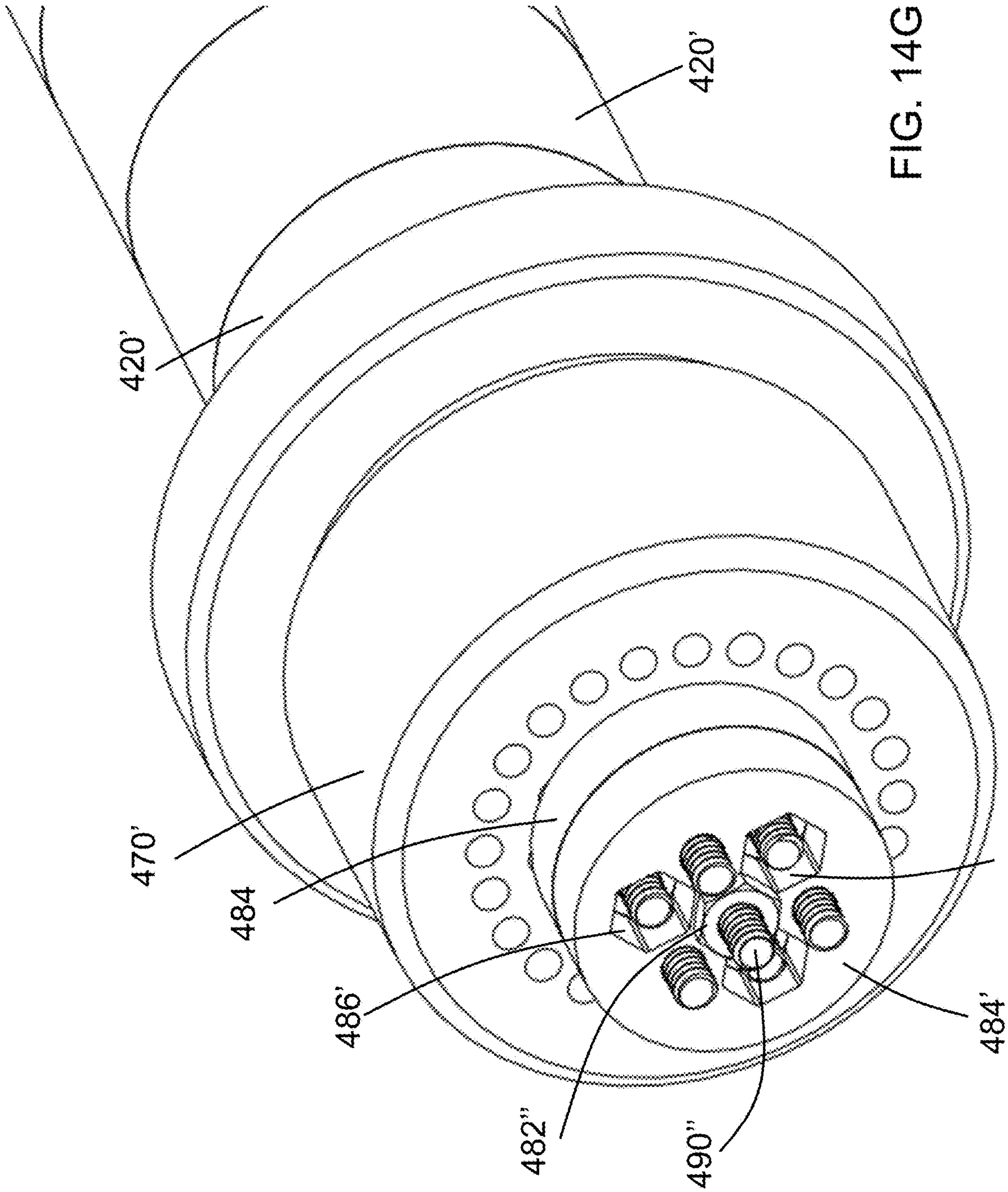
FIG. 14G is a perspective view of the second end of the alternative embodiment of the tensioned fuel monolith stack mandrel assembly after assembly.

FIG. 14G is a perspective view of the second end of the alternative embodiment of the tensioned fuel monolith stack mandrel assembly after assembly. At the second end, the drill rods 490' have extended from the channels beyond the end surface of the mandrel tensioning cap 470' and threaded nuts have been placed on each drill rod 490'. Two spacers are present, first spacer 484 and second spacer 484', and are attached and threaded nuts 482' added in the same way as described for the first end. However, at the second end, each spacer includes a geometrically-shaped countersunk recess 486', such as a hex shape, that mates to the outer circumference of the threaded nut 482' that is placed on the end of the drill rod 490' and facilitates tightening by turning the drill rod 490' from the other end while the threaded nut 482' bears against the recess 486'.

Figure 14H:
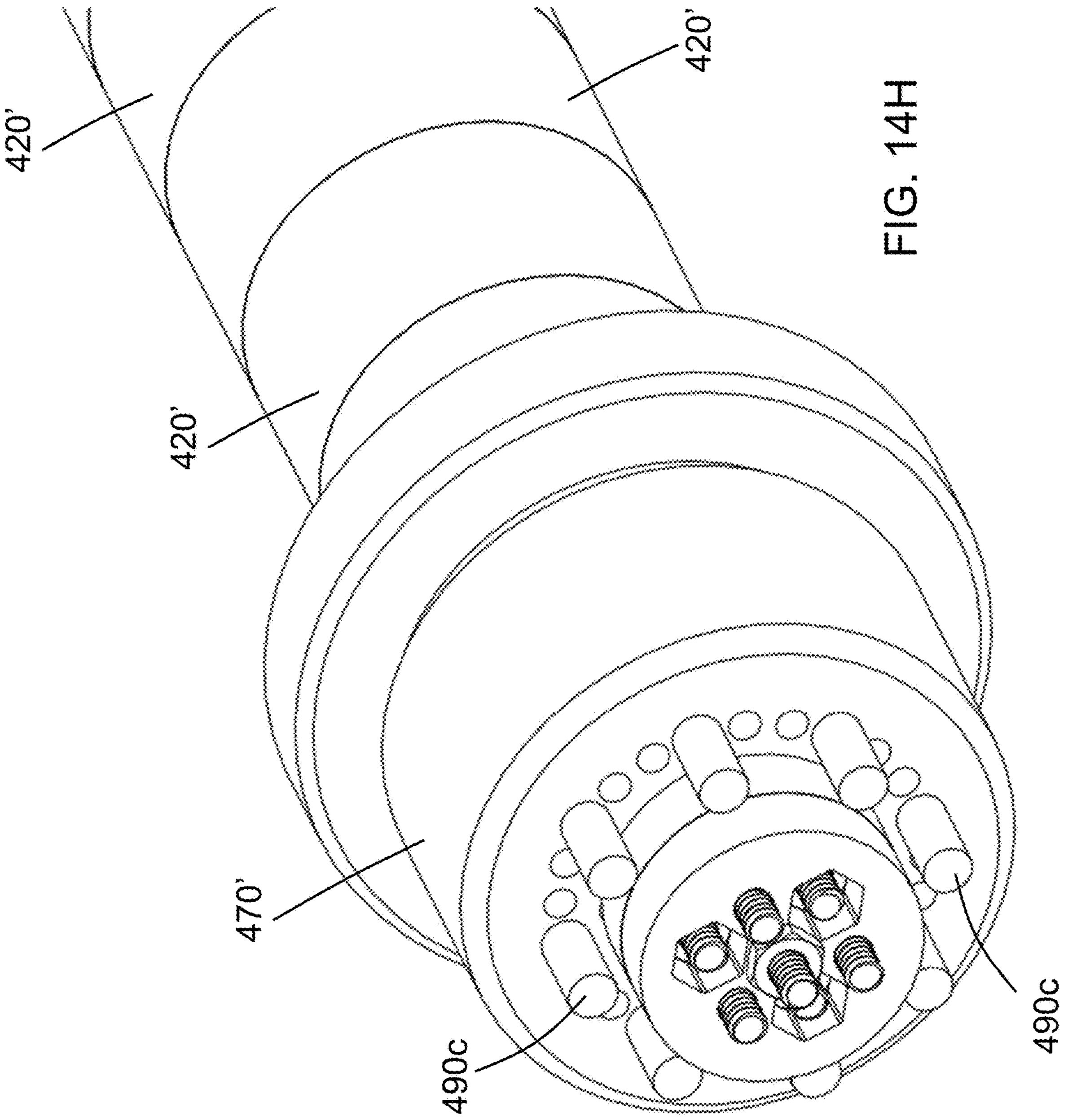
FIG. 14H is a perspective view of the second end of the alternative embodiment of the tensioned fuel monolith stack mandrel assembly after adding the tensioning cables.

Subsequently, tensioning cables 490*c* can be added as described herein in relation to the first embodiment of the fuel monolith stack mandrel assembly 400, and as shown in FIG. 14H.

Figure 15:
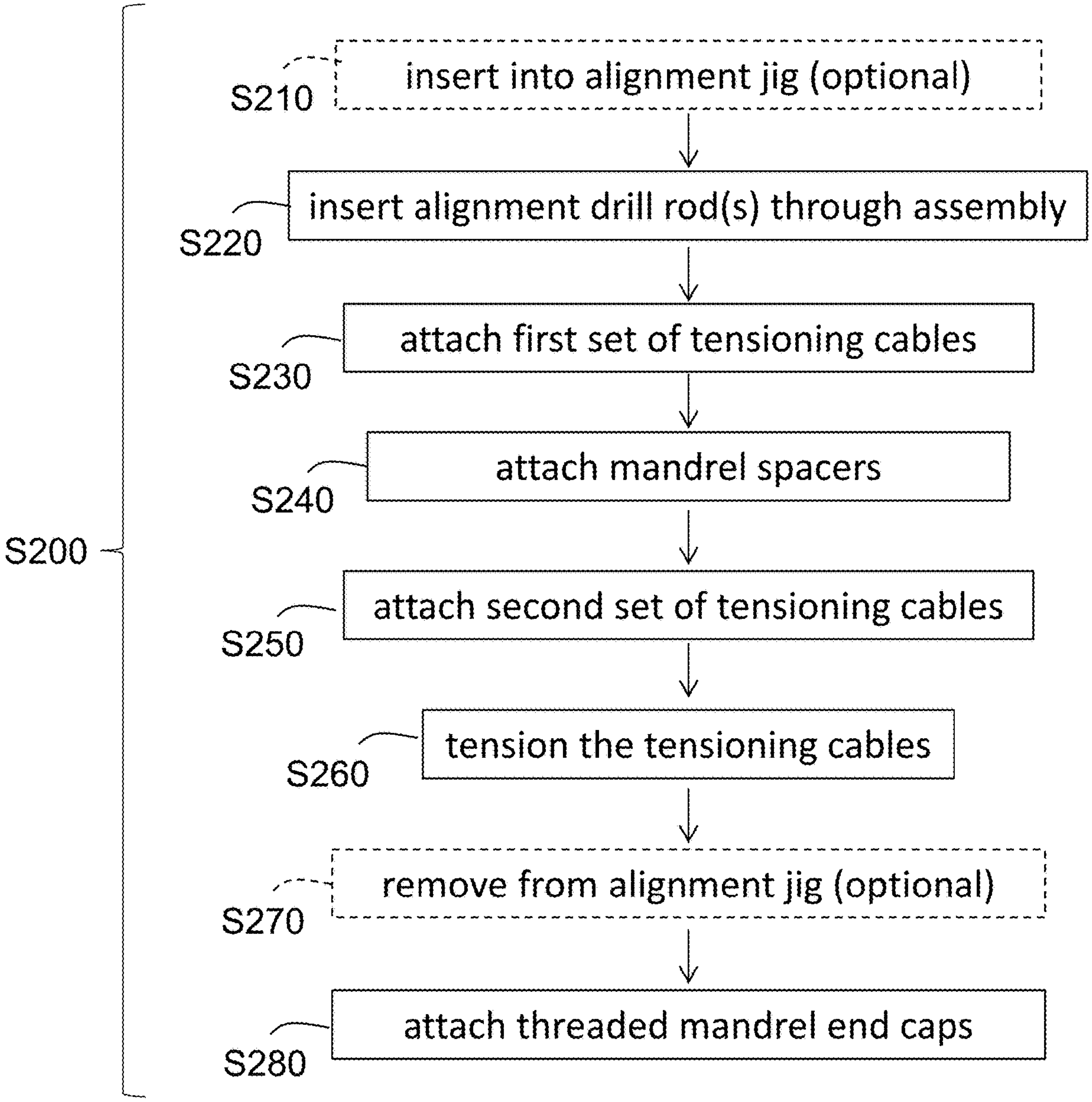
FIG. 15 is a flow diagram setting forth various steps in an embodiment of a method of preparing a tensioned fuel monolith stack mandrel assembly.

FIG. 15 is a flow diagram setting forth various steps in an embodiment of a method of preparing a tensioned fuel monolith stack mandrel assembly. The method S200 for preparing a tensioned fuel monolith stack mandrel assembly 400 includes steps of: S220 inserting drill rod(s) 480 into the fuel assembly core 100, S230 attaching the first set of tensioning cables 490*a*, S240 attaching the mandrel spacers 420, 450 at the exhaust end of the fuel assembly core 100 and at the inlet end of the fuel assembly core 100, S250 attaching the second set of tensioning cables 490*b*, and S260 tensioning the tensioning cables 490*a*, 490*b*. Once the assembly is tensioned, threaded mandrel end caps 440, 470 are attached to form the tensioned fuel monolith stack mandrel assembly 400.

The method S200 optionally uses an alignment jig (see Step S210) to assist with placing and aligning the various components and for alignment support during the tensioning process. Placing into the alignment jig can occur any time before tensioning the tensioning cables (Step S260). After tensioning is complete in Step S250, the assembly is removed from the alignment jig (Step S270). Removing from the alignment jig can occur either before or after attaching the threaded mandrel end caps 440, 470 (Step S280).

Additional processing of the tensioned fuel monolith stack mandrel assembly 400 can occur, as needed, prior to proceeding with applying the insulation layer 120 (Step S150), such as dimensional verifications and correction as needed, such as for straightness, Step S220 inserts one or more drill rods 480 into the fuel assembly core 100. Fuel Monoliths 10 are aligned in a stack using the interior diameters of the channels 30 and drill rods inserted into the same. If using an alignment jig or other support, it can be used to cradle the fuel assembly core 100 while inserting the one or more drill rods 480. The clearance of the drill rod to the interior diameter of the channel 30 is as small as possible, for example, 25 microns to 75 microns of clearance. The drill rods provide rotational restraint and at least two drill rods 480 are used, alternatively 6-7 drill rods 480 are used. At least one drill rod 480 is provided in the central channel 30' and extends axially beyond each end of the fuel assembly core 100. Other of the plurality of drill rods 480 may optionally also extend axially beyond each end of the fuel assembly core 100. These axially extending drill rods 480 provide alignment for the subsequent attachment of the mandrel spacers 420, 450.

Step S230 attaches a first set of tensioning cables 490*a*. The first set of tensioning cables 490*a* are installed in a plurality of non-parallel channels 132 at the peripheral region of the exhaust support plate 130. Using the non-parallel channels 132 guides the first set of tensioning cables 490*a* to respective channels 30"" in the outer ring 56 of exhaust support plate 130. The second end of each of the first set of tensioning cables 490*a* has a termination 494 and the first end of each of the first set of tensioning cables 490*a* are inserted through the channels 30 in the fuel monolith until the respective termination 494 seats against the exhaust support plate 130. The terminations 494 can be chamfered and short so that they fit in the void space between the exhaust support plate 130 and the truncated conical section

152 of the exhaust shield assembly 150. In alternative embodiments, one or more or all of the first set of tensioning cables 490*a* can be replaced by threaded rods and the terminations 494 can be a threaded nut.

Step S240 attaches exhaust end mandrel spacers 450 and the inlet end mandrel spacers 420. The axially extending drill rods 480 are inserted into the holes 422 in the mandrel spacers 420,450 and the mandrel spacers 420,450 are sequentially attached to build up the respective mandrel spacer sections 430,460. The number of mandrel spacers 420,450 can vary, as long as the length of the first mandrel spacer section 430 and the length of the second mandrel spacer section 460 provides a sufficient runout space for the turnaround region of the helical winding process used in the formation of the insulator layer 120. A sufficient runoff space results in the helical winding process being uniform over the entire length of the finished insulated fuel assembly 100.

The mandrel spacers can be installed in any sequence between exhaust end and inlet end, as long as the proper type of mandrel spacer is used at each end. Inlet end mandrel spacers 420 have the same basic geometry as the fuel monoliths 10 (see FIG. 11D). Exhaust end mandrel spacers 450 have a first exhaust end mandrel spacer 450 with an end surface that mates to the second end face 140 of the exhaust support plate 130. Also, exhaust end mandrel spacers 450 located within the exhaust shield assembly 150 have a diameter that fits within the tubular section 154 of the exhaust shield assembly 150, while exhaust end mandrel spacers 450 located outside the exhaust shield assembly 150 have a larger diameter, e.g., a diameter that matches the outer diameter of the tubular section 154 of the exhaust shield assembly 150, so that during subsequent mandrel winding fiber tows have a smooth surface for the fiber landing.

At the same or separate time from attaching the mandrel spacers 420,450, the first set of tensioning cables 490*a* are inserted into the holes 422 in the inlet end mandrel spacers 420.

Step S250 attaches a second set of tensioning cables 490*b*. The second set of tensioning cables 490*b* are installed from the distal end of one of the mandrel sections 430,460 and are threaded through holes 422,452 in the respective mandrel spacers 420, 450 and through the correspondingly aligned channels in the exhaust support plate 130 and the fuel monoliths 10. Typically, the second set of tensioning cables 490*b* are installed starting from the exhaust end by inserting a first end of each tensioning cable 490*b* into a respective hole 452 in the exhaust end mandrel spacers 450. The holes 422,452 in the respective mandrel spacers 420, 450 are selected so that the second set of tensioning cables 490*b* extend through holes 30 in the intermediate ring 54 of the fuel monoliths 10. The second end of each of the second set of tensioning cables 490*b* has a termination 492 and the first end of each of the second set of tensioning cables 490*b* are inserted until the respective termination 492 seats against the end face of the respective end mandrel spacers 420,450 (depending on which end from which the insertion begins). In alternative embodiments, one or more or all of the second set of tensioning cables 490*b* can be replaced by threaded rods and the terminations 492 can be a threaded nut.

At the same time as or separate time from attaching the second set of tensioning cables 490*b*, the second set of tensioning cables 490*a* are inserted into the holes 422 in the inlet end mandrel spacers 420.

The second set of tensioning cables 490*b* can be the same tensioning cables or different tensioning cables from the first set of tensioning cable 490*a*.

In example embodiments, there are 18 tensioning cables 490*a* in the first set of tensioning cables 490*a* and 6 tensioning cables 490*b* in the second set of tensioning cables 490*b*. Other arrangements can be used, such as a plurality of inner threaded drill rods and a plurality of outer tensioned cables, e.g., seven inner threaded drill rods and four to eight outer tensioned cables.

Step S260 tensions the tensioning cables 490*a*, 490*b*. Cable tensioning is done to balance the forces on the fuel monolith stack mandrel assembly 400. For example, one or two pairs of tensioning cables, i.e., two tensioning cables or four tensioning cables, in the same set of tensioning cables, i.e., the first set of tensioning cables 490*a* or the second set of tensioning cables 490*b*, can be simultaneously tensioned to balance out any adverse moments inside the fuel monolith stack mandrel assembly 400. Such adverse moments would otherwise tend to cause the fuel monolith stack mandrel assembly 400 to bend. When tensioning the pairs of tensioning cables, opposing tensioning cables are used.

The tensioning sequence begins with the center grouping of second set of tensioning cables 490*b*. It should be noted that the first set of tensioning cables 490*a* are more easily tensioned from the inlet side because of the arrangement of structures in the exhaust end, such as the exhaust end mandrel spacers 450 and the exhaust shield assembly 150. While the second set of tensioning cables 490*b* can be tensioned from either end. For convenience, the assembly sequence and insertion of the tensioning cables 490*a*,490*b* can result in both the first set of tensioning cables 490*a* and the second set of tensioning cables 490*b* being tensioned from the same end, such as at the first end 404, which corresponds to the first end 104 (or inlet end) of the insulated fuel assembly core 100.

Once each tensioning cable has been tensioned to the final tension, the end is terminated. Termination can be by suitable means, such as by a crimp 492 or with a termination fixture.

The tensioning the second set of tensioning cables 490*b*, the tensioning sequence continues with tensioning of the first set of tensioning cables 490*a*, which proceeds in similar fashion to that of tensioning the second set of tensioning cables 490*b*.

Figure 16:
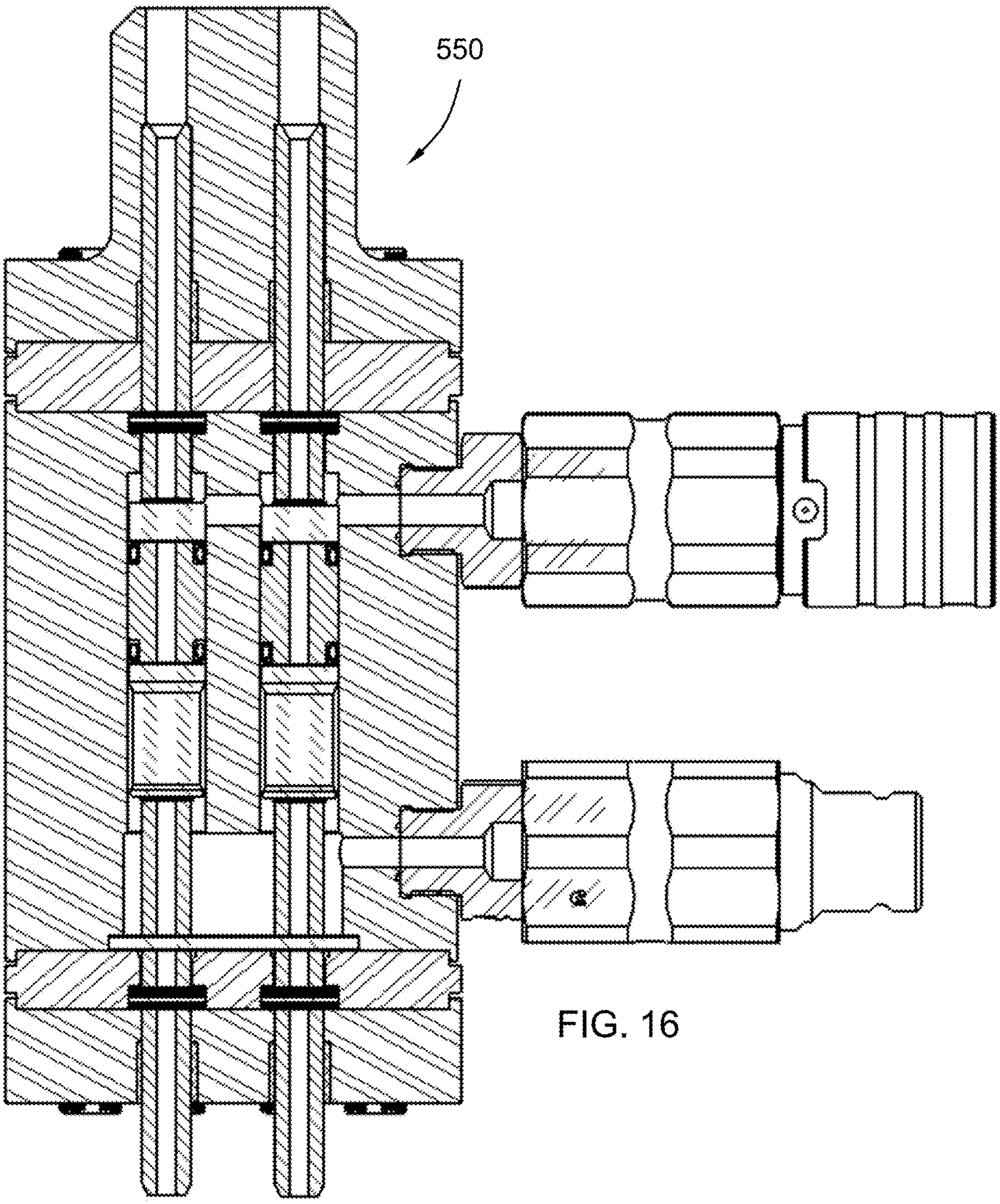
FIG. 16 is a schematic, cross-sectional illustration of a twin bore hydraulic tensioner system.

In one aspect, a twin bore hydraulic tensioner system can be used to tension the fuel monolith stack mandrel assembly. FIG. 16 is a schematic, cross-sectional illustration of a twin bore hydraulic tensioner system. A twin bore hydraulic tensioner system 500 can be used to provide even tension on two cables at the same time and can be used during the tension step S260.

In some embodiments, an end plate is positioned over the terminus end of each mandrel spacer section 430, 460, which distributes the forces associated with tensioning the tension cables 460*a*,490*b*. In exemplary embodiments, the force in each tensioning cable 460*a*,490*b* is about 85 N/M to about 450 N/m, alternatively about 225 N/m (20 lbf to 100 lbf, alternatively 50 lbf).

In optional embodiments, a stack of small Bellville washers may be used between the end plate and the termination. This addition of high force springs can make the overall tensioned assembly more resilient to adverse deflection when the assembly process is completing attachment of mandrel spacers 420

In other optional embodiments, a high tensile monofilament plastic wire replaces one or more or all of the metal tensioning cables. High tensile monofilament plastic wire maintains tension down the cable better than metal tensioning cables. When used, tension may be applied to the high tensile monofilament plastic wire until it yields in elastic or plastic deformation, and then the termination can be applied.

Although described above in the sequence of Steps S220 to S250, in that order, other orders of Steps S220 to S250 can be used. For example, some or all of the mandrel spacers 420,450 can be placed prior to attaching the first set of tensioning cables 490*a* by, for example, placing the mandrel spacers 420,450 on the drill rod 480. Also for example, the second set of tensioning cables 490*b* can be attached prior to completing the attachment of all the mandrel spacers 420, 450 by, for example, attaching the second set of tensioning cables 490*b* after attaching the mandrel spacers 420 of the first mandrel spacer section 430.

Other variations can also be used, as long as the sequence results in an assembly ready for tensioning in Step S260 with (a) a first termination 494 of each of the first set of tensioning cables 490*a* is adjacent the second end face 140 of the exhaust support plate 130 and a second end each of the first set of tensioning cables 490*a* projects from a first set of holes 422 in the most distal mandrel spacer 420 at the other end of the assembly, e.g., the first end 404, and in a position to be able to be tensioned and (b) a first termination 492 of each of the second set of tensioning cables 490*b* is adjacent the distal end of the most distal mandrel spacer 450 on the second end 406 and a second end each of the second set of tensioning cables 490*b* projects from a second set of holes 422 in the most distal mandrel spacer 420 at the other end of the assembly, e.g., the first end 404, and in a position to be able to be tensioned Step S280 attaches the threaded mandrel end caps 440, 470 in preparation for application of mandrel wound insulation layer 120 (Step S150). Threaded mandrel end caps 440,470 can also be attached earlier in the method S200, once access to the end on which that threaded mandrel end cap is attached is no longer needed.

Figure 17:
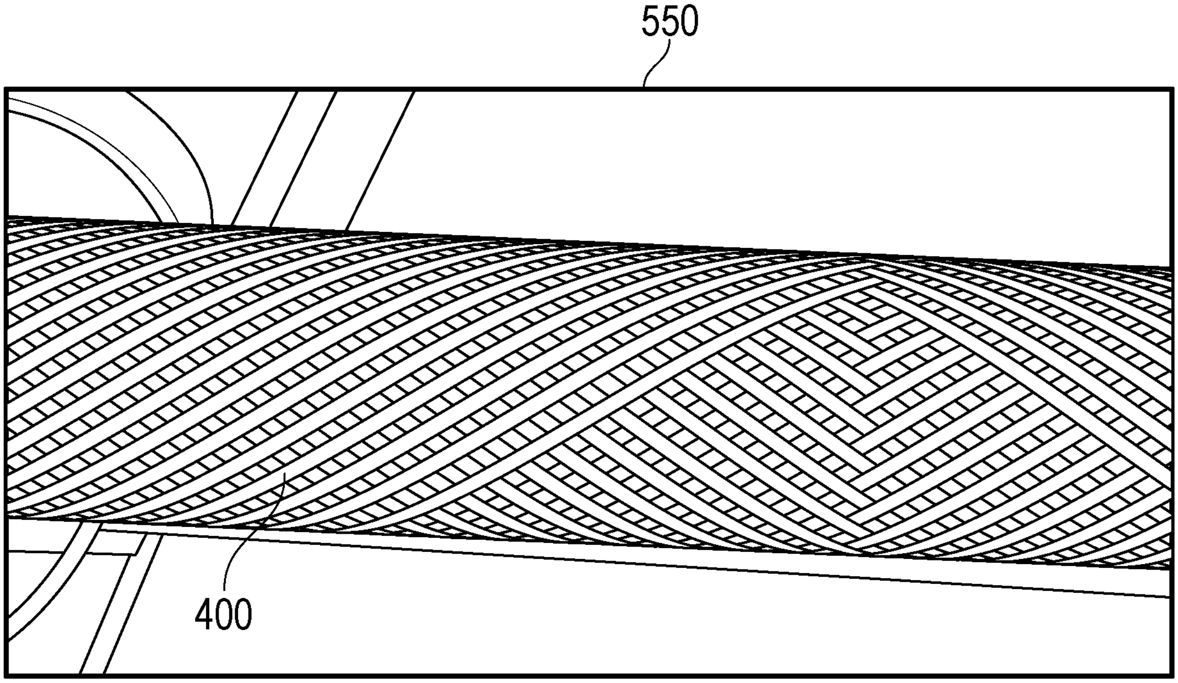
FIG. 17 is an image showing an embodiment of the winding of insulation layers on the tensioned fuel monolith stack mandrel assembly.

FIG. 17 is an image 550 showing an embodiment of the winding of insulation layers on the tensioned fuel monolith stack mandrel assembly 400. Visible in image 550 is the basket weave pattern, which decreases fiber density and, therefore, decreases radial thermal conductivity in both the inner insulation layer 120*a* and the outer insulation layer 120*b*. The space between tows in the basket weave pattern can be adjusted to 1 mm to 5 mm. The helix angle of the fiber winding can be held constant or can be varied as a function of length down the pre-bundle to optimize strength in specific axial locations. Helix angles (θ) of equal to or greater than 80 degrees (for example, greater than 80 degrees to less than 90 degrees, equal to or greater than 85 degrees to equal to or less than 90 degrees, or equal to or greater than 86 degrees to equal to or less than 88 degrees) can be used. CNC manufacturing techniques provides maximum control over fiber placement and uniformity.

Figure 18:
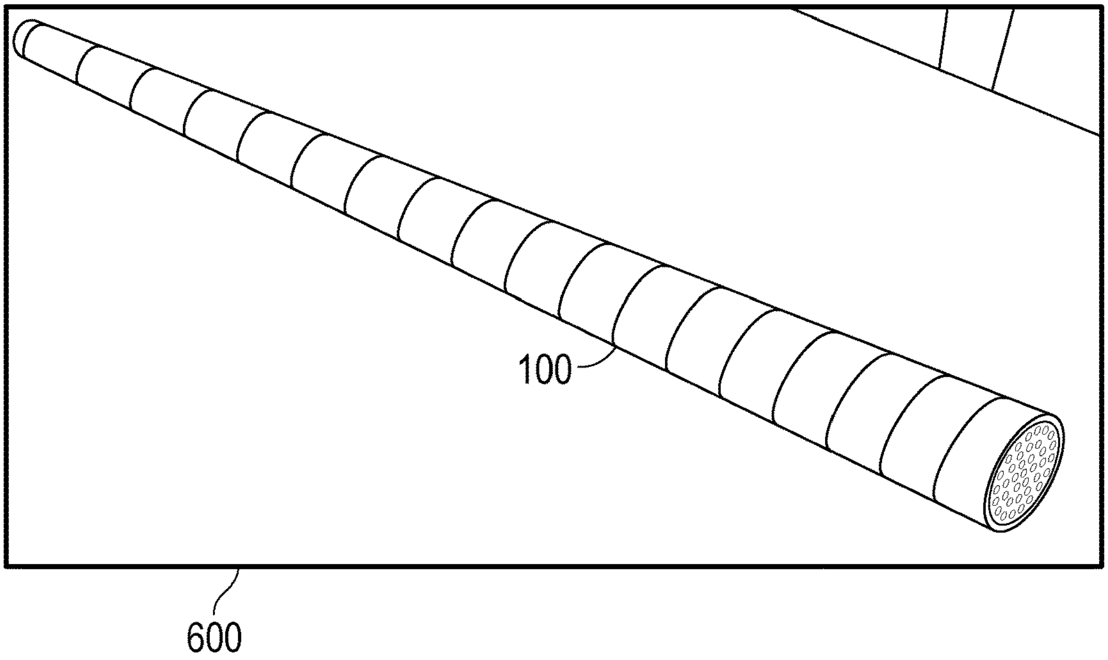
FIG. 18 is an image showing a perspective view of an embodiment of an insulated fuel assembly core.
Figure 19:
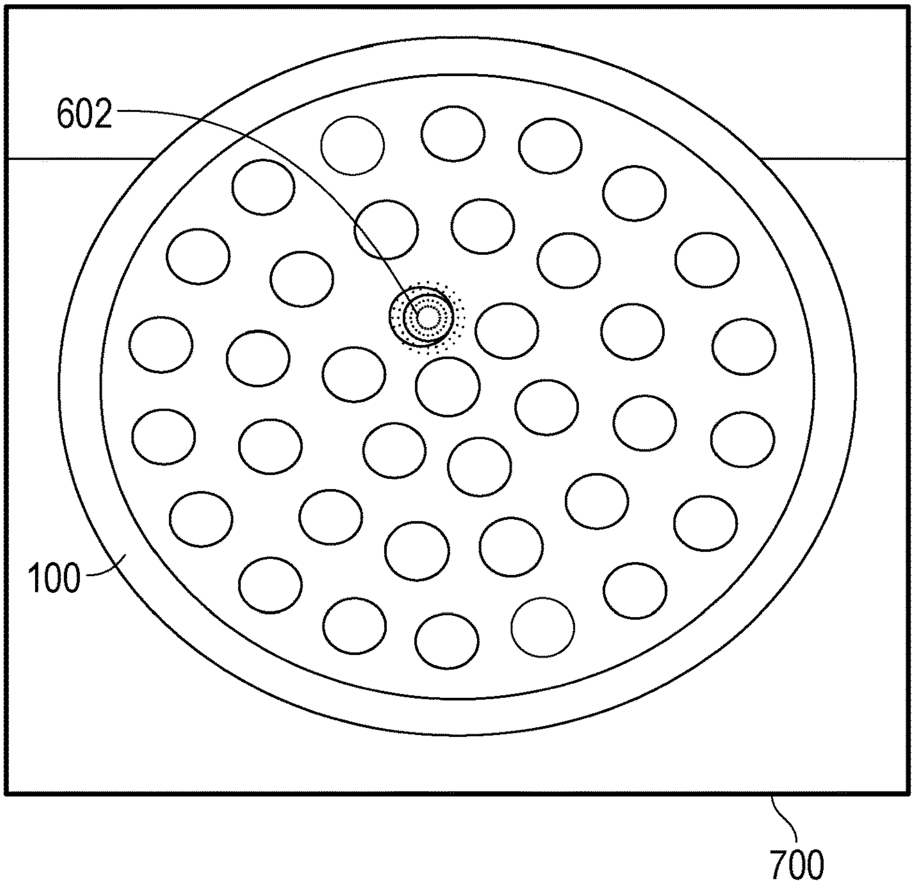
FIG. 19 is an image showing a view of an embodiment of an insulated fuel assembly core along the longitudinal axis.

FIG. 18 is an image 600 showing a perspective view of an embodiment of an insulated fuel assembly core 100 and FIG. 19 is an image 700 showing a view of an embodiment of an insulated fuel assembly core 100 along the longitudinal axis 102. Note the light visible though the parallel channel 602 in the first inner ring of the fuel assembly core 110.

Figure 20A:
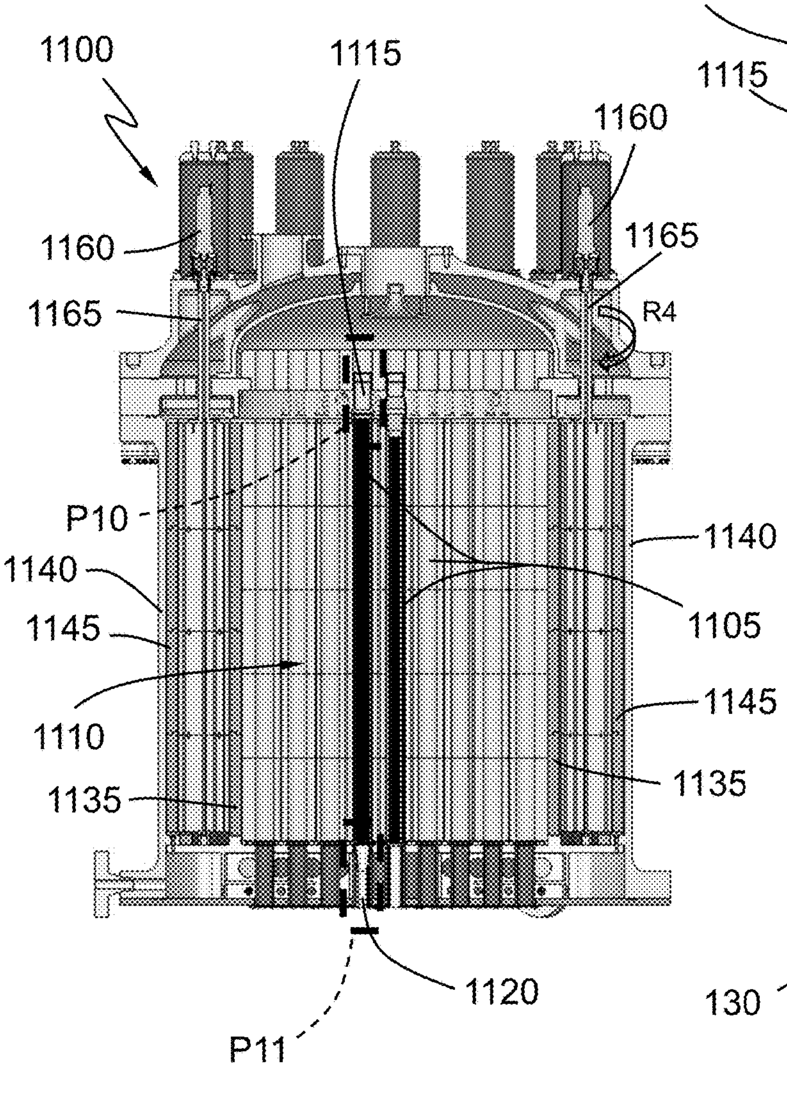
FIG. 20A is a cross-sectional, side view of an embodiment of a nuclear propulsion fission reactor structure within a vessel and with fuel assemblies as disclosed herein.

FIG. 20A is a schematic, cross-sectional, side view of an embodiment of a nuclear propulsion fission reactor structure within a vessel and with fuel assemblies comprising an insulated fuel assembly core, as described herein, within a fuel assembly outer structure. Embodiments of the nuclear fission reactor structure 1100 includes a plurality of fuel assemblies 1105 (for example, a fuel assembly 200 formed from an insulated fuel assembly core 100 and a fuel assembly outer structure 210) located within an active core region 1110 of the nuclear fission reactor structure 1100 (the active core region 1110 being the internal region where the moderator block 1155 is located and the fuel assemblies 1105 within the moderator block 1155). At the inlet and the outlet of the fuel assemblies 1105, inlet connection assembly 1115 (including, for example, inlet connection assembly 220) and outlet connection assembly 1120 (including, for example, the exhaust shield assembly 150) the provide fluid communication for propellant supplied to and exhausted from each of the fuel assemblies 1105. Thus, the inlet connection assemblies 1115 connect to or interface with an inlet plenum and the outlet connection assemblies 1120 connect to or interface with an exit plenum.

Figure 20B:
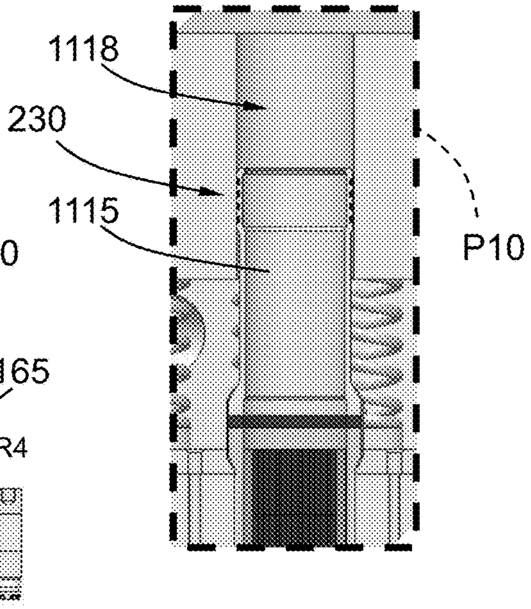
FIG. 20B is a magnified view of the area P10 in FIG. 20A showing, in cross-section, the inlet end of a fuel assembly

An interface structure 1125, which may or may not include supplemental radial restraint, is radially outward of the active core region 1110 and a reflector 1135 is radially outward of the interface structure 1125. A first surface of the interface structure 1125 is conformal to the outer surface of the active core region 1110 and a second surface of the interface structure 1125 is conformal to an inner surface of the reflector 1135. The inner surface of the reflector 1135 is oriented toward the active core region 1110, and the interface structure 1125 functions to mate the geometry of the outer surface of the active core region 1110 to the geometry of the inner surface of the reflector 1135, thus allowing various geometries and arrangements for the active core region 1110, such as cylindrical or polygonal FIG. 20B is a magnified view of the area P10 in FIG. 20A showing, in cross-section, the inlet end of a fuel assembly 1105 including inlet connection assembly 1115. Note how the seals 230 contact the inner surface of the opening 1118 and provide freedom of motion for change in axial dimension due to thermal expansion.

Figure 20C:
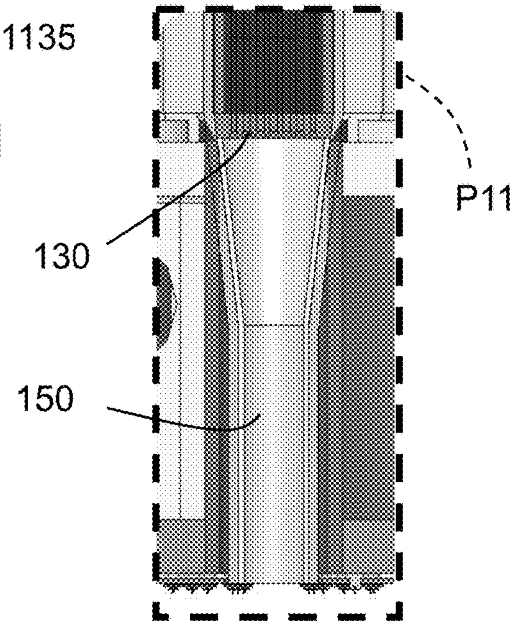
FIG. 20C is magnified view of the area P11 in FIG. 20A showing, in cross-section, the exhaust end of a fuel assembly.

FIG. 20C is magnified view of the area P11 in FIG. 20A showing, in cross-section, the exhaust end of a fuel assembly 1105. FIG. 20C includes the exhaust support plate 130 and the exhaust shield assembly 150.

Figure 21:
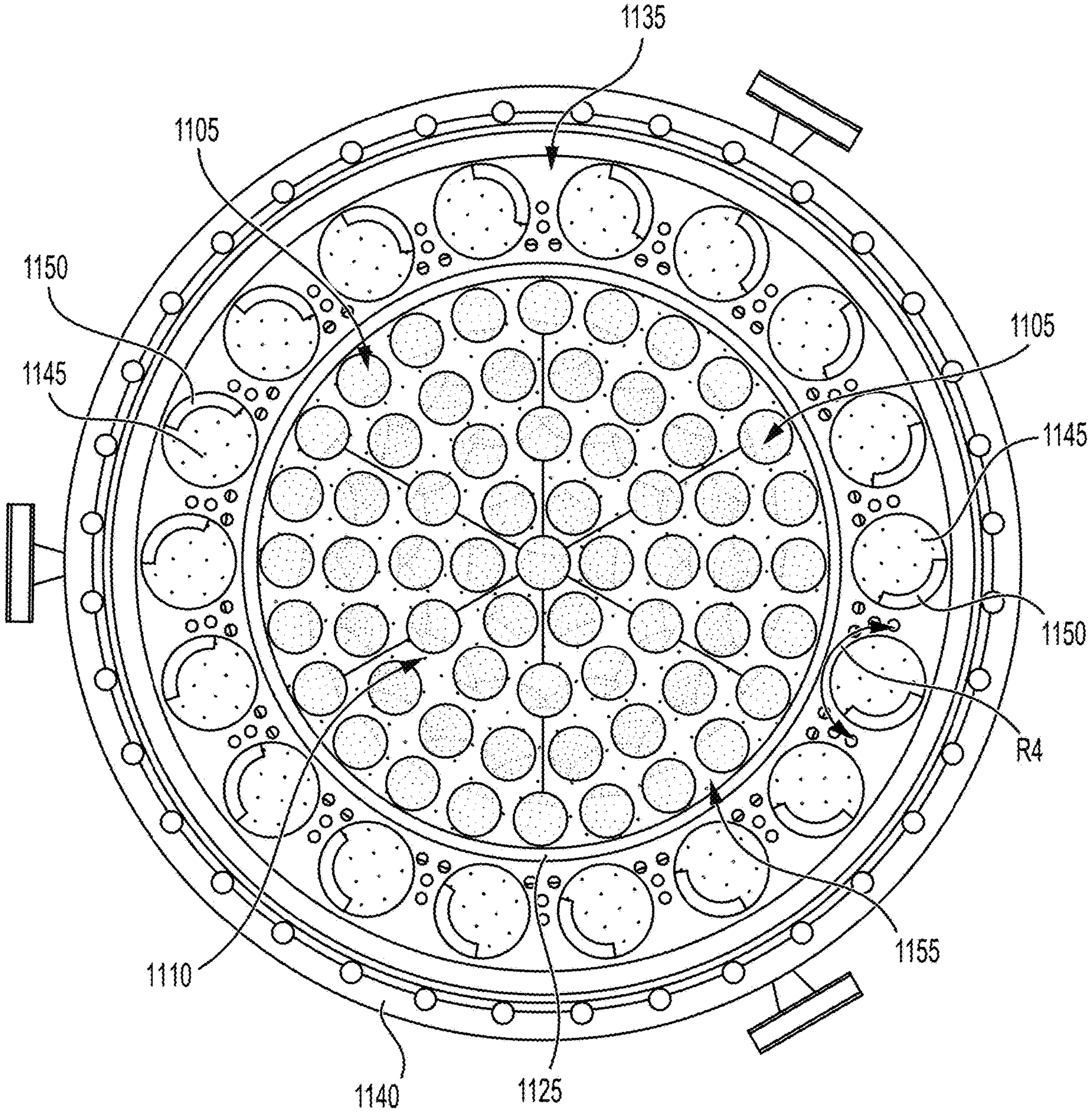
FIG. 21 is a cross-sectional, top view of an embodiment of an embodiment of a nuclear propulsion fission reactor structure within a vessel and with fuel assemblies as disclosed herein.

FIG. 21 is a schematic, cross-sectional, top view of an embodiment of an embodiment of a nuclear propulsion fission reactor structure 1100 within a vessel 1140. A plurality of control drums 1145, each including a neutron absorber body 2150, is located within a volume of the reflector 1135, such as in an annular section on the outer portion of the cylindrically shaped control drum. The control drum 1145 itself is made of a neutron reflecting material, similar to the reflector 1135. The neutron absorber body 1150 is made of a neutron absorbing material and is movable, such as by rotation R4, between a first position and a second position. In the first position, the neutron absorber body 1150 is radially closer to the active core region 1110 than when the neutron absorber body 1150 is in the second position. In exemplary embodiments, the first position is radially closest to the active core region 1110 and the second position is radially farthest from the active core region 1110. The neutron absorber body 1150 is movable between the first position and the second position to control the reactivity of the active core region 1110. In the illustrated example, the neutron absorber body 1150 is rotatable in conjunction with a movement of the control drum 1145 from the first, radially closer position, to the second position by rotation (R4) around an axis of the control drums 1145. However, other radial positions and/or movement directions can be implemented as long as the various positions to which the neutron absorber body 1150 can be moved provides control of the reactivity of the active core region 1110. In some embodiments, when the plurality of neutron absorber bodies 1150 are each at the first, radially closer position, each of the plurality of neutron absorber bodies 1150 are radially equidistant from the axial centerline of the active core region 1110. Other control concepts can also be implemented, such as regulating neutron leakage by opening and closing portions of the reflector 1135.

The nuclear fission reactor structure can further comprise a vessel 1140. FIGS. 20A and 21 schematically illustrate an embodiment of a nuclear fission reactor structure 1100 with a vessel 1140. The nuclear fission reactor structure 1100, which includes the active core region 1110, the interface structure 1125, the inlet connection assembly 1115 and outlet connection assembly 1120, the reflector 1135, and the plurality of control drums 1145 with neutron absorber bodies 1150, is housed within an interior volume of the vessel 1140.

As shown in FIG. 20A, motors 1160 are operatively attached for rotation to the control drums 1145 by a drum shaft 1165. Motors 1160 may be housed in pressure boundary extensions of the vessel 1140 or alternatively may not be, in which case seals are required around the drum shafts 1165. Motors internal to the vessel 1140 can also be implemented.

Embodiments of the vessel 1140 are formed from machined forgings and generally use high strength aluminum or titanium alloys due to weight considerations. The vessel 1140 can be multiple components that are then assembled together, for example, with fasteners. However, in other embodiments, the vessel 1140 can be one contiguous component or a welded together assemblage.

Additional disclosure related to the nuclear fission reactor structure and its components can be found in U.S. patent application Ser. No. 16/999,244, the entire contents of which are incorporated by reference.

The disclosure is also directed to a nuclear thermal propulsion engine that includes the nuclear fission reactor structure 1100 within a vessel 1140 within a reactor section 1170. The nuclear thermal propulsion engine further includes a shielding section 1175, a turbo machinery section 1180, and a nozzle section 1185 attached to or supported by the vessel 1140, for example, as consistent with that shown in FIGS. 22A and 122B.

Figure 22A:
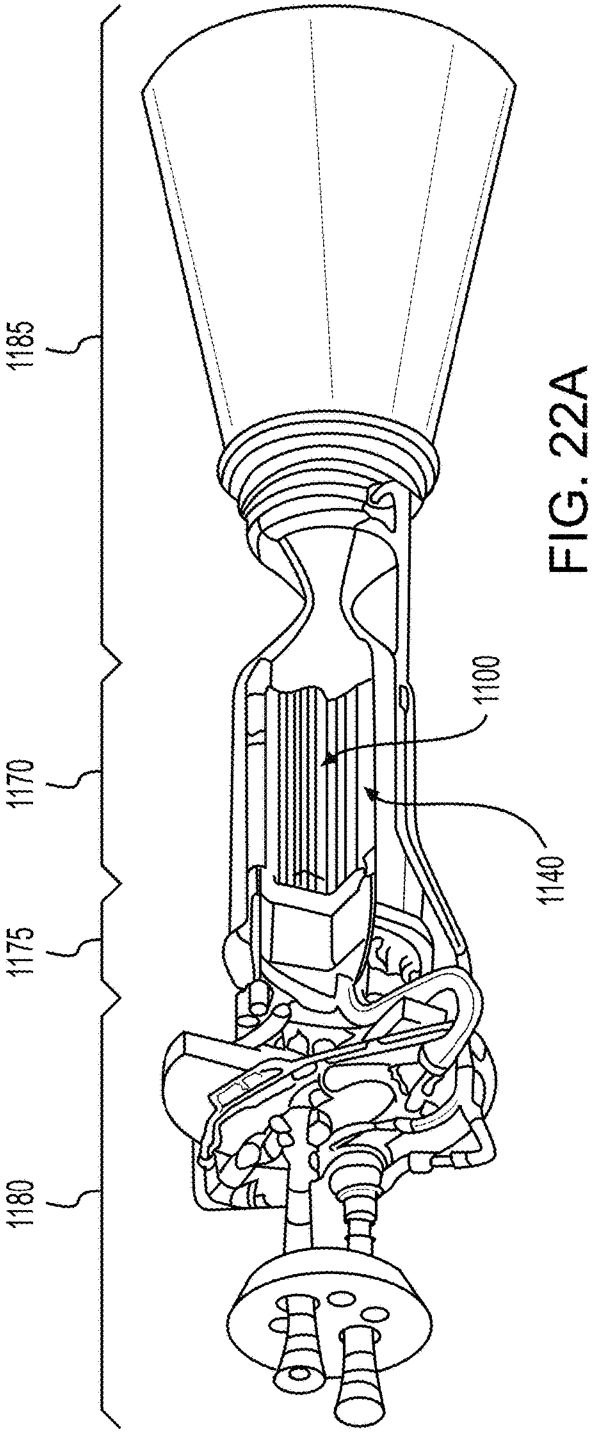
FIG. 22A is a partial, cross-section view of an embodiment of a nuclear thermal propulsion engine incorporating a nuclear propulsion fission reactor structure as disclosed herein.
Figure 22B:
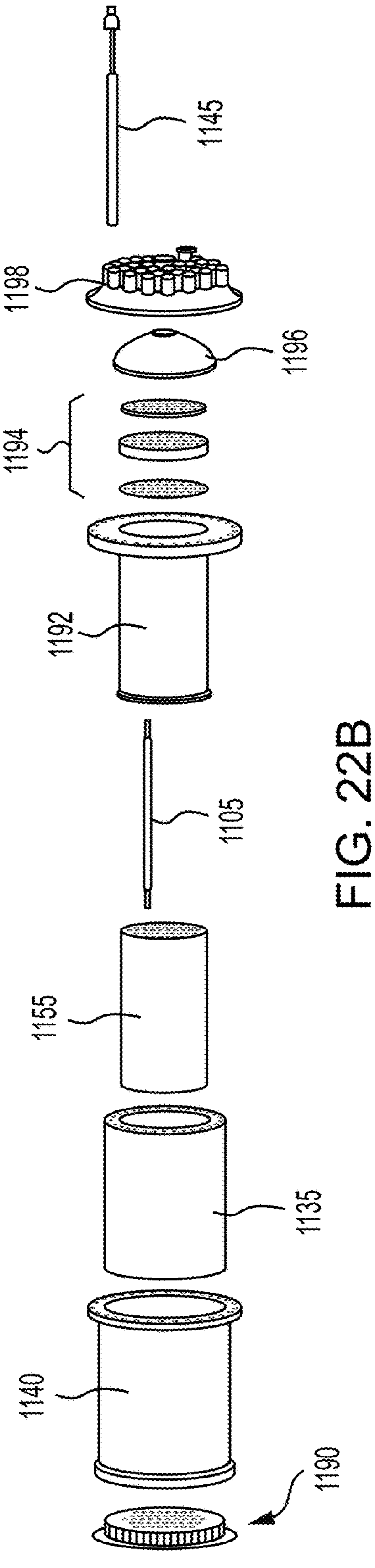
FIG. 22B is a disassembled view of the rector subsystem of the nuclear thermal propulsion engine shown in FIG. 22A.

FIG. 22B is a disassembled view of the reactor section 1170 of the nuclear thermal propulsion engine shown in FIG. 22A. Components of the reactor section 1170 include exit plenum 1190, vessel 1140, reflector 1135, moderator 1155, fuel assembly 1105, flanged core barrel 1192, internal shielding component(s) 1194, inlet plenum 1196, reactor head 1198, and control drum 1145.

It is contemplated that various supporting and ancillary equipment can be incorporated into the disclosed nuclear fission reactor structure and nuclear thermal propulsion engine. For example, at least one of a moderator (such as a zirconium hydride, beryllium, beryllium oxide, and graphite), a control rod for launch safety, a neutron source to assist with start-up, and a scientific instrument (such as a temperature sensor or radiation detector) can be incorporated into the nuclear propulsion fission reactor structure.

The disclosed arrangements pertain to any configuration in which a heat generating source including a fissionable nuclear fuel composition, is incorporated into a fuel bundle. Although generally described herein in connection with a gas-cooled nuclear thermal propulsion reactors (NTP reactors), the structures and methods disclosed herein can also be applicable to other fission reactor systems.

Nuclear propulsion fission reactor structure disclosed herein can be used in suitable applications including, but not limited to, non-terrestrial power applications, space power, space propulsion, and naval applications, including submersibles.

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. An insulated fuel assembly core for nuclear spacecraft propulsion, comprising:

a plurality of fuel monoliths;

an exhaust support plate;

an exhaust shield assembly; and an insulation layer, wherein each fuel monolith of the plurality of fuel monoliths has a shape of an eccentric cylinder, wherein each fuel monolith of the plurality of fuel monoliths is located axially along a longitudinal axis of the insulated fuel assembly core, wherein each fuel monolith of the plurality of fuel monoliths has a composition including a fissionable fuel component, wherein each fuel monolith of the plurality of fuel monoliths includes a first end surface, a second end surface, a side surface connecting the first end surface to the second end surface, and a plurality of first channels extending axially from the first end surface to the second end surface, wherein the exhaust support plate includes a first end face, a second end face, a circumferential surface connecting the first end face to the second end face, and a plurality of second channels extending from the first end face to the second end face, wherein the plurality of second channels includes a first portion of second channels and a second portion of second channels, and wherein each second channel of the first portion of second channels has a channel axis that is parallel to the longitudinal axis of the insulated fuel assembly core and each second channel of the second portion of second channels has a channel axis that is non-parallel to the longitudinal axis of the insulated fuel assembly core, and wherein the second end face of the exhaust support plate is concave.

2. The insulated fuel assembly core according to claim 1, wherein each first channel of the plurality of first channels has an inlet opening in the first end surface and an outlet opening in the second end surface.

3. The insulated fuel assembly core according to claim 1, wherein the second portion of second channels are located radially outward from the first portion of second channels.

4. The insulated fuel assembly core according to claim 3, wherein openings of each second channel of the second portion of second channels in the first end face are located at a periphery of the first end face and openings of each second channel of the second portion of second channels in the second end face are located at a periphery of the second end face.

5. The insulated fuel assembly core according to claim 1, wherein the exhaust shield assembly includes a truncated conical section at a first end and a tubular section at a second end.

6. The insulated fuel assembly core according to claim 5, wherein the channel of each second channel of the second portion of second channels are essentially parallel to a circumferential surface of the exhaust shield assembly.

7. The insulated fuel assembly core according to claim 5, wherein the plurality of fuel monoliths defines a fuel assembly core having an inlet end and an exhaust end, wherein the first end face of the exhaust support plate abuts the exhaust end of the fuel assembly core, and wherein the first end of the exhaust shield assembly is mated to the exhaust support plate.

8. The insulated fuel assembly core according to claim 7, wherein the insulation layer is an outer layer extending over at least a portion of an outer circumferential surface of the fuel assembly core and at least a portion of an outer surface of the exhaust shield assembly.

9. The insulated fuel assembly core according to claim 8, wherein the outer circumferential surface of the fuel assembly core is entirely covered by the insulation layer.

10. The insulated fuel assembly core according to claim 9, wherein the outer surface of the exhaust shield assembly is entirely covered by the insulation layer.

11. The insulated fuel assembly core according to claim 1, wherein the insulation layer includes an inner insulation layer and an outer insulation layer.

12. A fuel assembly for nuclear spacecraft propulsion, comprising:

a fuel assembly outer structure; and the insulated fuel assembly core according to claim 1 located within the fuel assembly outer structure.

13. The fuel assembly according to claim 12, further comprising an inlet connection assembly, wherein the inlet connection assembly is attached to an inlet end of the fuel assembly outer structure.

14. A nuclear fission reactor structure for nuclear spacecraft propulsion, comprising:

a moderator block including a plurality of fuel assembly openings; and a plurality of fuel assemblies according to claim 12, each fuel assembly of the plurality of fuel assemblies located in a different one of the plurality of fuel assembly openings, wherein, in a cross-section of the moderator block perpendicular to a longitudinal axis of the nuclear fission reactor structure, the plurality of fuel assemblies is distributively arranged in the moderator block.

15. A method of manufacturing the insulated fuel assembly core according to claim 1, the method comprising:

forming a tensioned fuel monolith stack mandrel assembly; and forming the insulation layer by mandrel winding.

16. The method according to claim 15, wherein forming the tensioned fuel monolith stack mandrel assembly includes:

forming the plurality of fuel monoliths into a stack;

inserting one or more alignment drill rod(s) through the stack in an axial direction to form an assembled stack;

attaching the exhaust support plate to a first end of the assembled stack to form a core stack;

inserting a first set of tensioning cables through the exhaust support plate and the plurality of fuel monoliths of the core stack;

attaching a plurality of first mandrel spacers to a first end of the core stack;

inserting the first set of tensioning cables through the plurality of first mandrel spacers;

attaching a plurality of second mandrel spacers to a second end of the core stack;

inserting a second set of tensioning cables through (i) the plurality of second mandrel spacers, (ii) the exhaust support plate, (iii) the plurality of fuel monoliths, and (iv) the plurality of first mandrel spacers;

tensioning the first set of tensioning cables and the second set of tensioning cables; and attaching a first threaded mandrel cap to a distal end of the plurality of first mandrel spacers and a second threaded mandrel cap to a distal end of the plurality of second mandrel spacers.

17. The method according to claim 16, wherein a first termination of each of the first set of tensioning cables is adjacent the exhaust support plate and a second termination of each of the first set of tensioning cables is adjacent a distal end of the plurality of first mandrel spacers, and wherein a first termination of each of the second set of tensioning cables is adjacent a distal end of the plurality of second mandrel spacers and a second termination of each of the second set of tensioning cables is adjacent the distal end of the plurality of first mandrel spacers.

* * * * *